United States Patent
Tanaka et al.

(10) Patent No.: US 8,999,196 B2
(45) Date of Patent: *Apr. 7, 2015

(54) LIQUID CRYSTAL COMPOUND HAVING PERFLUOROALKYL CHAIN, AND LIQUID CRYSTAL COMPOSITION AND LIQUID CRYSTAL DISPLAY DEVICE

(75) Inventors: Hiroyuki Tanaka, Ichihara (JP); Sayaka Fujimori, Ichihara (JP)

(73) Assignees: JNC Corporation, Tokyo (JP); JNC Petrochemical Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/593,211

(22) Filed: Aug. 23, 2012

(65) Prior Publication Data
US 2013/0048913 A1 Feb. 28, 2013

(30) Foreign Application Priority Data
Aug. 25, 2011 (JP) ................. 2011-183969

(51) Int. Cl.
| | |
|---|---|
| C09K 19/06 | (2006.01) |
| C09K 19/30 | (2006.01) |
| C09K 19/12 | (2006.01) |
| C09K 19/00 | (2006.01) |
| C09K 19/02 | (2006.01) |
| C07C 19/08 | (2006.01) |
| C07C 21/18 | (2006.01) |
| C09K 19/42 | (2006.01) |
| C09K 19/34 | (2006.01) |

(52) U.S. Cl.
CPC .............. *C09K 19/42* (2013.01); *C09K 19/061* (2013.01); *C09K 19/3458* (2013.01); *C09K 2019/3004* (2013.01); *C09K 2019/3009* (2013.01); *C09K 2019/301* (2013.01); *C09K 2019/3016* (2013.01); *C09K 2019/3019* (2013.01); *C09K 2019/3021* (2013.01); *C09K 2019/304* (2013.01); *C09K 2019/3042* (2013.01)

(58) Field of Classification Search
USPC ............. 428/1.1, 1.3; 349/167, 182; 570/134, 570/136; 252/299.01, 299.6, 252/299.61–299.66
See application file for complete search history.

(56) References Cited

U.S. PATENT DOCUMENTS
2013/0069002 A1* 3/2013 Yanai et al. .............. 252/299.61

FOREIGN PATENT DOCUMENTS
| DE | 4034123 A | 4/1992 | |
|---|---|---|---|
| DE | 100 18 086 A1 * | 2/2001 | ................. 252/299.6 |
| DE | 10018086 A | 2/2001 | |

OTHER PUBLICATIONS

Rabolt, JF et al., Structural Studies of Semifluorinated n-alkanes. 1. Synthesis and Characterization of F(CF2)n(CH2) mH in the Solid State, Macromolecules, 1984, 17, 2786-2794.
Mahler, W., Smectic Liquid Crystal from (Perfluorodecyl) Decane, Mol. Cryst. Liq. Cryst. Lett., 1985, 2(3-4), 111.
Russel, TP et al., Structural Characterization of Semifluorinated n-alkanes. 2. Solid-State Transition Behavior, Macromolecules, 1986, 19, 1135-1143.
Viney, C., et al. Transitions to Liquid Crystalline Phases in a Semifluorinated Alkane, Mol. Cryst. Liq. Cryst., 1989, 168, 63-82.
Araki, K., Dielectric Behavior of Semifluorinated n-alkane (F(CF2)n(CH2)mH), Mol. Cryst. Liq. Cryst., 1996, 281, 123-134.
Araki, K., Dielectric Behavior of Semifluorinated n-alkane (F(CF2)n(CH2)mH). II., Mol. Cryst. Liq. Cryst., 1997, 302, 369-377.
Broniatowski, M. et al., Critical influence of the alkane length in surface and liquid-crystalline properties of perflurodecyl-n-alkanes, J. Fluor. Chem., 2005, 126, 79-86.
Fujiwara, M. et al., Liquid Crystalline Properties and Molecular Packing of Semifluorinated n-alkanes F(CF2)10(CH2)mH, Macromolecules, 2006, 39, 5836.
Broniatowski, M, et al., Branching of the Perfluorinated Chain Influences the Liquid-Crystalliine Properties of Semifluorinated Alkanes: Perfunctorily- and Perfluoroisononyl-n-Alkanes—a Comparative Study, Mol. Cryst. Liq. Cryst., 2006, 460, 63-74.

* cited by examiner

*Primary Examiner* — Geraldina Visconti
(74) *Attorney, Agent, or Firm* — Hogan Lovells US LLP

(57) ABSTRACT

The invention is to provide a new liquid crystal compound having a high clearing point, a good compatibility with other compounds, a small viscosity, and a high stability to heat, light and so forth; compound (1) is provided:

$$R^1-(CF_2)_n-R^2 \quad (1)$$

wherein, for example, $R^1$ is alkyl having 4 to 10 carbons or $-(CH_2)_2-CH=CH_2$, $R^2$ is alkyl having 2 to 10 carbons, n is 8, and $R^1$ and $R^2$ are not allowed to be straight-chain alkyl having an identical number of carbons.

17 Claims, No Drawings

LIQUID CRYSTAL COMPOUND HAVING PERFLUOROALKYL CHAIN, AND LIQUID CRYSTAL COMPOSITION AND LIQUID CRYSTAL DISPLAY DEVICE

This is a Non-Provisional application, which claims priority to Japanese Patent Application No. 2011-183969, filed on Aug. 25, 2011; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The invention relates to a new liquid crystal compound, liquid crystal composition and liquid crystal display device. More specifically, the invention relates to a liquid crystal compound that has a liquid crystal phase, even without a ring structure, and has a high clearing point, a good compatibility with other compounds and a small viscosity, and a liquid crystal composition containing the compound. The liquid crystal display device using the composition can be used in a wide temperature range, and can be driven with a low voltage and obtain a large contrast ratio and steep electro-optical characteristics.

BACKGROUND ART

A liquid crystal display device using a liquid crystal compound has been widely utilized for a display of a watch, a calculator, a personal computer and so forth. In the liquid crystal display device, a classification based on an operating mode for liquid crystals includes a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode and a polymer sustained alignment (PSA) mode. A classification based on a driving mode in the device includes passive matrix (PM) and active matrix (AM). The passive matrix (PM) is classified into static, multiplex and so forth, and the AM is classified into thin film transistor (TFT), metal insulator metal (MIM) and so forth.

The liquid crystal display device includes a liquid crystal composition having suitable physical properties. In order to improve characteristics of the device, the composition preferably has suitable physical properties. General physical properties necessary for the liquid crystal compound being a component of the composition are as follows:

(1) being chemically stable and physically stable;
(2) having a high clearing point (clearing point: phase transition temperature between a liquid crystal phase and an isotropic phase);
(3) having a low minimum temperature of the liquid crystal phase (a nematic phase, a smectic phase or the like);
(4) having an excellent compatibility with other liquid crystal compounds; and
(5) having a small viscosity.

As described in property (1), if a composition containing a liquid crystal compound being chemically and physically stable is used in the liquid crystal display device, a voltage holding ratio can be increased.

As described in properties (2) and (3), a composition containing a compound having the high clearing point or the low minimum temperature of the liquid crystal phase has a wide temperature range of the nematic phase. Therefore, the device can be used in a wide temperature range.

In order to develop characteristics that are difficult to be output by a single compound, the liquid crystal compound is generally used in the form of a liquid crystal composition prepared by mixing the compound with a number of other liquid crystal compounds. Accordingly, as described in property (4), the liquid crystal compound to be used in the device preferably has the good compatibility with other compounds.

Moreover, a response speed of the device is correlated with viscosity of the liquid crystal composition. Therefore, in order to manufacture a device that can respond at a high speed, a composition having the small viscosity should be used. In order to decrease the viscosity of the composition, a liquid crystal compound having the high clearing point and the small viscosity is used as a viscosity reducer. Accordingly, as described in property (5), a liquid crystal compound having the small viscosity is required.

In general, the clearing point and the viscosity of the liquid crystal compound are correlated with the number of ring structures that constitute the compound. More specifically, as the number of rings is increased, the clearing point is increased and the viscosity is also increased. Conversely, as the number of rings is decreased, the clearing point is decreased and the viscosity is also decreased. Therefore, a development has been required for a compound that has a liquid crystal phase, even without a ring structure, and has a high clearing point.

As the compound that has the liquid crystal phase even without the ring structure, a compound having a perfluoroalkyl chain has been found out so far. For example, Non-patent literatures Nos. 1 to 9 disclose straight-chain compounds (S-1) and (S-2) in which a perfluoroalkyl chain and an alkyl chain are connected. However, the compounds have a very low compatibility with other compounds, and an insufficiently high maximum temperature upon addition to a composition. Therefore, no example has been known in which the compounds are used as constituents of the liquid crystal composition for use in the liquid crystal display device.

Moreover, Patent literatures Nos. 1 and 2 disclose straight-chain compound (S-3) to straight-chain compound (S-5) that have an alkyl chain or an alkenyl chain at both terminals of a perfluoroalkyl chain. However, the compounds have no liquid crystal phase, and an insufficiently high maximum temperature upon addition to a composition. Therefore, a temperature range in which the compounds can be used in the liquid crystal display device is insufficiently wide.

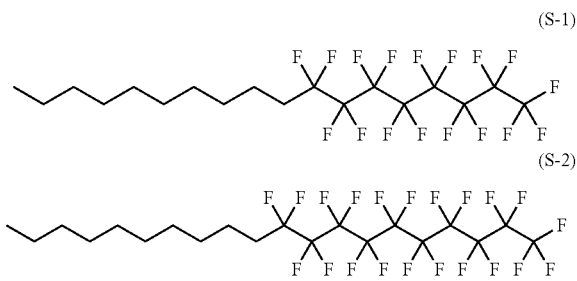

-continued

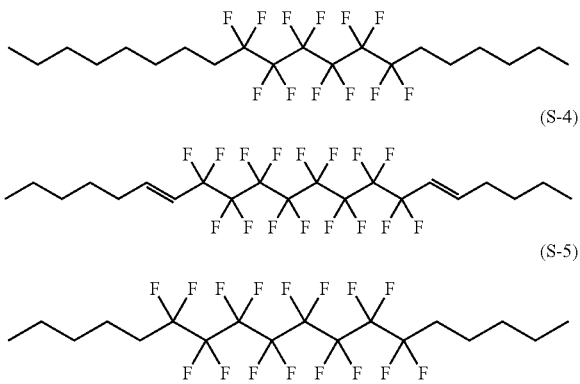

(S-3)

(S-4)

(S-5)

CITATION LIST

Patent Literature

Patent literature No. 1: DE 4034123 A.
Patent literature No. 2: DE 10018086 A.

Non-patent Literature

Non-patent literature No. 1: Macromolecules, 1984, 17, 2786.
Non-patent literature No. 2: Mol. Cryst. Liq. Cryst. Lett., 1985, 2(3-4), 111.
Non-patent literature No. 3: Macromolecules, 1986, 19, 1135.
Non-patent literature No. 4: Mol. Cryst. Liq. Cryst., 1989, 168, 63.
Non-patent literature No. 5: Mol. Cryst. Liq. Cryst., 1996, 281, 123.
Non-patent literature No. 6: Mol. Cryst. Liq. Cryst., 1997, 302, 369.
Non-patent literature No. 7: J. Fluor. Chem., 2005, 126, 79.
Non-patent literature No. 8: Macromolecules, 2006, 39, 5836.
Non-patent literature No. 9: Mol. Cryst. Liq. Cryst., 2006, 460, 63.

SUMMARY OF INVENTION

The inventors of the invention have diligently continued to conduct research for solving the problem, as a result, have found that a specific liquid crystal compound and a composition containing the compound satisfy desirable characteristics and a liquid crystal display device including the composition exhibits an excellent performance, and thus have completed the invention based on the finding.

The invention concerns a compound represented by formula (1):

wherein, in formula (1), $R^1$ is alkyl having 4 to 15 carbons, $-(CH_2)_2-CH=CH_2$, $-(CH_2)_2-CH=CHCH_3$, $-(CH_2)_4-CH=CH_2$ or $-(CH_2)_4-CH=CHCH_3$, $R^2$ is alkyl having 2 to 15 carbons or alkenyl having 2 to 15 carbons, n is 8, 9, 10, 11 or 12, and $R^1$ and $R^2$ are not allowed to be straight-chain alkyl having an identical number of carbons.

The invention also concerns a liquid crystal composition containing the compound.

The invention further concerns a liquid crystal display device including the liquid crystal composition.

Technical Problem

A first aim of the invention is to provide a liquid crystal compound that has a liquid crystal phase, even without a ring structure, and has a high clearing point, a good compatibility with other compounds, a small viscosity, and a high stability to heat, light and so forth. A second aim is to provide a liquid crystal composition that contains the compound and has a wide temperature range of the liquid crystal phase, a large dielectric anisotropy, a large refractive index anisotropy, a low threshold voltage and a small viscosity. A third aim is to provide a liquid crystal display device that includes the composition, can be used in a wide temperature range, can be driven with a low voltage, and has a large contrast ratio and steep electro-optic characteristics.

Solution to Problem

The invention provides a liquid crystal compound, a liquid crystal composition and a liquid crystal display device including the liquid crystal composition as described below. Preferred examples of a terminal chain and a perfluoroalkyl chain in a compound represented by formula (1) are also described.

Item 1. A compound represented by formula (1):

wherein, in formula (1), $R^1$ is alkyl having 4 to 15 carbons, $-(CH_2)_2-CH=CH_2$, $-(CH_2)_2-CH=CHCH_3$, $-(CH_2)_4-CH=CH_2$ or $-(CH_2)_4-CH=CHCH_3$, $R^2$ is alkyl having 2 to 15 carbons or alkenyl having 2 to 15 carbons, n is 8, 9, 10, 11 or 12, and $R^1$ and $R^2$ are not allowed to be straight-chain alkyl having an identical number of carbons.

Item 2. The compound according to item 1, wherein, in formula (1), $R^1$ is alkyl having 4 to 10 carbons, $-(CH_2)_2-CH=CH_2$, $-(CH_2)_2-CH=CHCH_3$, $-(CH_2)_4-CH=CH_2$ or $-(CH_2)_4-CH=CHCH_3$, and $R^2$ is alkyl having 2 to 10 carbons or alkenyl having 2 to 10 carbons.

Item 3. The compound according to item 1, wherein, in formula (1), $R^1$ is alkyl having 4 to 10 carbons, $-(CH_2)_2-CH=CH_2$ or $-(CH_2)_2-CH=CHCH_3$, and $R^2$ is alkyl having 2 to 10 carbons, $-CH=CH_2$, $-CH=CHCH_3$, $-CH_2CH=CH_2$, $-CH_2CH=CHCH_3$, $-(CH_2)_2-CH=CH_2$ or $-(CH_2)_2-CH=CHCH_3$.

Item 4. The compound according to item 1, wherein, in formula (1), $R^1$ is alkyl having 4 to 10 carbons, $-(CH_2)_2-CH=CH_2$ or $-(CH_2)_2-CH=CHCH_2$, $R^2$ is alkyl having 2 to 10 carbons, $-CH=CH_2$, $-CH=CHCH_3$, $-CH_2CH=CH_2$, $-CH_2CH=CHCH_3$, $-(CH_2)_2-CH=CH_2$ or $-(CH_2)_2-CH=CHCH_3$, n is 8, 9 or 10, and $R^1$ is not identical with $R^2$.

Item 5. The compound according to item 4, wherein, formula (1) according to item 1, n is 8.

Item 6. The compound according to item 5, wherein, in formula (1) according to item 1, $R^1$ is alkyl having 4 to 10 carbons and $R^2$ is alkyl having 2 to 7 carbons.

Item 7. The compound according to item 5, wherein, in formula (1) according to item 1, $R^1$ is alkyl having 4 to 10 carbons, and $R^2$ is $-CH=CH_2$, $-CH=CHCH_3$, $-CH_2CH=CH_2$, $-CH_2CH=CHCH_3$, $-(CH_2)_2-CH=CH_2$ or $-(CH_2)_2-CH=CHCH_3$.

Item 8. The compound according to item 5, wherein, formula (1) according to item 1, $R^1$ is $-(CH_2)_2-CH=CH_2$ or $-(CH_2)_2-CH=CHCH_3$, and $R^2$ is $-CH=CH_2$, —CH=CHCH$_3$, —CH$_2$CH=CH$_2$, —CH$_2$CH=CHCH$_3$, —(CH$_2$)$_2$—CH=CH$_2$ or —(CH$_2$)$_2$—CH=CHCH$_3$.

Item 9. A liquid crystal composition, containing at least one compound according to any one of items 1 to 8.

Item 10. The liquid crystal composition according to item 9, further containing at least one compound selected from the group of compounds represented by formula (2) to formula (4):

(2)

(3)

(4)

wherein, in formula (2) to formula (4), R$^3$ is independently alkyl having 1 to 10 carbons or alkenyl having 2 to 10 carbons, and in the alkyl and the alkenyl, at least one of hydrogen may be replaced by fluorine and at least one of —CH$_2$— may be replaced by —O—; X$^1$ is fluorine, chlorine, —OCF$_3$, —OCHF$_2$, —CF$_3$, —CHF$_2$, —CH$_2$F, —CF=CF$_2$, —OCF$_2$CHF$_2$ or —OCF$_2$CHFCF$_3$; ring A$^1$, ring A$^2$ and ring A$^3$ are independently 1,4-cyclohexylene, 1,3-dioxane-2,5-diyl, pyrimidine-2,5-diyl, tetrahydropyran-2,5-diyl, 1,4-phenylene, 2-fluoro-1,4-phenylene, 3-fluoro-1,4-phenylene or 3,5-difluoro-1,4-phenylene; Z$^1$ and Z$^2$ are independently —(CH$_2$)$_2$—, —(CH$_2$)$_4$—, —COO—, —CF$_2$O—, —OCF$_2$—, —CH=CH—, —C≡C—, —CH$_2$O— or a single bond; and L$^1$ and L$^2$ are independently hydrogen or fluorine.

Item 11. The liquid crystal composition according to item 9, further containing at least one compound selected from the group of compounds represented by formula (5):

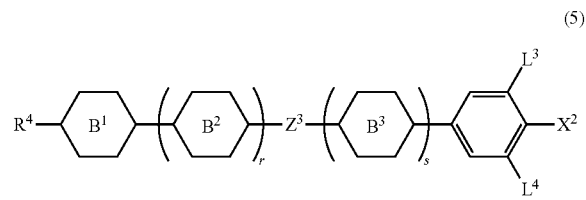
(5)

wherein, in formula (5), R$^4$ is alkyl having 1 to 10 carbons or alkenyl having 2 to 10 carbons, and in the alkyl and the alkenyl, at least one of hydrogen may be replaced by fluorine and at least one of —CH$_2$— may be replaced by —O—; X$^2$ is —C≡N or —C≡C—C≡N; ring B$^1$, ring B$^2$ and ring B$^3$ are independently 1,4-cyclohexylene, 1,4-phenylene in which at least one of hydrogen may be replaced by fluorine, 1,3-dioxane-2,5-diyl, tetrahydropyran-2,5-diyl or pyrimidine-2,5-diyl; Z$^3$ is —(CH$_2$)$_2$—, —COO—, —CF$_2$O—, —OCF$_2$—, —C≡C—, —CH$_2$O— or a single bond; L$^3$ and L$^4$ are independently hydrogen or fluorine; r is 0, 1 or 2, s is 0 or 1, and a sum of r and s is 0, 1, 2 or 3.

Item 12. The liquid crystal composition according to item 9, further containing at least one compound selected from the group of compounds represented by formula (6) to formula (11):

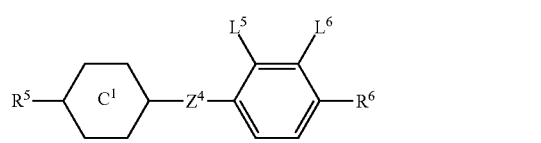
(6)

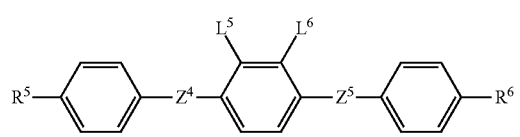
(7)

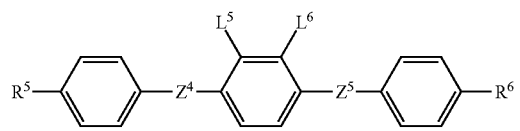
(8)

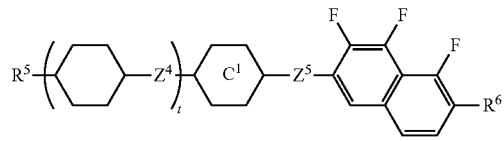
(9)

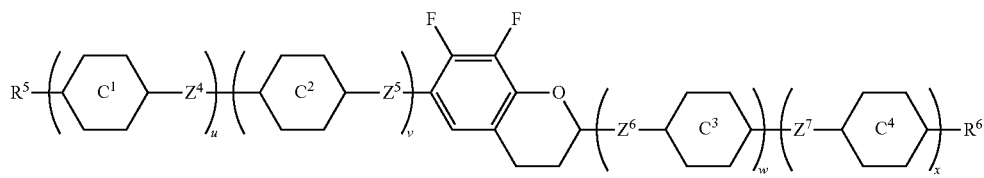

(10)

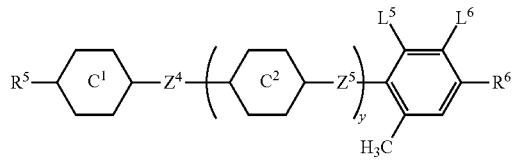

(11)

wherein, in formula (6) to formula (11), $R^5$ and $R^6$ are independently alkyl having 1 to 10 carbons or alkenyl having 2 to 10 carbons, and in the alkyl and the alkenyl, at least of one hydrogen may be replaced by fluorine and at least one of —$CH_2$— may be replaced by —O—; ring $C^1$, ring $C^2$, ring $C^3$ and ring $C^4$ are independently 1,4-cyclohexylene, 1,4-cyclohexenylene, 1,4-phenylene in which at least one of hydrogen may be replaced by fluorine, tetrahydropyran-2,5-diyl, tetrahydropyran-3,6-diyl or decahydro-2,6-naphthalene; $Z^4$, $Z^5$, $Z^6$ and $Z^7$ are independently —$(CH_2)_2$—, —COO—, —$CH_2O$—, —$OCF_2$—, —$OCF_2(CH_2)_2$— or a single bond; $L^5$ and $L^6$ are independently fluorine or chlorine; and t, u, v, w, x and y are independently 0 or 1, and a sum of u, v, w and x is 1 or 2.

Item 13. The liquid crystal composition according to item 9, further containing at least one compound selected from the group of compounds represented by formula (12) to formula (14):

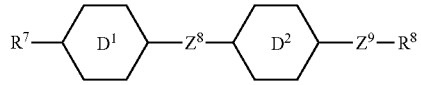

(12)

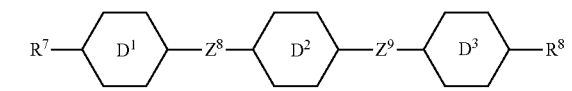

(13)

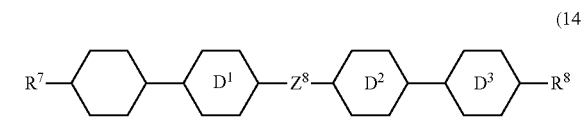

(14)

wherein, in formula (12) to formula (14), $R^7$ and $R^8$ are independently alkyl having 1 to 10 carbons or alkenyl having 2 to 10 carbons, and in the alkyl and the alkenyl, at least one of —$CH_2$— may be replaced by —O—; ring $D^1$, ring $D^2$ and ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^8$ and $Z^9$ are independently —C≡C—, —COO—, —$(CH_2)_2$—, —CH=CH— or a single bond.

Item 14. The liquid crystal composition according to item 10, further containing at least one compound selected from the group of compounds represented by formula (5) according to item 11.

Item 15. The liquid crystal composition according to item 10, further containing at least one compound selected from the group of compounds represented by formula (12) to formula (14) according to item 13.

Item 16. The liquid crystal composition according to item 11, further containing at least one compound selected from the group of compounds represented by formula (12) to formula (14) according to item 13.

Item 17. The liquid crystal composition according to item 12, further containing at least one compound selected from the group of compounds represented by formula (12) to formula (14) according to item 13.

Item 18. The liquid crystal composition according to any one of items 9 to 17, further containing at least one optically active compound.

Item 19. The liquid crystal composition according to any one of items 9 to 18, further containing at least one antioxidant and/or at least one ultraviolet light absorber.

Item 20. A liquid crystal display device including the liquid crystal composition according to any one of items 9 to 19.

Usage of terms in the invention is as described below. The liquid crystal compound is a generic term for a compound having a liquid crystal phase such as a nematic phase or a smectic phase, and a compound having no liquid crystal phase but being useful as a component of the liquid crystal composition. The liquid crystal compound, the liquid crystal composition and the liquid crystal display device may be abbreviated as "compound," "composition," and "device," respectively. The liquid crystal display device is a generic term for a liquid crystal display panel and a liquid crystal display module. A higher limit of a temperature range of the nematic phase is a phase transition temperature between the nematic phase and an isotropic phase, and may simply be abbreviated as "clearing point" or "maximum temperature." A lower limit of the temperature range of the nematic phase" may simply be abbreviated as "minimum temperature." "Compound represented by formula (1)" may be abbreviated as "compound (1)." The abbreviation may apply also to a compound represented by formula (2) and so forth. In formula (2) to formula (14), a symbol $A^1$, $B^1$, $C^1$ or the like surrounded by a hexagonal shape corresponds to ring $A^1$, ring $B^1$, ring $C^1$ or the like, respectively. A plurality of identical symbols such as ring $A^1$, ring $B^2$ and $R^3$ are described in identical or different formulas, and two of arbitrary ring $A^1$, ring $B^2$ and $R^3$ may be identical or different. An amount of the compound expressed in terms of "percentage" is expressed in terms of "weight percent (% by weight)" based on the total weight of the composition.

An expression "A and/or B" means that "A and B" and "A or B" can be arbitrarily selected.

"At least one" described prior to "may be replaced" means any of not only positions but also numbers. An expression "at least one of A may be replaced by B, C or D" includes a case where arbitrary A is replaced by B, a case where arbitrary A is replaced by C or a case where arbitrary A is replaced by D, and also a case where a plurality of A are replaced by at least two of B to D. For example, "alkyl in which at least one of —CH$_2$— may be replaced by —O— or —CH═CH—" includes alkyl, alkenyl, alkoxy, alkoxyalkyl, alkoxyalkenyl and alkenyloxyalkyl. Incidentally, according to the invention, it is not preferred that two successive —CH$_2$— are replaced by —O— to form —O—O— or the like. It is not preferred either that a terminal —CH$_2$— in alkyl is replaced by —O—. Hereinafter, the invention will be further explained.

Advantageous Effects of Invention

A liquid crystal compound of the invention has a liquid crystal phase, even without a ring structure, and has a high clearing point, a good compatibility with other compounds, a small viscosity and a high stability to heat, light and so forth. A liquid crystal composition of the invention contains the compound, and has a high maximum temperature of a nematic phase, a low minimum temperature of the nematic phase, a large dielectric anisotropy, a large refractive index anisotropy, a low threshold voltage and a small viscosity. A liquid crystal display device of the invention includes the composition, and has a wide temperature range in which the liquid crystal display device can be used, a low driving voltage, a small electric power consumption, a large contrast ratio and steep electro-optic characteristics.

DESCRIPTION OF EMBODIMENTS

1. Compound of the Invention

A first embodiment of the invention concerns a compound represented by formula (1):

$$R^1\text{—(CF}_2\text{—)}_n R^2 \quad (1)$$

In formula (1), R$^1$ is alkyl having 4 to 15 carbons, —(CH$_2$)$_2$—CH═CH$_2$, —(CH$_2$)$_2$—CH═CHCH$_3$, —(CH$_2$)$_4$—CH═CH$_2$ or —(CH$_2$)$_4$—CH═CHCH$_3$, and R$^2$ is alkyl having 2 to 15 carbons or alkenyl having 2 to 15 carbons. The alkyl and the alkenyl may have a straight chain or a branched chain, but the straight chain is preferred to the branched chain. Even a branched-chain group when the group is optically active is preferred. A preferred configuration of —CH═CH— in alkenyl depends on a position of a double bond. A trans configuration is preferred in alkenyl having the double bond in an odd-numbered position, such as —CH═CHCH$_3$, —CH═CHC$_2$H$_5$, —CH═CHC$_3$H$_7$, —CH═CHC$_4$H$_9$, —(CH$_2$)$_2$—CH═CHCH$_3$ and —(CH$_2$)$_2$—CH═CHC$_2$H$_5$. A cis configuration is preferred in alkenyl having the double bond in an even-numbered position, such as —CH$_2$CH═CHCH$_3$, —CH$_2$CH═CHC$_2$H$_5$ and —CH$_2$CH═CHC$_3$H$_7$. An alkenyl compound having a preferred configuration has a high maximum temperature or a wide temperature range of a liquid crystal phase. A detailed description is found in Mol. Cryst. Liq. Cryst., 1985, 131, 109 and Mol. Cryst. Liq. Cryst., 1985, 131, 327.

Specific examples of alkyl include —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$, —C$_{15}$H$_{31}$, —CH(CH$_3$)$_2$, —CH(CH$_3$)C$_2$H$_5$, —CH(CH$_3$)C$_4$H$_9$, —CH(CH$_3$)C$_6$H$_{13}$, —CH$_2$CH(CH$_3$)$_2$, —CH$_2$CH(CH$_3$)C$_3$H$_7$, —CH$_2$CH(CH$_3$)C$_5$H$_{11}$, —(CH$_2$)$_2$—CH(CH$_3$)C$_2$H$_5$, —(CH$_2$)$_2$—H(CH$_3$)C$_4$H$_9$, —(CH$_2$)$_3$—CH(CH$_3$)$_2$, —(CH$_2$)$_4$—CH(CH$_3$)C$_2$H$_5$ and —(CH$_2$)$_5$CH(CH$_3$)$_2$.

Specific examples of alkenyl include —CH═CH$_2$, —CH═CHCH$_3$, —CH$_2$CH═CH$_2$, —CH═CHC$_2$H$_5$, —CH$_2$CH═CHCH$_3$, —(CH$_2$)$_2$—CH═CH$_2$, —CH═CHC$_3$H$_7$, —CH$_2$CH═CHC$_2$H$_5$, —(CH$_2$)$_2$—CH═CHCH$_3$, —(CH$_2$)$_3$—CH═CH$_2$, —(CH$_2$)$_4$—CH═CH$_2$, —(CH$_2$)$_4$—CH═CHCH$_3$, —(CH$_2$)$_5$—CH═CH$_2$, —CH(CH$_3$)CH$_2$CH═CH$_2$, —CH(CH$_3$)CH$_2$CH═CHCH$_3$, —CH$_2$CH(CH$_3$)CH═CH$_2$ and —(CH$_2$)$_2$—CH(CH$_3$)CH═CH$_2$.

Examples of preferred R$^1$ include alkyl having 4 to 10 carbons, —(CH$_2$)$_2$—CH═CH$_2$, —(CH$_2$)$_2$—CH═CHCH$_3$, —(CH$_2$)$_4$—CH═CH$_2$ and —(CH$_2$)$_4$—CH═CHCH$_3$. Moreover, examples of further preferred R$^1$ include alkyl having 4 to 10 carbons, —(CH$_2$)$_2$—CH═CH$_2$ and —(CH$_2$)$_2$—CH═CHCH$_3$.

Examples of preferred R$^2$ include alkyl having 2 to 10 carbons and alkenyl having 2 to 10 carbons. Moreover, examples of further preferred R$^2$ include alkyl having 2 to 10 carbons, —CH═CH$_2$, —CH═CHCH$_3$, —CH$_2$CH═CH$_2$, —CH$_2$CH═CHCH$_3$, —(CH$_2$)$_2$—CH═CH$_2$ and —(CH$_2$)$_2$—CH═CHCH$_3$.

R$^1$ and R$^2$ are not allowed to be straight-chain alkyl having an identical number of carbons simultaneously.

In formula (1), n is 8, 9, 10, 11 or 12. Preferred n is 8, 9 or 10. Further preferred n is 8.

Properties of a Compound of the Invention and a Method for Adjusting the Properties Compound (1) will be explained in more detail. Compound (1) is a straight-chain compound having a perfluoroalkyl chain. The compound is physically and chemically stable, and can provide a stable composition under conditions in which a device is ordinarily used. The compound has a good compatibility with other compounds. Even when a composition is stored at a low temperature, the compound is not precipitated as crystals (or a smectic phase). The compound has a liquid crystal phase, even without a ring structure, and has a high clearing point. Thus, the compound can provide a composition having a high maximum temperature of the liquid crystal phase. Furthermore, the compound has a small viscosity. Therefore, the compound can be used as a viscosity reducer for the composition, and is suitable for manufacturing a device that can respond at a high speed.

Physical properties of compound (1) such as a clearing point, compatibility with other compounds and viscosity can be arbitrarily adjusted by suitably selecting types of R$^1$ and R$^2$, a combination thereof and the number of n in compound (1). An effect of the types and the combination on the physical properties of compound (1) will be explained below.

When R$^1$ and R$^2$ have a straight chain, the temperature range of the liquid crystal phase is wide and the viscosity is small. When R$^1$ or R$^2$ has a branched chain, the compatibility with other compounds is good. A compound in which R$^1$ or R$^2$ is an optically active group is useful as a chiral dopant. A reverse twisted domain that may be generated in the device can be prevented by adding the compound to the composition. A compound in which R$^1$ and R$^2$ are not an optically active group is useful as a component of the composition.

When R$^1$ is alkyl, as the number of carbon becomes larger, the compatibility with other compounds is improved and the clearing point is also improved. When R$^1$ is —(CH$_2$)$_2$—CH═CH$_2$ or —(CH$_2$)$_4$—CH═CH$_2$, the compatibility with other compounds is good and the viscosity is small. When R$^1$ is —(CH$_2$)$_2$—CH═CHCH$_3$ or —(CH$_2$)$_4$—CH═CHCH$_3$, the clearing point is high, and a maximum temperature of the liquid crystal phase when the compound is compounded into the composition is high.

When $R^2$ is alkyl, as the number of carbon becomes larger, the compatibility with other compounds is improved and the clearing point also is improved. When $R^2$ is —CH=CH$_2$, the viscosity is particularly small. When $R^2$ is —(CH$_2$)$_2$—CH=CH$_2$, the compatibility with other compounds is good and the viscosity is small. When $R^2$ is —CH$_2$CH=CHCH$_3$ or —(CH$_2$)$_2$—CH=CHCH$_3$, the clearing point is high, and the maximum temperature of the liquid crystal phase when the compound is compounded into the composition is high.

When both $R^1$ and $R^2$ are alkyl, stability of the compound is particularly high. However, $R^1$ and $R^2$ are not allowed to be straight-chain alkyl having an identical number of carbons simultaneously. When $R^1$ is alkyl and $R^2$ is alkenyl, the compatibility with other compounds is good and the viscosity is small. When $R^1$ is —(CH$_2$)$_2$—CH=CH$_2$ or —(CH$_2$)$_2$—CH=CHCH$_3$ and $R^2$ is alkenyl, the clearing point is high, and the maximum temperature of the liquid crystal phase when the compound is compounded into the composition is high.

As n becomes larger, the clearing point is improved and the maximum temperature when the compound is compounded into the composition is improved. When n is 8, 9 or 10, the compatibility with other compounds is good and the viscosity is small. When n is 11 or 12, the clearing point is high and the temperature range of the liquid crystal phase is wide.

As described above, a compound having objective physical properties can be obtained by suitably selecting types of $R^1$ and $R^2$, the combination thereof and the number of n. Accordingly, compound (1) is useful as the component of the composition to be used in a device having a PC, TN, STN, ECB, OCB, IPS or VA mode or the like.

Synthesis of Compound (1)

Next, synthesis of compound (1) will be explained. Compound (1) can be prepared by suitably combining techniques in synthetic organic chemistry.

Method for Synthesizing Compound (1)

A plurality of methods for preparing a compound represented by formula (1) are known. Examples thereof will be shown herein. Among the compounds represented by formula (1), a compound when both $R^1$ and $R^2$ are alkyl can be prepared by the method described below. Monoalkyl adduct (17) is obtained by allowing alkene (16) to react with diiodoperfluoroalkane (15) under radical-generating conditions for sodium dithionite, sodium hydrogencarbonate and so forth. Subsequently, dialkyl adduct (19) is obtained by allowing alkene (18) to react with monoalkyl adduct (17) under radical-generating conditions. Next, dialkyl adduct (19) can be converted into compound (1) by reducing dialkyl adduct (19) by using lithium aluminum hydride or the like.

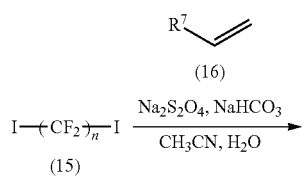

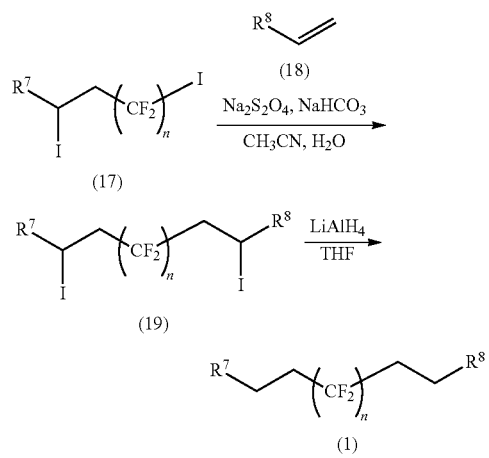

In the formulas, $R^7$ is alkyl having 2 to 13 carbons, $R^8$ is alkyl having 1 to 13 carbons or hydrogen, and when $R^7$ is straight-chain alkyl, $R^7$ is not identical with $R^8$, and n is 8, 9, 10, 11 or 12.

When $R^1$ is alkyl and $R^2$ is propyl in formula (1), compound (1) can also be prepared by the method described below. Allyl adduct (21) is obtained by allowing allyl bromide (20) to react with monoalkyl adduct (17) under radical-generating conditions. Subsequently, allyl adduct (21) can be converted into compound (1) by reducing allyl adduct (21) by using Raney nickel or the like.

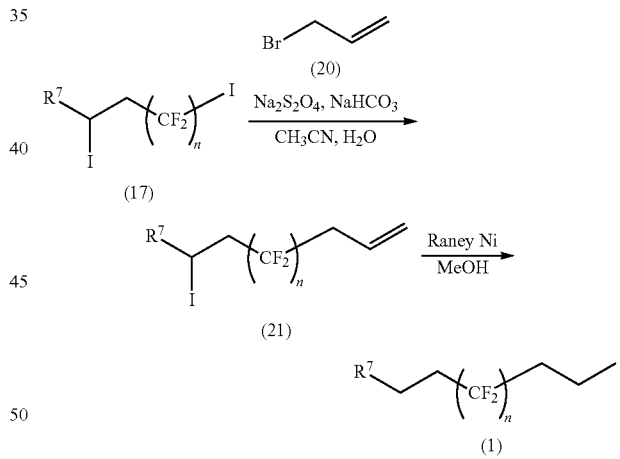

In the formulas, $R^7$ is alkyl having 2 to 13 carbons, and n is 8, 9, 10, 11 or 12.

When $R^1$ is alkyl and $R^2$ is 1-alkenyl in formula (1), compound (1) can also be prepared by the method described below. Monoalkyl adduct (23) is obtained by allowing alkene (18) to react with chloroiodoperfluoroalkane (22) under radical-generating conditions. Subsequently, alkenyl derivative (24) is obtained by treating monoalkyl adduct (23) with a base such as potassium hydroxide, and then alkenyl derivative (24) can be converted into compound (1) by allowing alkene (16) to react with alkenyl derivative (24) in the presence of sodium dithionite and sodium hydrogencarbonate in a dimethyl sulfoxide (DMSO) solvent.

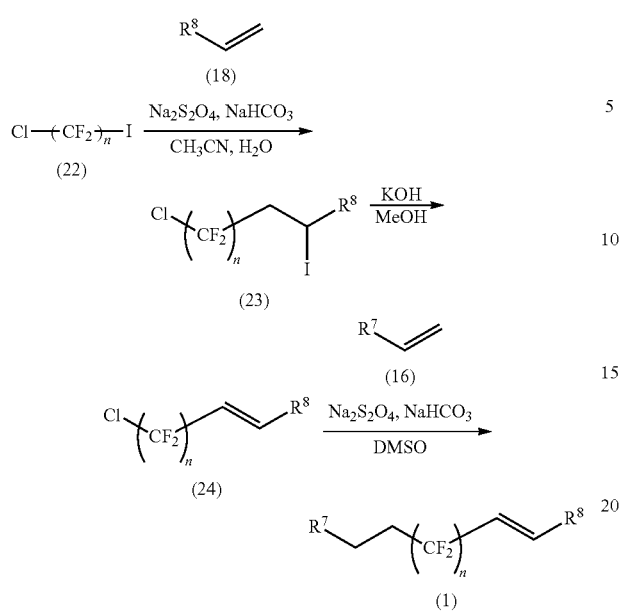

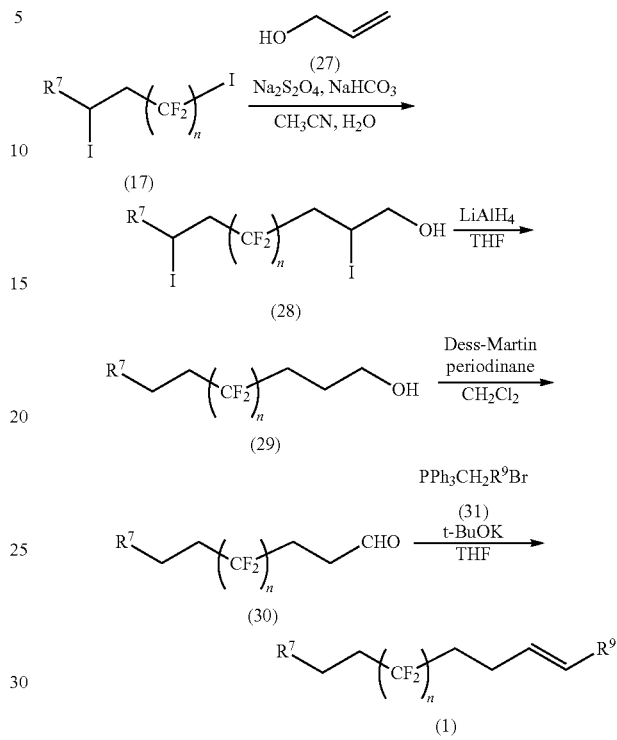

verted into compound (1) by carrying out a Wittig reaction using corresponding phosphonium salt (31).

In the formulas, $R^7$ is alkyl having 2 to 13 carbons, $R^8$ is alkyl having 1 to 13 carbons or hydrogen, and n is 8, 9, 10, 11 or 12.

When $R^1$ is alkyl and $R^2$ is —CH$_2$CH=CH$_2$ or —CH$_2$CH=CHCH$_3$ in formula (1), compound (1) can be prepared by the method described below. Alkenyl adduct (26) is obtained by allowing alkenyl bromide (25) to react with monoalkyl adduct (17) under radical-generating conditions. Subsequently, alkenyl adduct (26) can be converted into compound (1) by reducing alkenyl adduct (26) by using lithium aluminum hydride or the like.

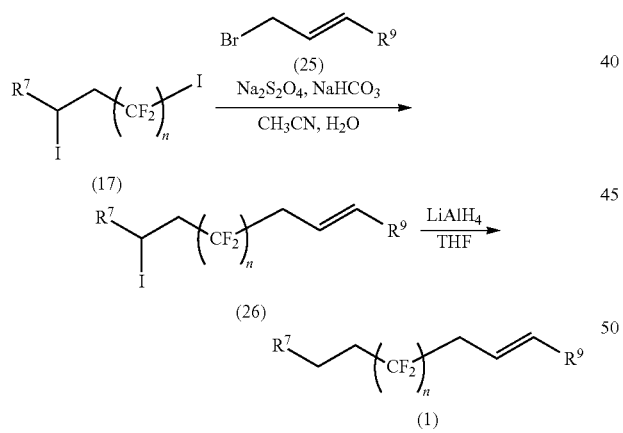

In the formulas, $R^7$ is alkyl having 2 to 13 carbons, $R^9$ is hydrogen or —CH$_3$, and n is 8, 9, 10, 11 or 12.

When $R^1$ is alkyl and $R^2$ is —(CH$_2$)$_2$—CH=CH$_2$ or —(CH$_2$)$_2$—CH=CHCH$_3$ in formula (1), compound (1) can be prepared by the method described below. Alkanol derivative (29) is obtained by allowing allyl alcohol (27) to react with monoalkyl adduct (17) under radical-generating conditions, and subsequently by reducing alkanol derivative (29) with lithium aluminum hydride or the like. Subsequently, alkylaldehyde derivative (30) is obtained by oxidizing alkanol derivative (29) by using Dess-Martin periodinane or the like, and then alkylaldehyde derivative (30) can be con- In the formulas, $R^7$ is alkyl having 2 to 13 carbons, $R^9$ is hydrogen or —CH$_3$, and n is 8, 9, 10, 11 or 12.

When $R^1$ is —(CH$_2$)$_2$—CH=CH$_2$ or —(CH$_2$)$_2$—CH=CHCH$_3$ and $R^2$ is 1-alkenyl in formula (1), compound (1) can be prepared by the method described below. Alkanol derivative (32) is obtained by allowing allyl alcohol (27) to react with alkenyl derivative (24) in the presence of sodium dithionite and sodium hydrogencarbonate in a DMSO solvent. Subsequently, alkylaldehyde derivative (33) is obtained by oxidizing alkanol derivative (32) by using Dess-Martin periodinane or the like, and then alkylaldehyde derivative (33) can be converted into compound (1) by carrying out a Wittig reaction using corresponding phosphonium salt (31).

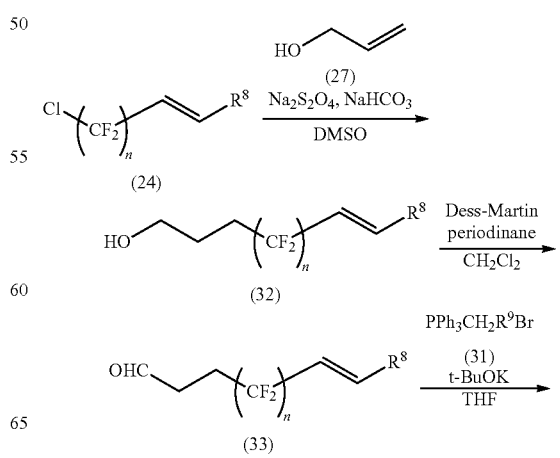

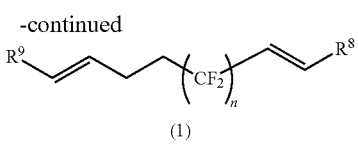

(1)

In the formulas, $R^8$ is alkyl having 1 to 13 carbons or hydrogen, $R^9$ is hydrogen or —$CH_3$, and n is 8, 9, 10, 11 or 12.

When $R^1$ is —$(CH_2)_2$—CH=$CH_2$ or —$(CH_2)_2$—CH=CHCH$_3$ and $R^2$ is $CH_2$=CHCH$_2$— or $CH_3CH$=CHCH$_2$— in formula (1), compound (1) can be prepared by the method described below. Monoalkenyl adduct (34) is obtained by allowing alkenyl bromide (25) to react with diiodoperfluoroalkane (15) under radical-generating conditions. Subsequently, alkanol derivative (36) is obtained by allowing allyl alcohol (27) to react with monoalkenyl adduct (34) under radical-generating conditions, and then reducing derivative (35) by using lithium aluminum hydride or the like. Subsequently, alkylaldehyde derivative (37) is obtained by oxidizing alkanol derivative (36) by using Dess-Martin periodinane or the like, and then alkylaldehyde derivative (37) can be converted into compound (1) by carrying out a Wittig reaction using corresponding phosphonium salt (31).

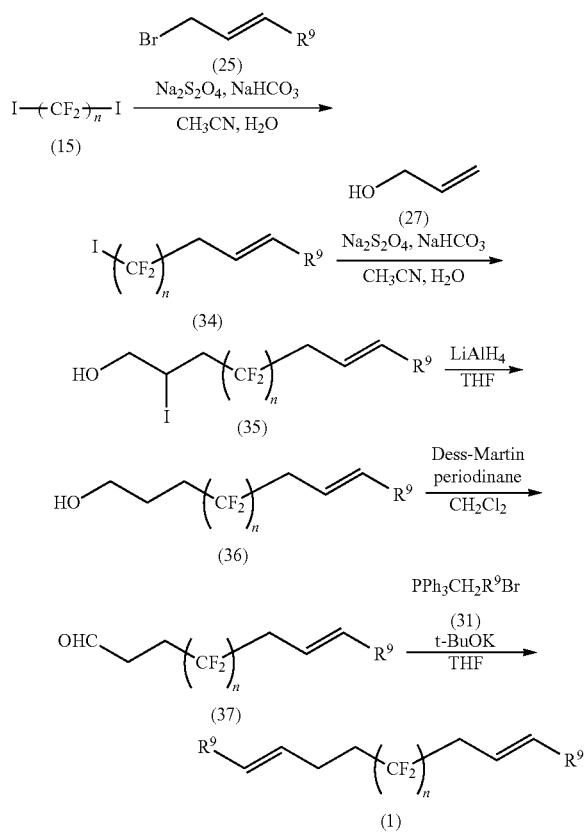

In the formulas, $R^9$ is hydrogen or —$CH_3$, and n is 8, 9, 10, 11 or 12.

When $R^1$ is —$(CH_2)_2$—CH=CHCH$_3$ and $R^2$ is —$(CH_2)_2$—CH=$CH_2$ in formula (1), compound (1) can be prepared by the method described below. Dialkanol derivative (39) is obtained by allowing allyl alcohol (27) to react with diiodoperfluoroalkane (15) under radical-generating conditions, and subsequently reducing derivative (38) by using lithium aluminum hydride or the like. Subsequently, dialkylaldehyde derivative (40) is obtained by oxidizing dialkanol derivative (39) by using Dess-Martin periodinane or the like, and then alkylaldehyde derivative (42) is obtained by carrying out a Wittig reaction using methyltriphenylphosphonium bromide (41). Next, alkylaldehyde derivative (42) can be converted into compound (1) by carrying out a Wittig reaction using ethyltriphenylphosphonium bromide (43).

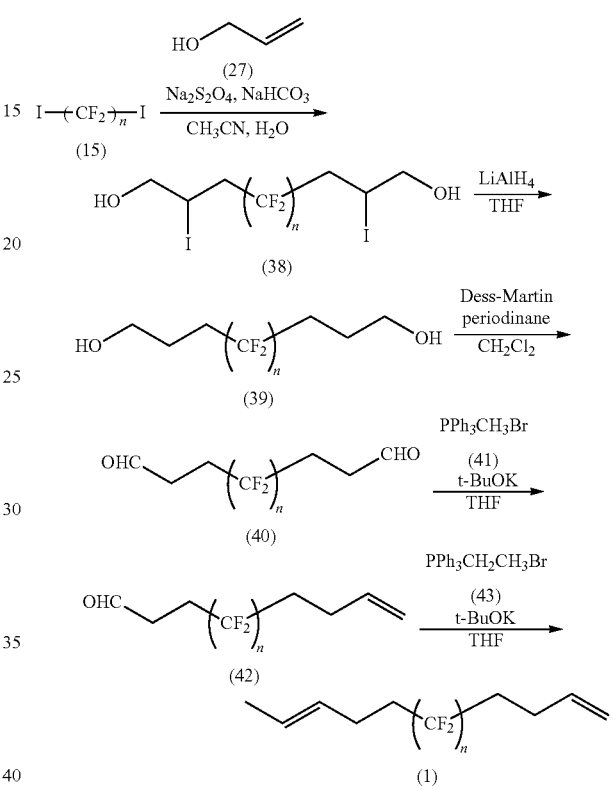

In the formulas, n is 8, 9, 10, 11 or 12.

When $R^1$ is —$(CH_2)_4$—CH=$CH_2$ or —$(CH_2)_4$—CH=CHCH$_3$ and $R^2$ is 1-alkenyl in formula (1), compound (1) can be prepared by the method described below. Alkanol derivative (45) is obtained by allowing 4-penten-1-ol (44) to react with alkenyl derivative (24) in the presence of sodium dithionite and sodium hydrogencarbonate in a DMSO solvent. Subsequently, alkylaldehyde derivative (46) is obtained by oxidizing alkanol derivative (45) by using Dess-Martin periodinane or the like, and then alkylaldehyde derivative (46) can be converted into compound (1) by carrying out a Wittig reaction using corresponding phosphonium salt (31).

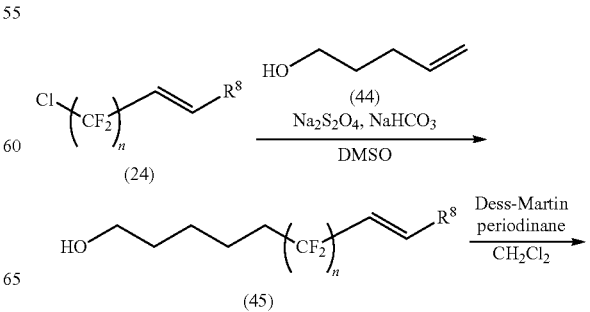

-continued

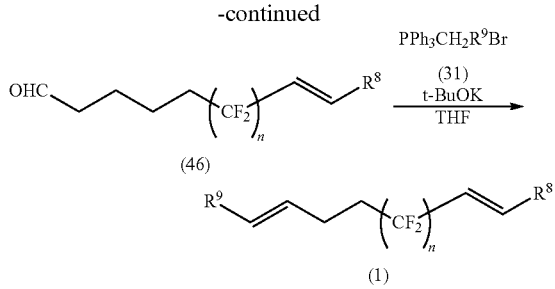

In the formulas, $R^8$ is alkyl having 1 to 13 carbons or hydrogen, $R^9$ is hydrogen or —$CH_3$, and n is 8, 9, 10, 11 or 12.

When $R^1$ is —$(CH_2)_4$—CH=$CH_2$ or —$(CH_2)_4$—CH=CHCH$_3$ and $R^2$ is $CH_2$=CHCH$_2$— or $CH_3$CH=CHCH$_2$— in formula (1), compound (1) can be prepared by the method described below. Monoalkenyl adduct (47) is obtained by allowing alkenyl bromide (25) to react with diiodoperfluoroalkane (15) under radical-generating conditions. Subsequently, alkanol derivative (49) is obtained by allowing 4-penten-1-ol (44) to react with monoalkenyl adduct (47) under radical-generating conditions, and then by reducing derivative (48) by using lithium aluminum hydride or the like. Subsequently, alkylaldehyde derivative (50) is obtained by oxidizing alkanol derivative (49) by using Dess-Martin periodinane or the like, and then alkylaldehyde derivative (50) can be converted into compound (1) by carrying out a Wittig reaction using corresponding phosphonium salt (31).

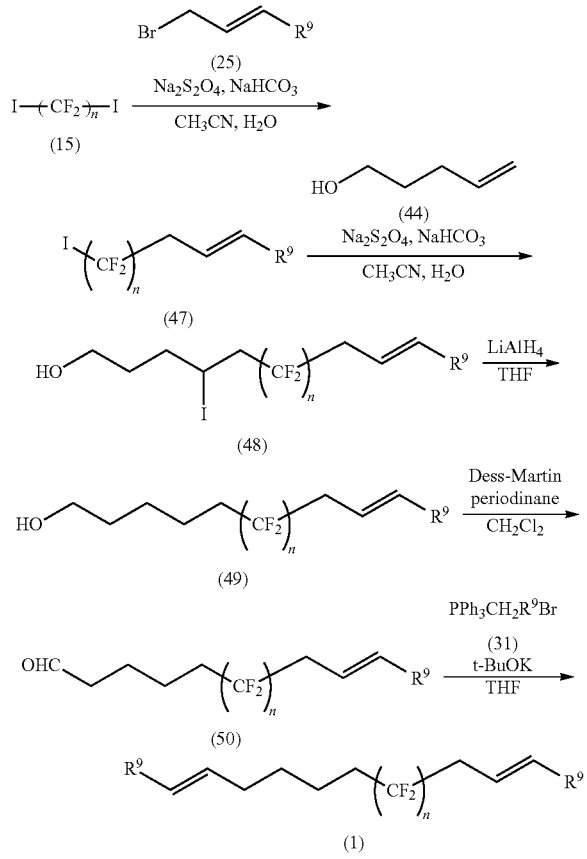

In the formulas, $R^9$ is hydrogen or —$CH_3$, and n is 8, 9, 10, 11 or 12.

Synthesis of Compound (15) and Compound (22) being a Synthetic Raw Material

As for diiodoperfluoroalkane (15) and chloroiodoperfluoroalkane (22) being a synthetic raw material of compound (1), 1,8-diiodoperfluorooctane (15-1) and 1-chloro-8-iodoperfluorooctane (22-1), in which n is 8 in respective formulas, are commercially available. Moreover, a compound having a chain length other than 8 carbons can be prepared by the method described below.

A compound in which n is 10 or 12 in formula (15) can be prepared by the method described below. More specifically, 1,10-diiodoperfluorodecane (15-2) and 1,12-diiodoperfluorododecane (15-3) can be obtained by allowing tetrafluoroethylene (51) to react with compound (15-1) under high temperature and pressurized conditions, and then carrying out fractional distillation. Moreover, 1-chloro-10-iodoperfluorodecane (22-2) and 1-chloro-12-iodoperfluorododecane (22-3) can be obtained by performing a similar operation using compound (22-1).

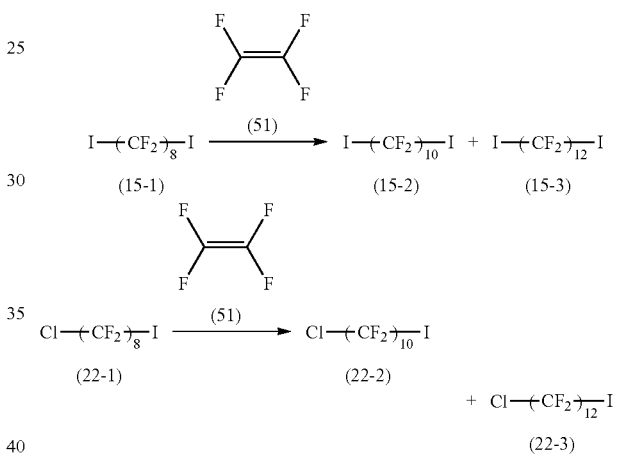

As for a compound in which n is 9 or 11 in formula (15), 1,9-diiodperfluorononane (15-4) or 1,11-diiodperfluoroundecane (15-5) can be obtained by allowing tetrafluoroethylene (51) to react with commercially available 1,3-diiodoperfluoropropane (52) under high temperature and pressurized conditions.

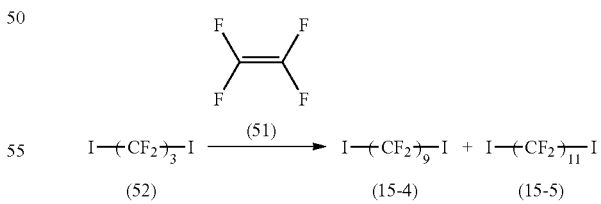

As for a compound in which n is 9 or 11 in formula (22), 1-chloro-9-iodoperfluorononane (22-4) or 1-chloro-11-iodoperfluoroundecane (22-5) can be obtained by allowing iodine monochloride to react with commercially available perfluorocyclopropane (53) at a high temperature to obtain 1-chloro-3-iodoperfluoropropane (54), and then allowing 1-chloro-3-iodoperfluoropropane (54) to react with tetrafluoroethylene (51) under high temperature and pressurized conditions.

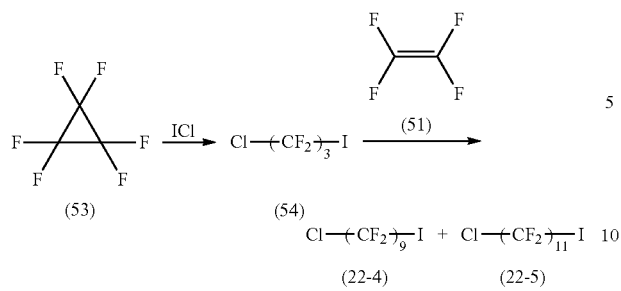

(53) → Cl—(CF₂)₃—I (54) —(51)→

Cl—(CF₂)₉—I + Cl—(CF₂)₁₁—I (22-4)    (22-5)

2. Composition of the Invention

Hereinafter, the liquid crystal composition of the invention will be explained. The component of the liquid crystal composition contains at least one kind of compound (1), and may contain two or more kinds of compound (1). Moreover, when the liquid crystal composition of the invention is prepared, the component can also be selected, for example, in consideration of the viscosity of compound (1). The liquid crystal composition in which the component is suitably selected has a small viscosity, a large dielectric anisotropy, a suitable elastic constant $K_{33}$ and a low threshold voltage, and further has a high maximum temperature of a nematic phase (phase transition temperature between the nematic phase and an isotropic phase) and a low minimum temperature of the nematic phase.

Liquid Crystal Composition (1)

The liquid crystal composition of the invention contains the compound represented by formula (1) of the invention as component A. The liquid crystal composition of the invention may be a composition of only component A, or a composition of component A and any other component whose name is not particularly shown herein. The liquid crystal composition having various characteristics according to the invention can be provided by adding a component selected from the group of components B, C, D and E described below, to component A.

As the component to be added to component A, such a component is preferably mixed as component B including at least one kind compound selected from the group of compounds represented by formulas (2), (3) and (4), and/or component C including at least one kind compound selected from the group of compounds represented by formula (5), and/or component D including at least one kind compound selected from the group of compounds represented by formulas (6), (7), (8), (9), (10) and (11). Furthermore, a threshold voltage, the temperature range of the liquid crystal phase, a refractive index anisotropy, a dielectric anisotropy, the viscosity and so forth can be adjusted by adding component E including at least one kind compound selected from the group of compounds represented by formulas (12), (13) and (14).

Moreover, each component of the liquid crystal composition used in the invention has no significant difference in physical characteristics even if each component is an analog including an isotopic element of each element.

Among types of component B described above, suitable examples of compounds represented by formula (2) include compounds represented by formula (2-1) to formula (2-16), suitable examples of compounds represented by formula (3) include compounds represented by formula (3-1) to formula (3-112), and suitable examples of compounds represented by formula (4) include compounds represented by formula (4-1) to formula (4-54).

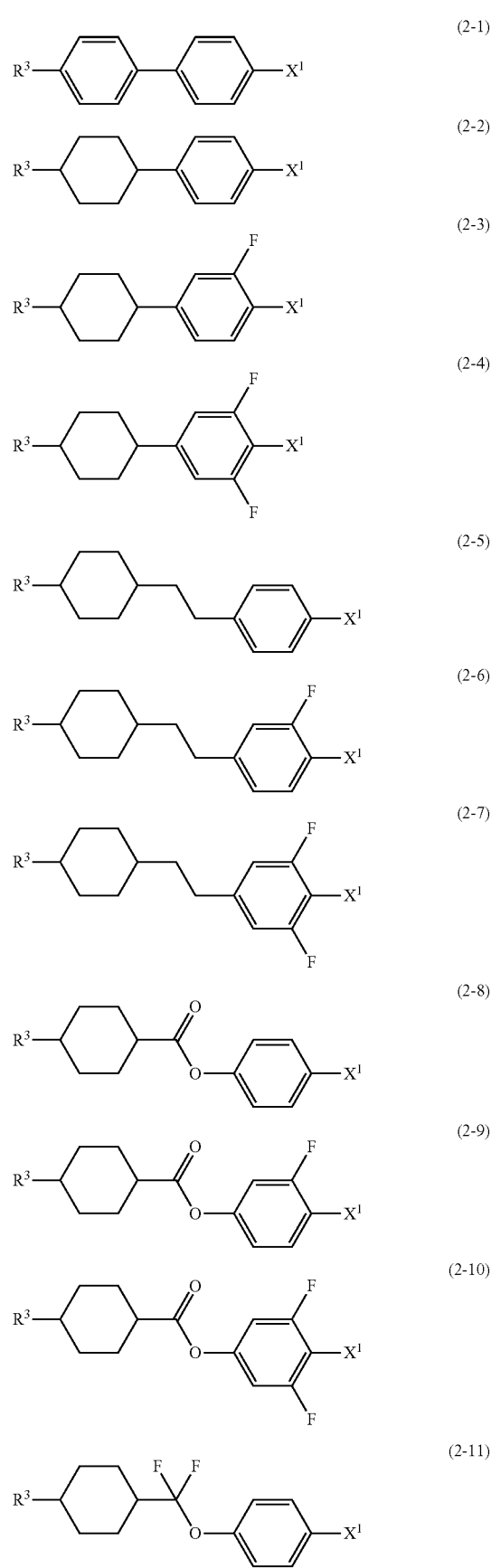

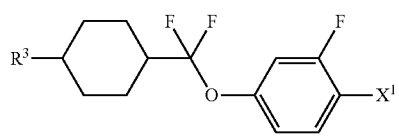 (2-12)
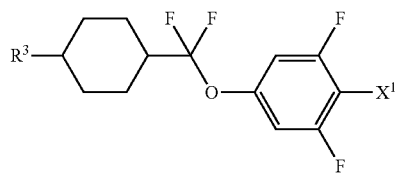 (2-13)
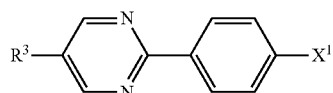 (2-14)
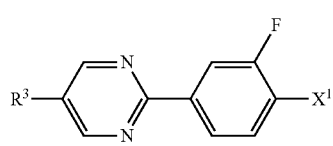 (2-15)
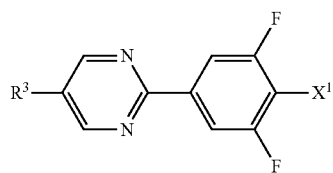 (2-16)
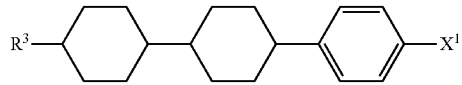 (3-1)
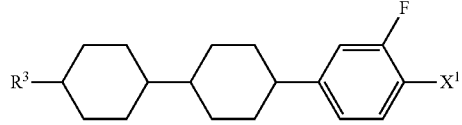 (3-2)
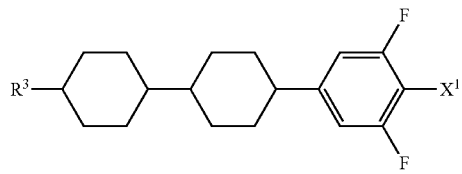 (3-3)
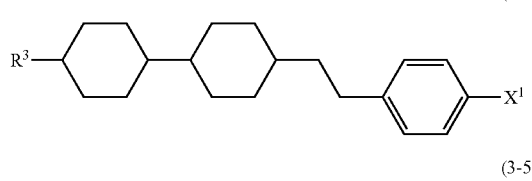 (3-4)
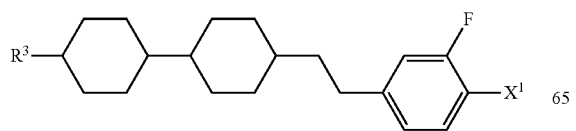 (3-5)
 (3-6)
 (3-7)
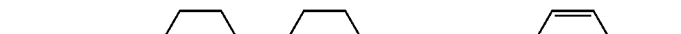 (3-8)
 (3-9)
 (3-10)
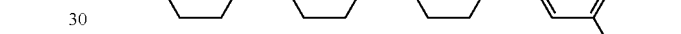 (3-11)
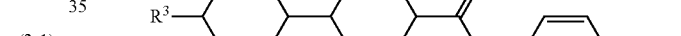 (3-12)
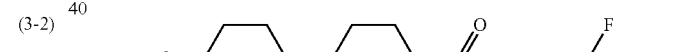 (3-13)
 (3-14)

(3-15) 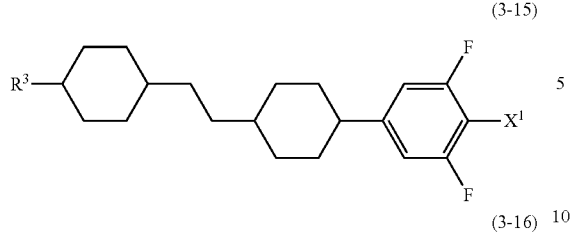
(3-16) 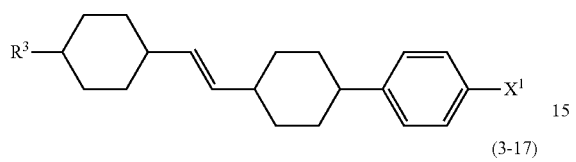
(3-17) 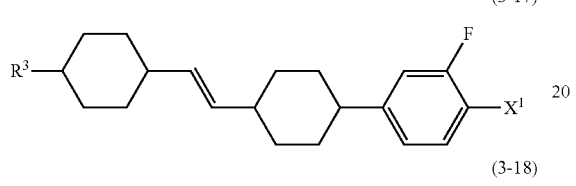
(3-18) 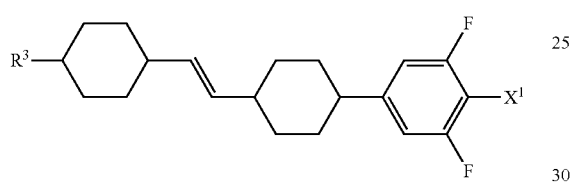
(3-19) 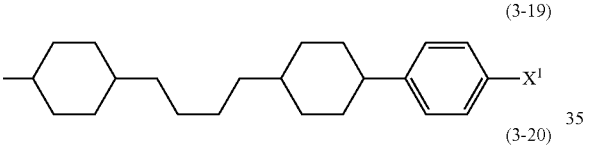
(3-20) 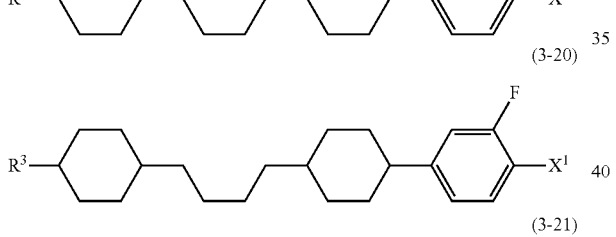
(3-21) 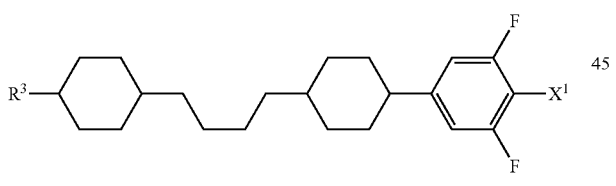
(3-22) 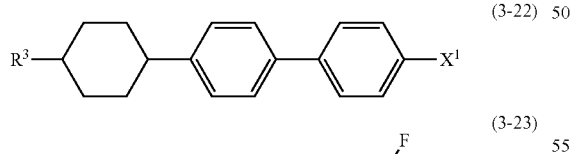
(3-23) 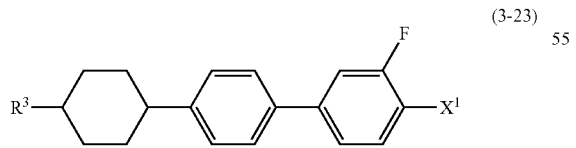
(3-24) 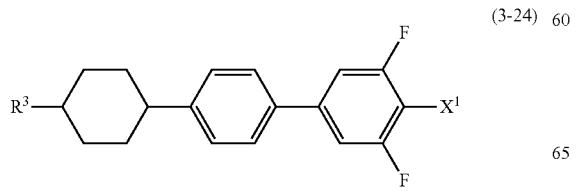
(3-25) 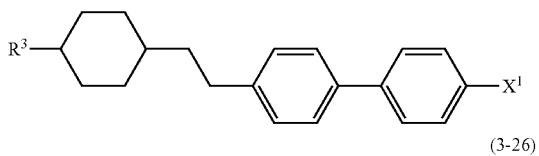
(3-26) 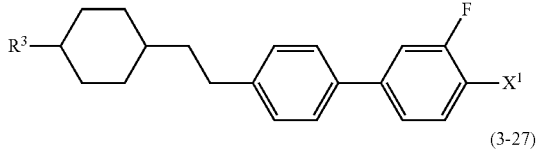
(3-27) 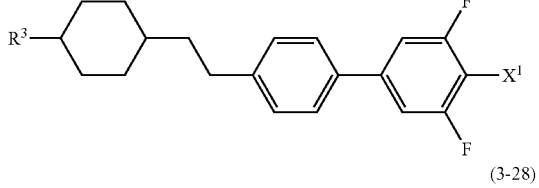
(3-28) 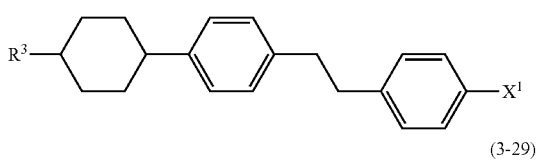
(3-29) 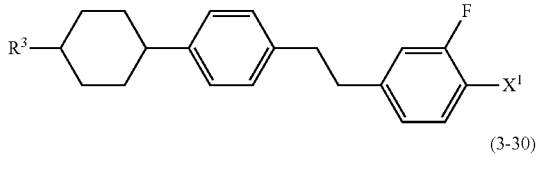
(3-30) 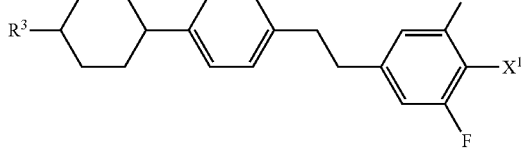
(3-31) 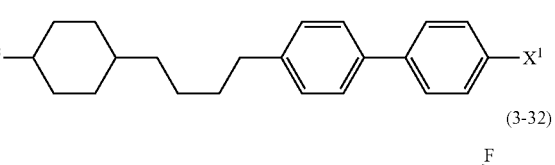
(3-32) 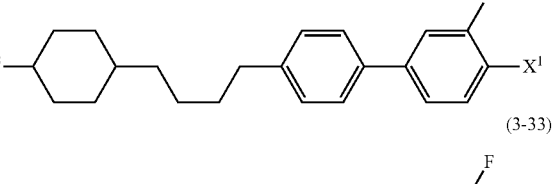
(3-33) 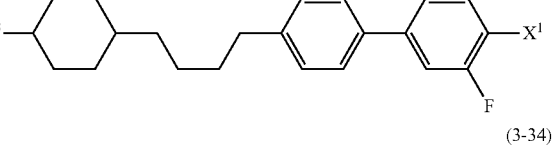
(3-34) 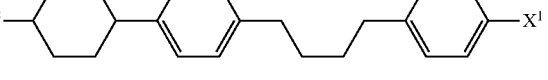

(3-35) 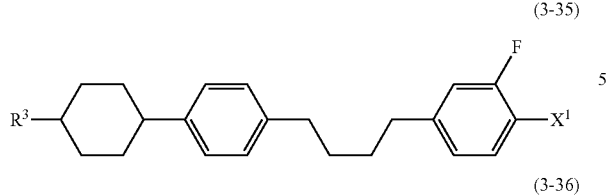
(3-36) 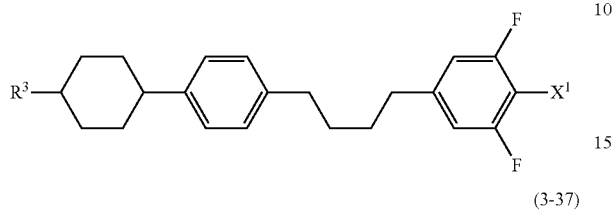
(3-37) 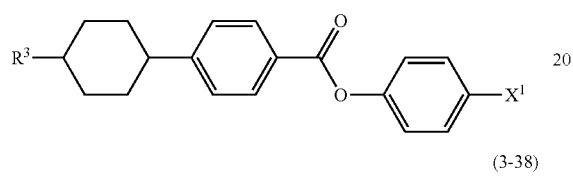
(3-38) 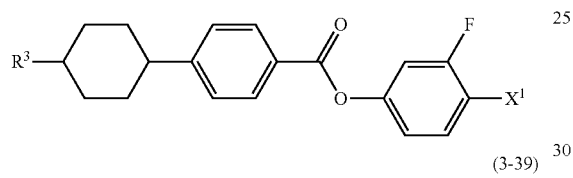
(3-39) 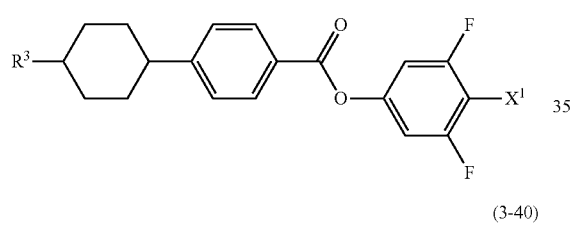
(3-40) 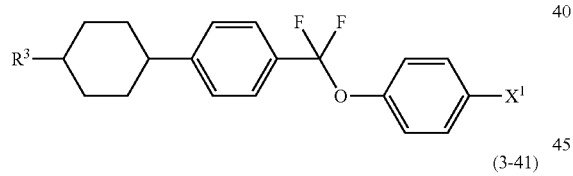
(3-41) 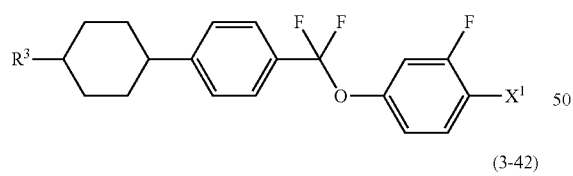
(3-42) 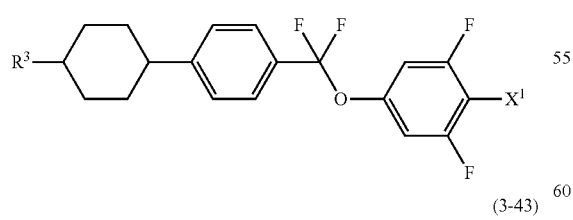
(3-43) 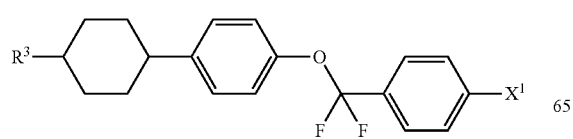
(3-44) 
(3-45) 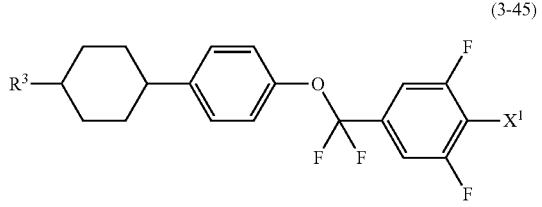
(3-46) 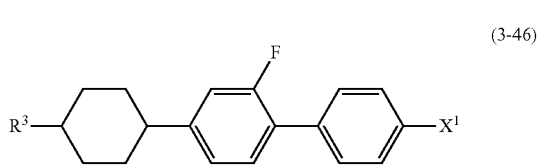
(3-47) 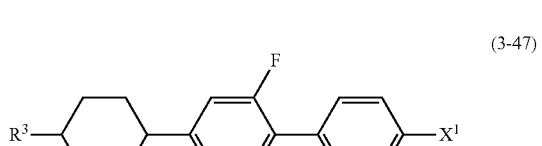
(3-48) 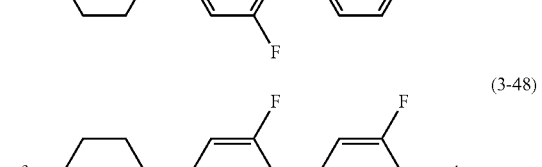
(3-49) 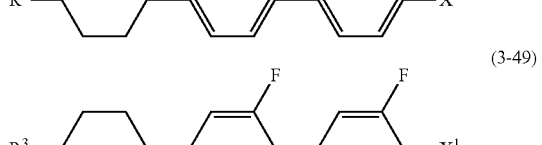
(3-50) 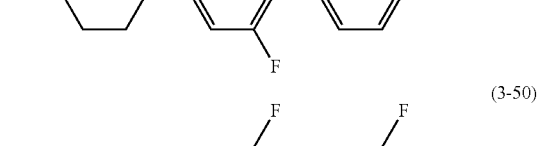
(3-51) 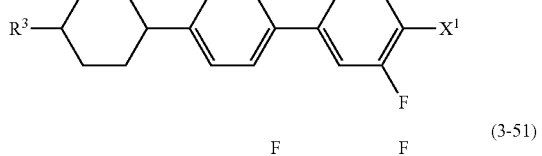
(3-52) 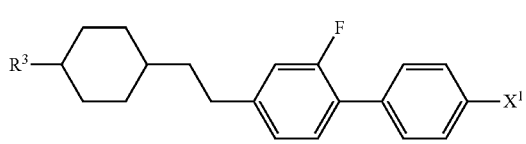

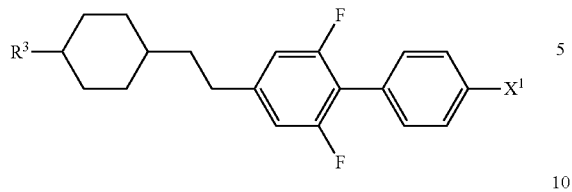
(3-53)
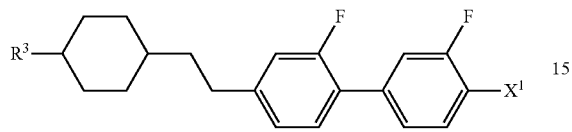
(3-54)
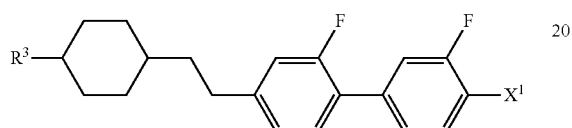
(3-55)
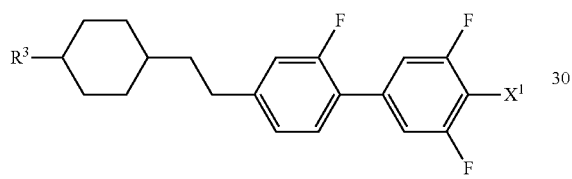
(3-56)
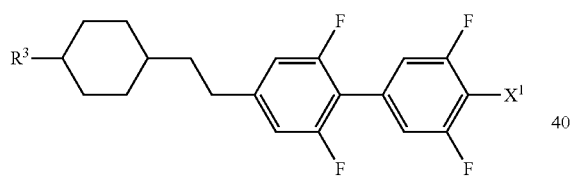
(3-57)
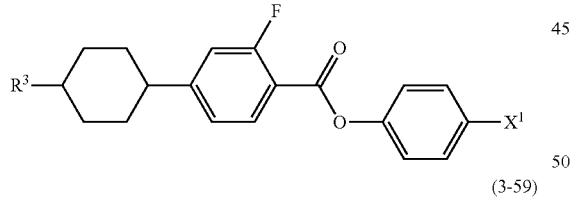
(3-58)
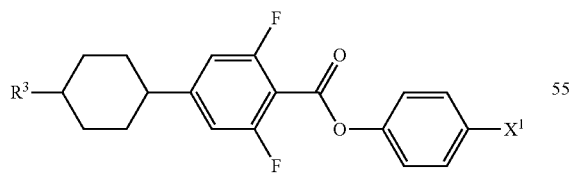
(3-59)
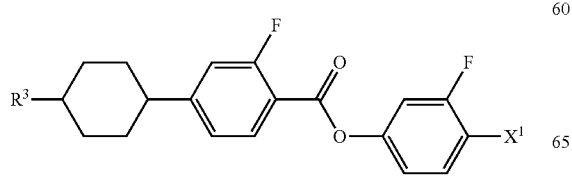
(3-60)
(3-61)
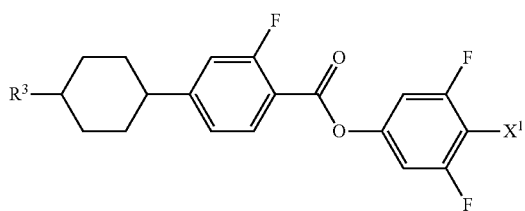
(3-62)
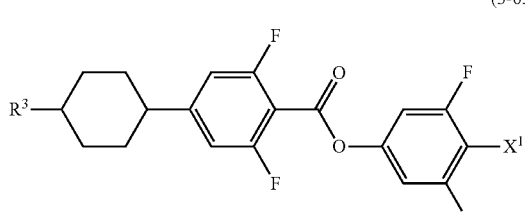
(3-63)
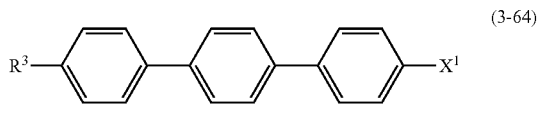
(3-64)
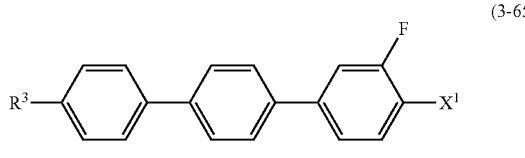
(3-65)
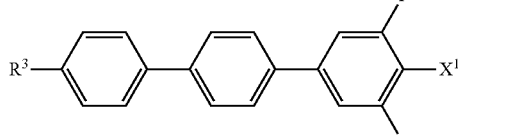
(3-66)
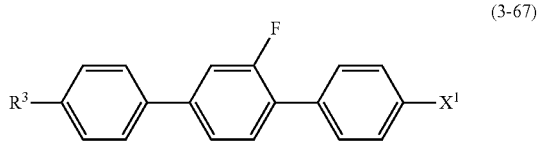
(3-67)
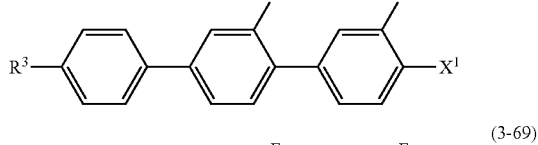
(3-68)
(3-69)

(3-70) 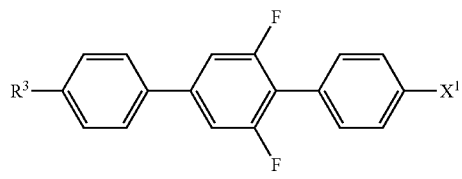
(3-71) 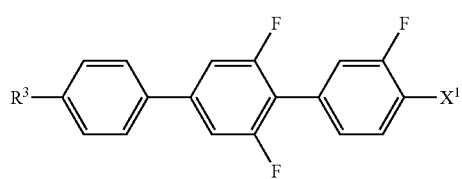
(3-72) 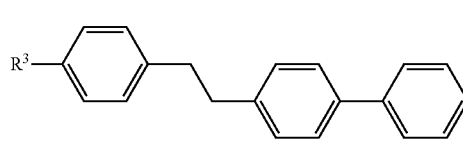
(3-73) 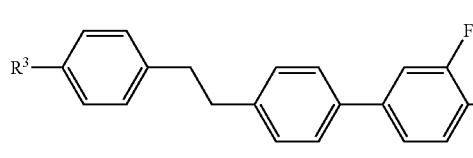
(3-74) 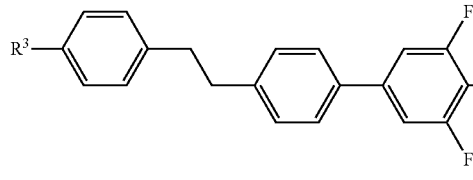
(3-75) 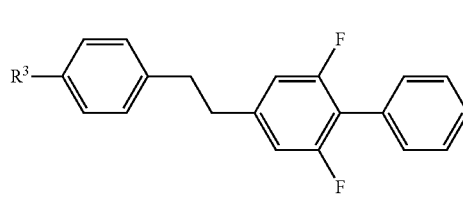
(3-76) 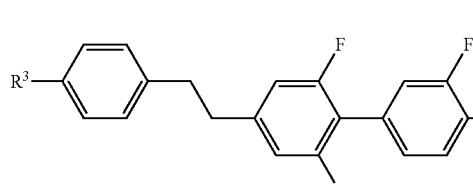
(3-77) 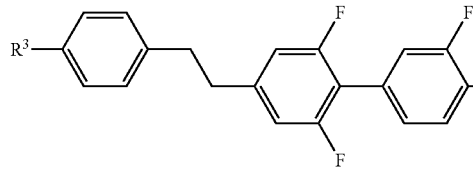
(3-78) 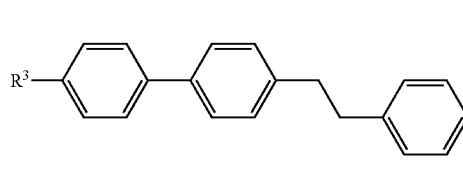
(3-79) 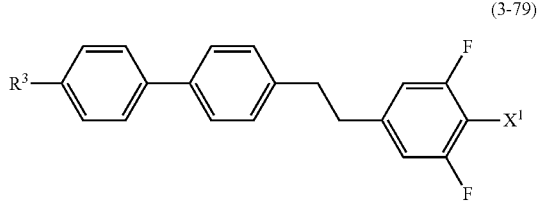
(3-80) 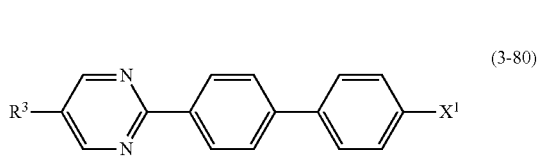
(3-81) 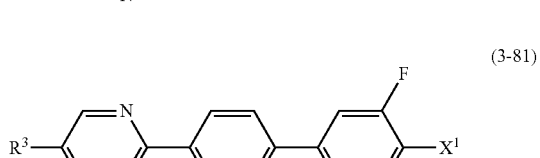
(3-82) 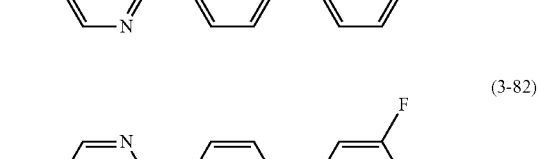
(3-83) 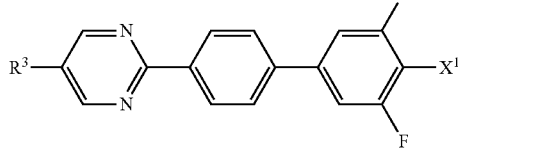
(3-84) 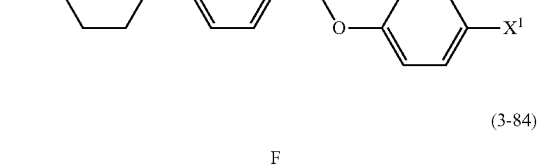
(3-85) 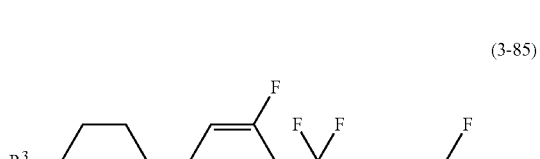
(3-86) 

(3-87)
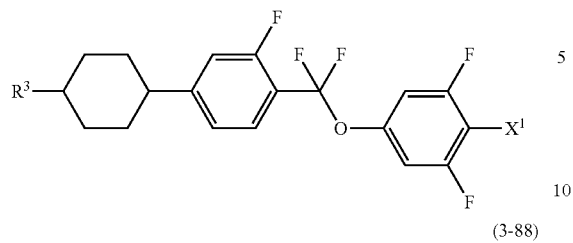
(3-88)
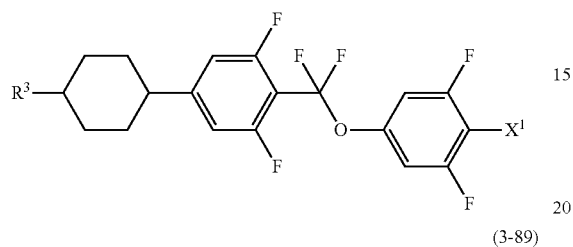
(3-89)
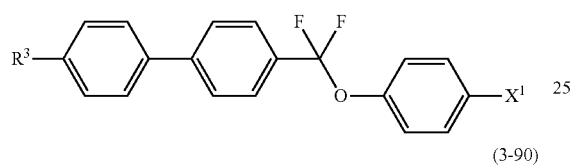
(3-90)
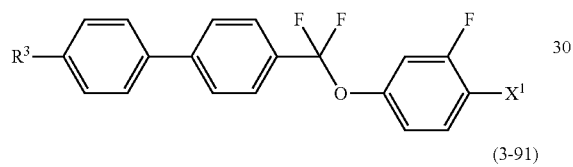
(3-91)
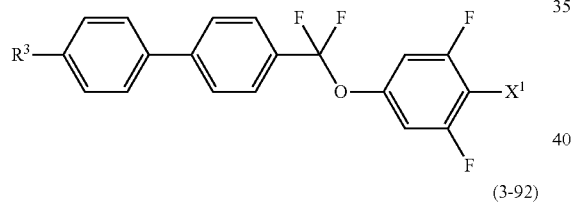
(3-92)
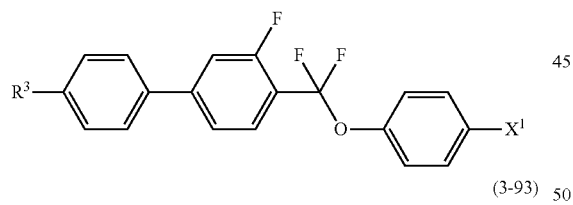
(3-93)
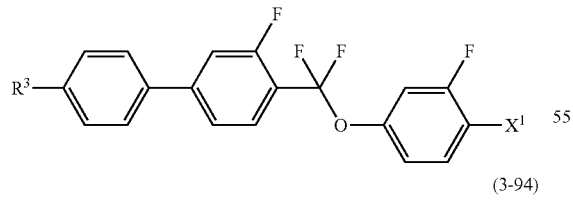
(3-94)
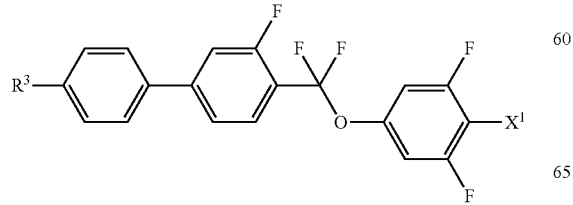
(3-95)
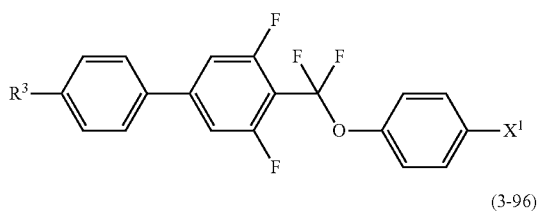
(3-96)
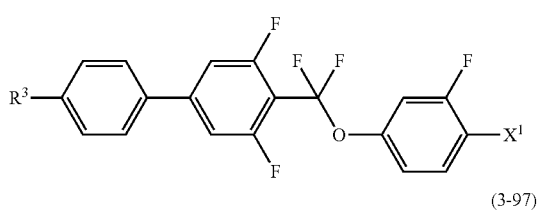
(3-97)
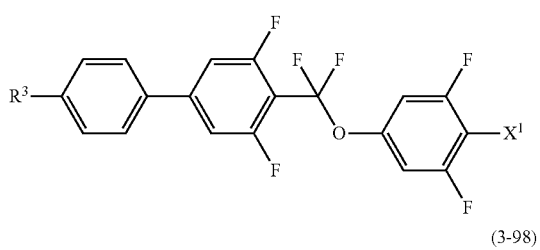
(3-98)
(3-99)
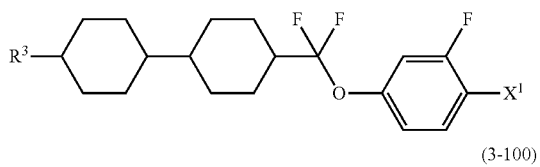
(3-100)
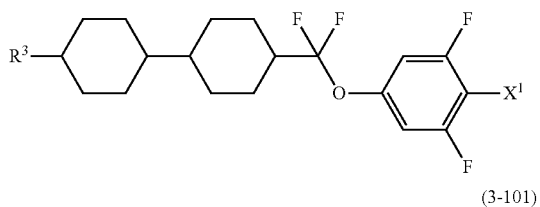
(3-101)
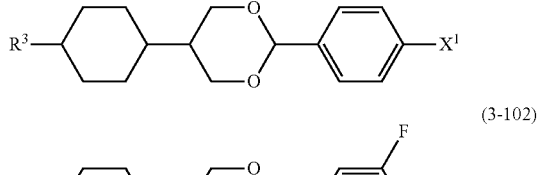
(3-102)
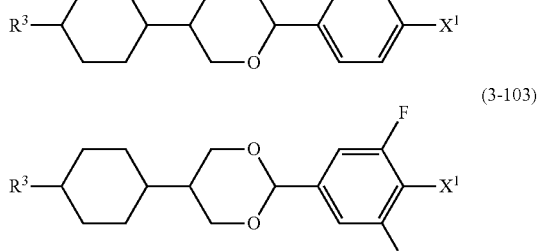
(3-103)

(3-104) 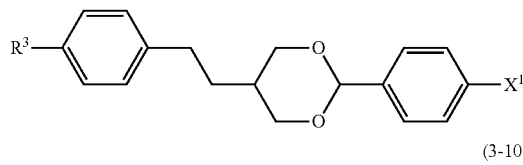
(3-105) 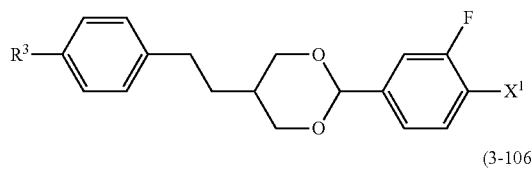
(3-106) 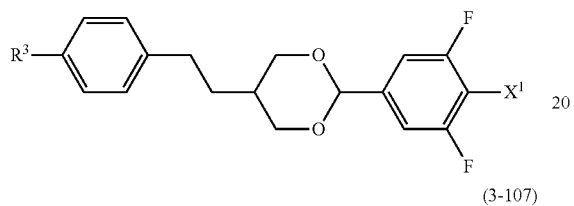
(3-107) 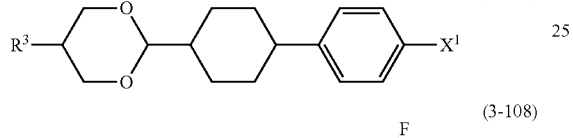
(3-108) 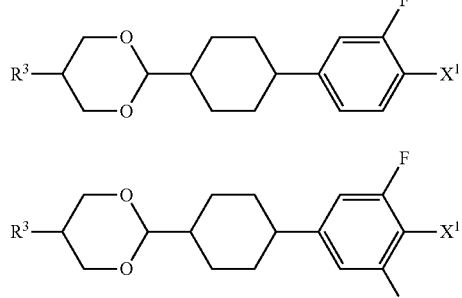
(3-109) 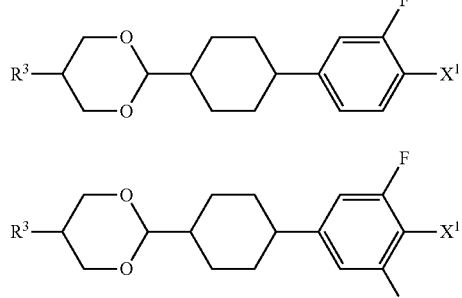
(3-110) 
(3-111) 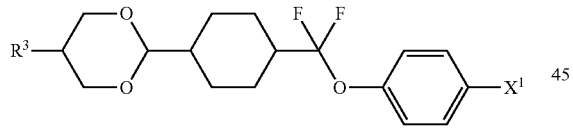
(3-112) 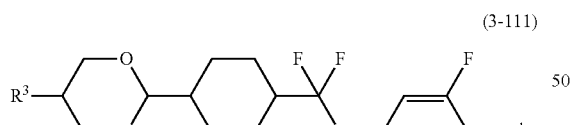
(4-1) 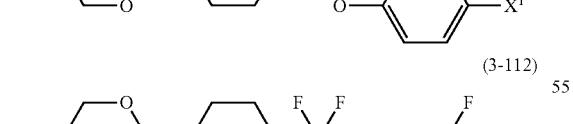
(4-2) 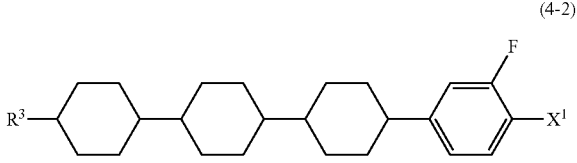
(4-3) 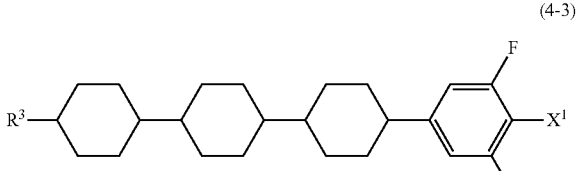
(4-4) 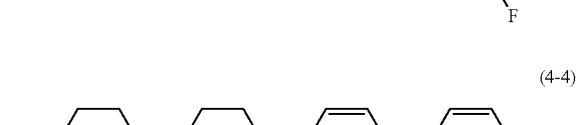
(4-5) 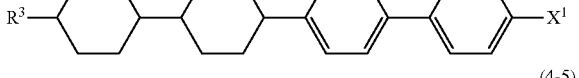
(4-6) 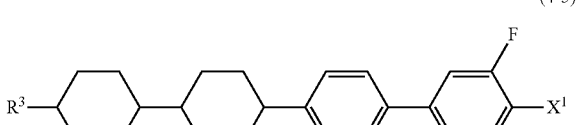
(4-7) 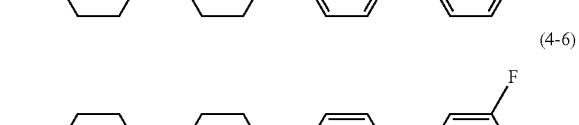
(4-8) 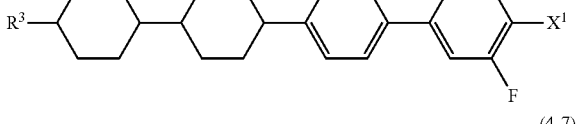
(4-9) 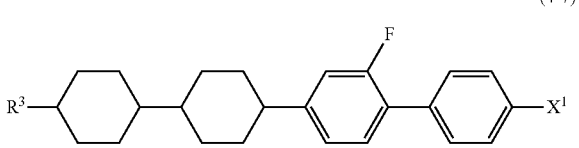
(4-10) 

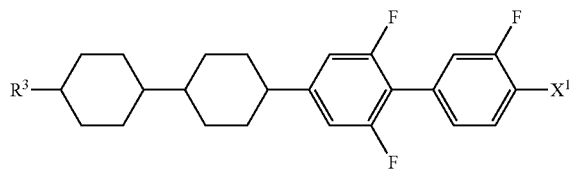 (4-11)
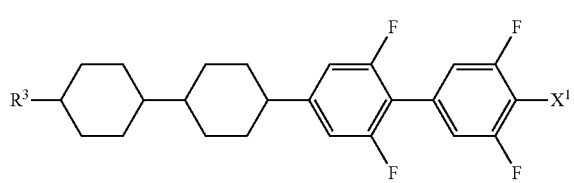 (4-12)
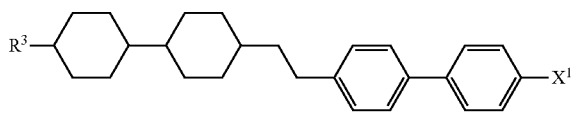 (4-13)
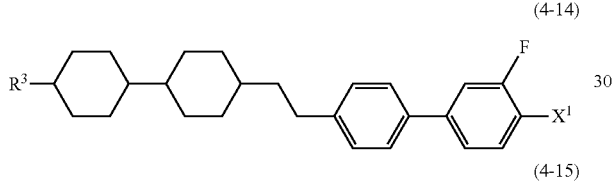 (4-14)
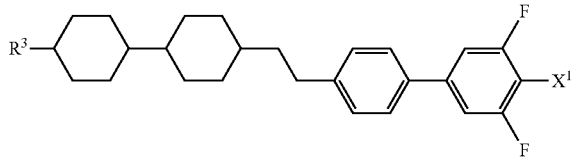 (4-15)
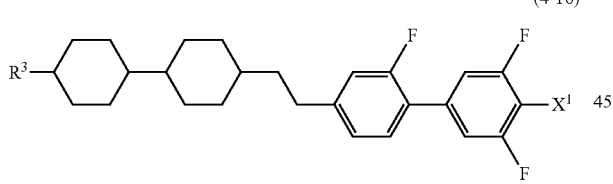 (4-16)
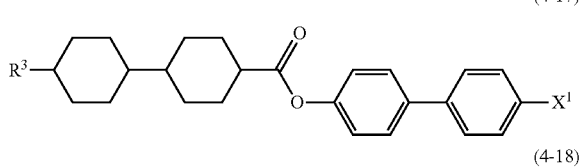 (4-17)
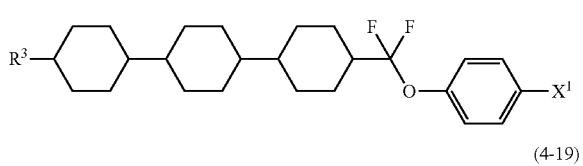 (4-18)
(4-19)
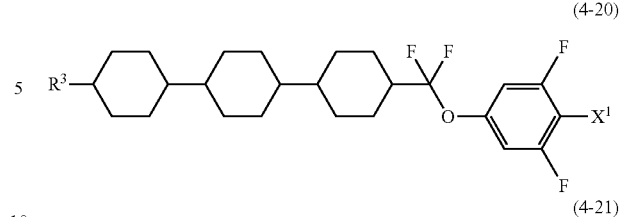 (4-20)
(4-21)
(4-22)
(4-23)
(4-24)
(4-25)
(4-26)
(4-27)
(4-28)

-continued
(4-29)
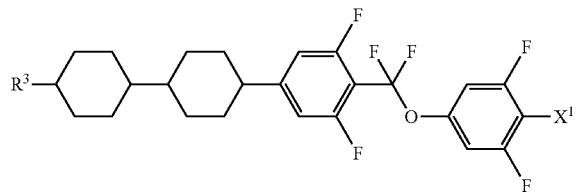
(4-30)
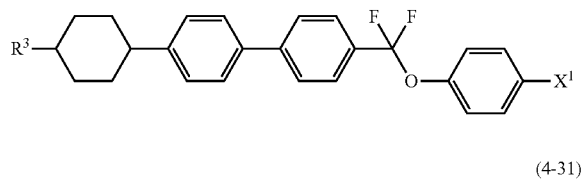
(4-31)
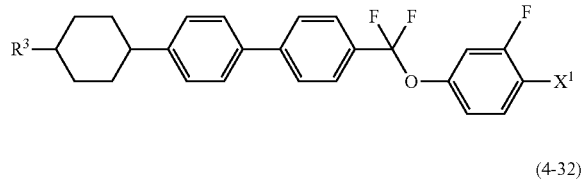
(4-32)
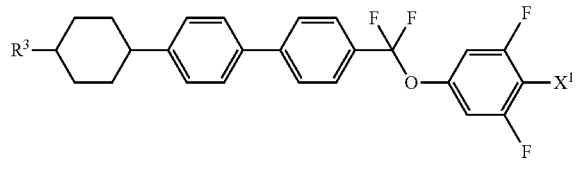
(4-33)
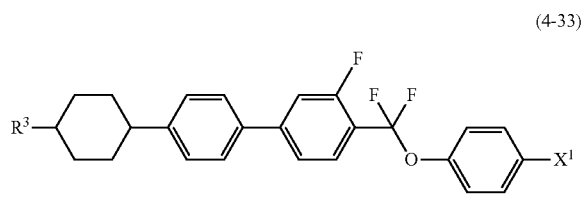
(4-34)
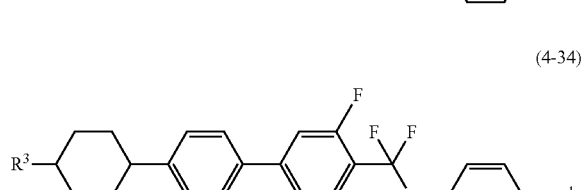
(4-35)
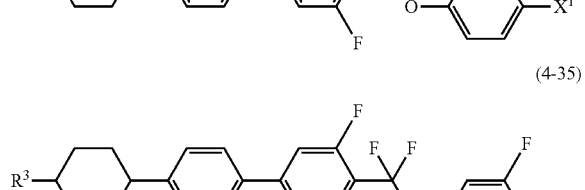
(4-36)
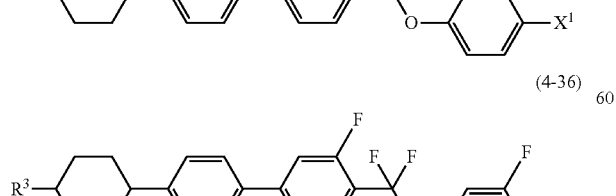
-continued
(4-37)
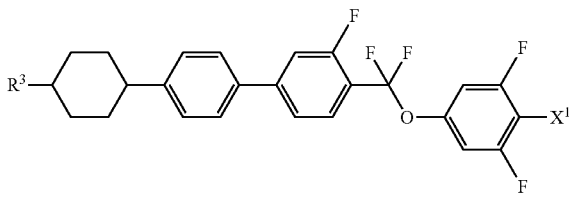
(4-38)
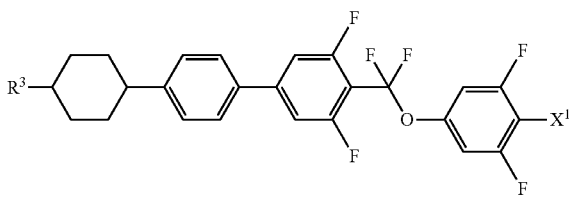
(4-39)
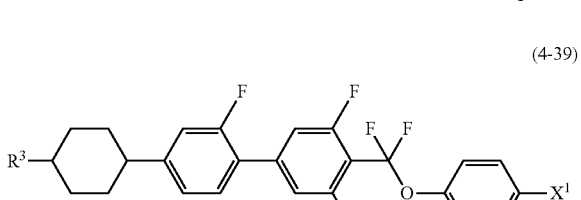
(4-40)
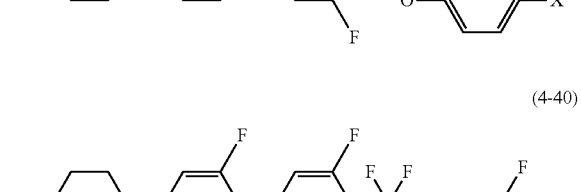
(4-41)
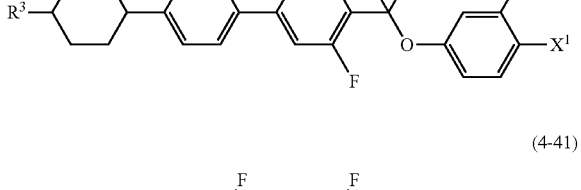
(4-42)
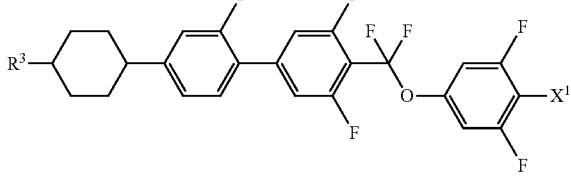
(4-43)
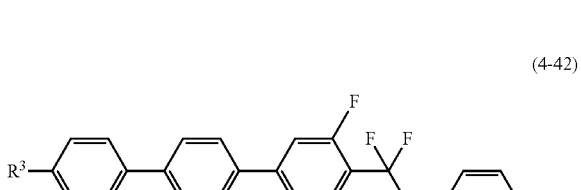

(4-44)
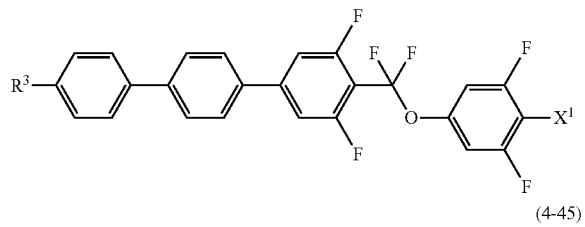

(4-45)
(4-46)
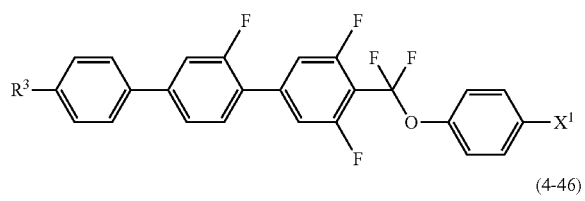

(4-47)
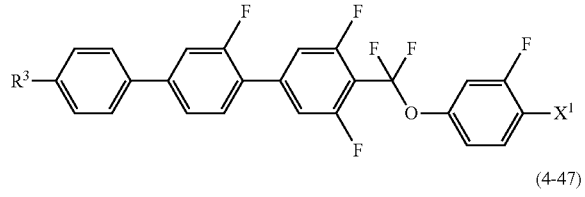

(4-48)
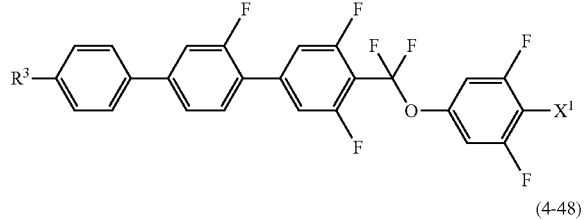

(4-49)
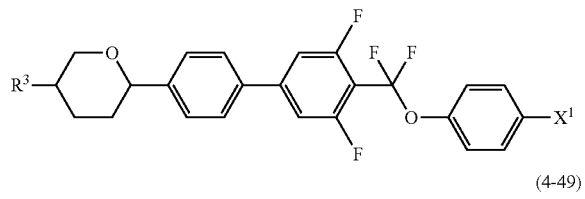

(4-50)
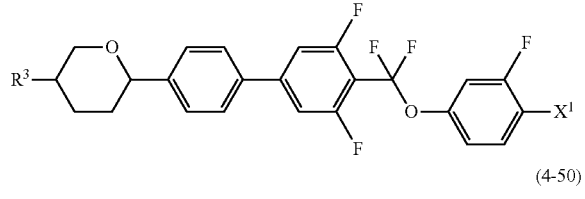

(4-51)
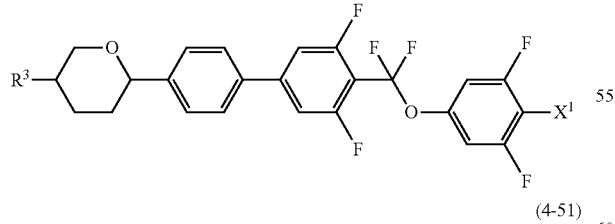

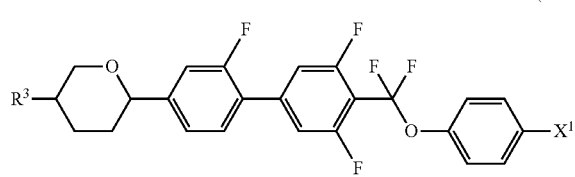

(4-52)
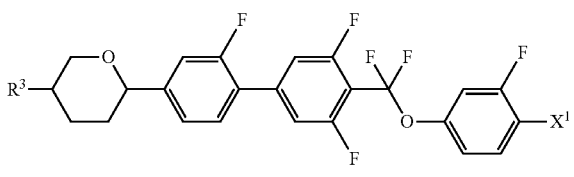

(4-53)
(4-54)
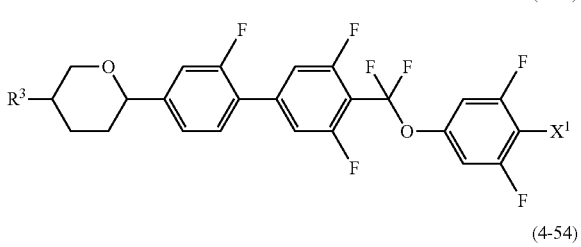

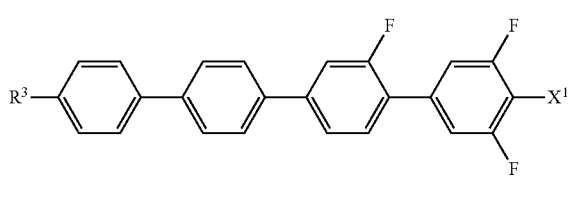

In the formulas, $R^3$ and $X^1$ are defined in a manner identical with the definition described above.

The compounds represented by formulas (2), (3) and (4), namely, component B, have a positive dielectric anisotropy and a superior thermal stability and chemical stability, and therefore are used in preparing a liquid crystal composition for use in TFT and PSA modes. The content of component B in the liquid crystal composition of the invention is suitably in the range of approximately 1% by weight to approximately 99% by weight, preferably, in the range of approximately 10% by weight to approximately 97% by weight, further preferably, in the range of approximately 40% by weight to approximately 95% by weight, based on the total weight of the liquid crystal composition. Moreover, the viscosity can be adjusted by further containing the compounds represented by formula (12), (13) and (14) (component E).

In formula (5), two of ring $C^2$ when o is 2 may be identical or different. Suitable examples of compounds represented by formula (5), namely, component C, include compounds represented by formula (5-1) to formula (5-64).

(5-1)
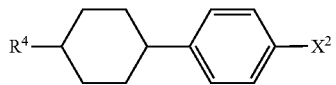

(5-2)

(5-3)
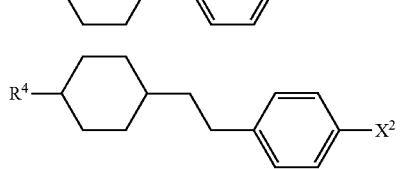

-continued
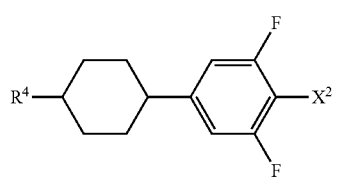 (5-4)
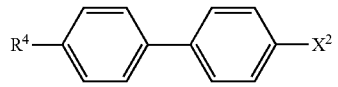 (5-5)
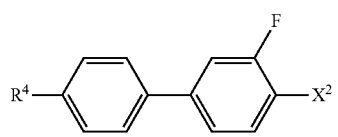 (5-6)
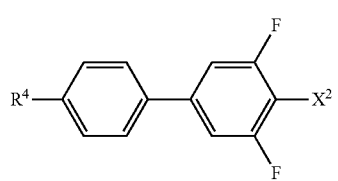 (5-7)
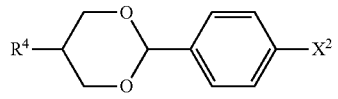 (5-8)
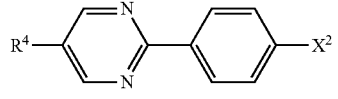 (5-9)
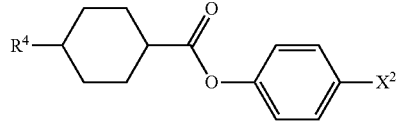 (5-10)
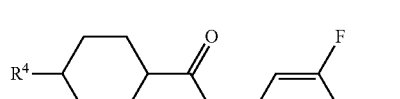 (5-11)
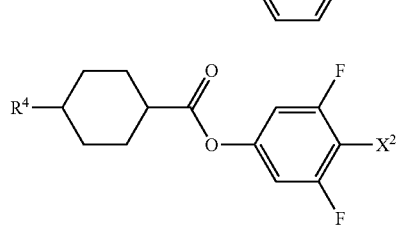 (5-12)
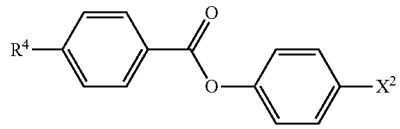 (5-13)
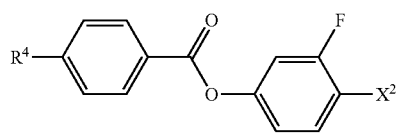 (5-14)
-continued
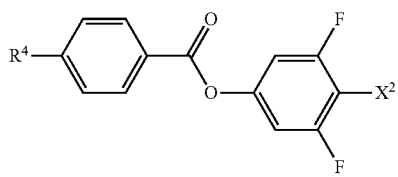 (5-15)
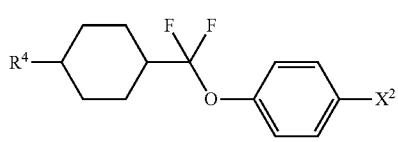 (5-16)
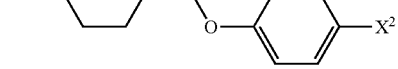 (5-17)
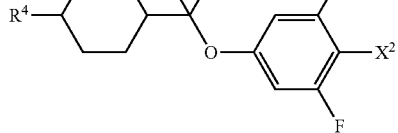 (5-18)
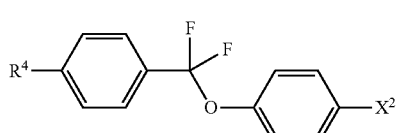 (5-19)
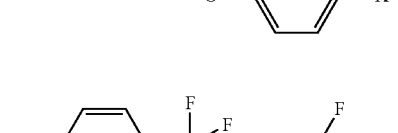 (5-20)
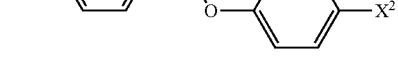 (5-21)
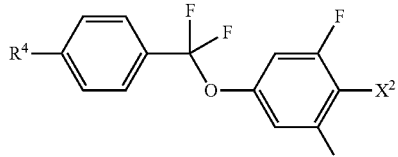 (5-22)
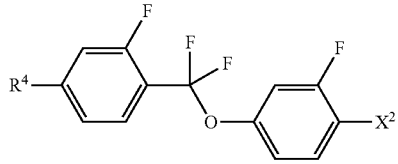 (5-23)

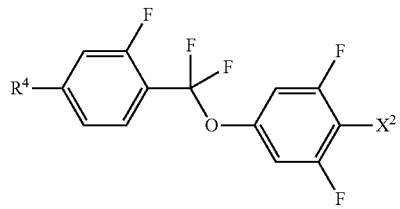 (5-24)
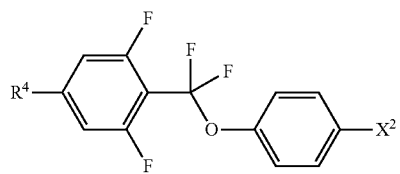 (5-25)
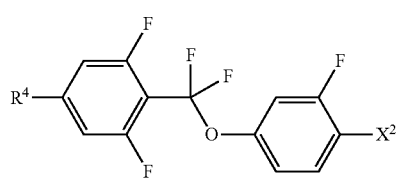 (5-26)
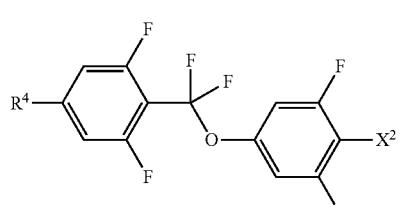 (5-27)
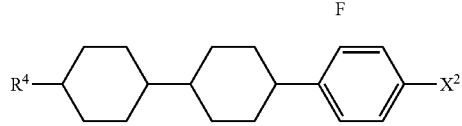 (5-28)
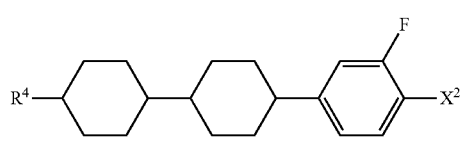 (5-29)
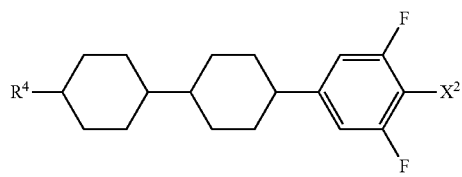 (5-30)
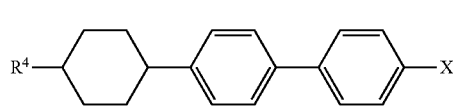 (5-31)
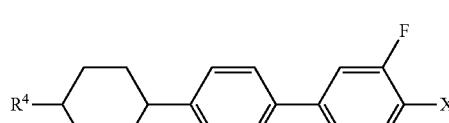 (5-32)
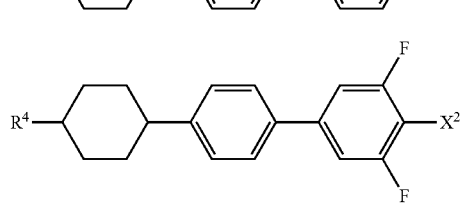 (5-33)
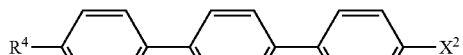 (5-34)
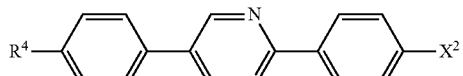 (5-35)
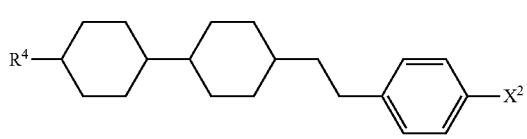 (5-36)
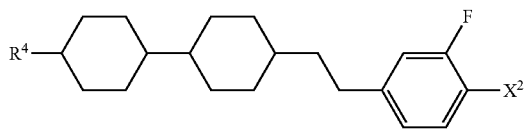 (5-37)
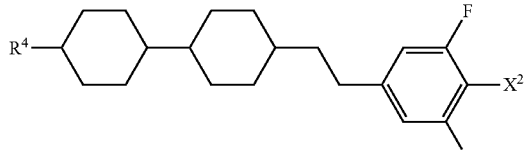 (5-38)
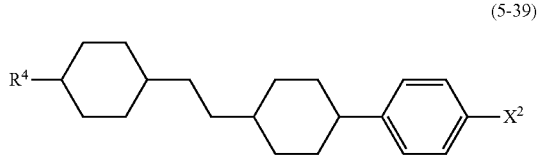 (5-39)
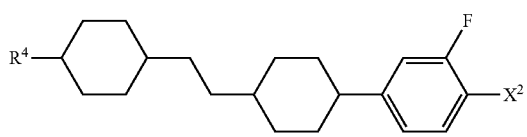 (5-40)
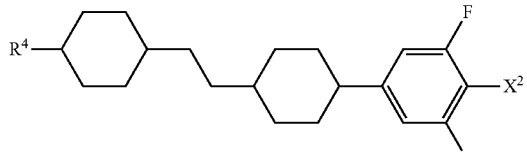 (5-41)
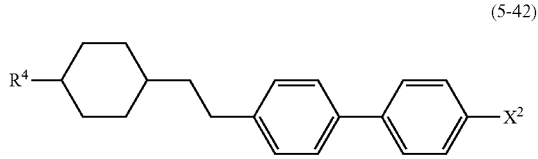 (5-42)
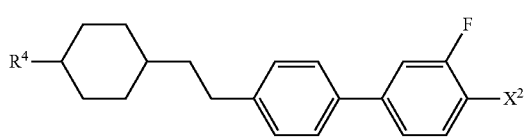 (5-43)

(5-44)
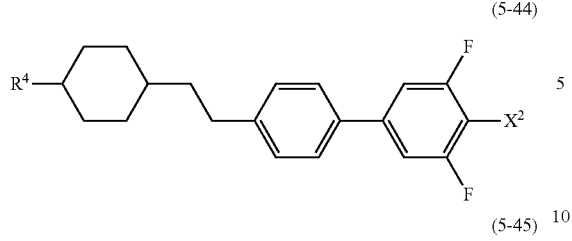
(5-45)
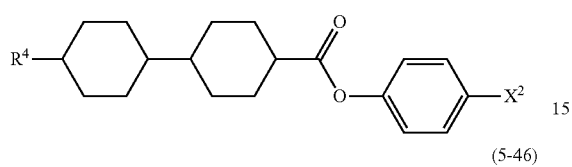
(5-46)
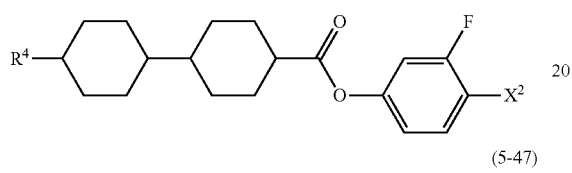
(5-47)
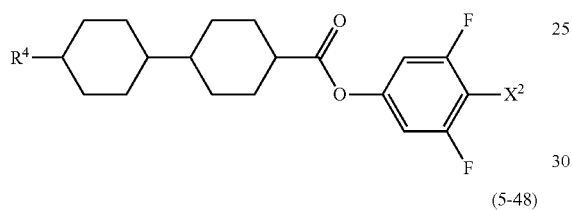
(5-48)
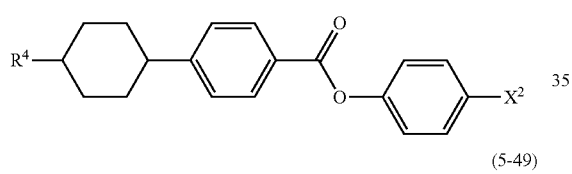
(5-49)
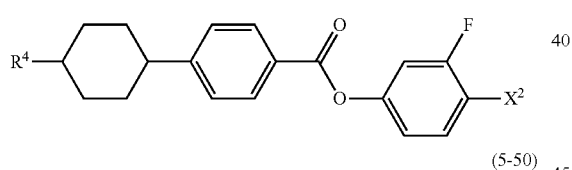
(5-50)
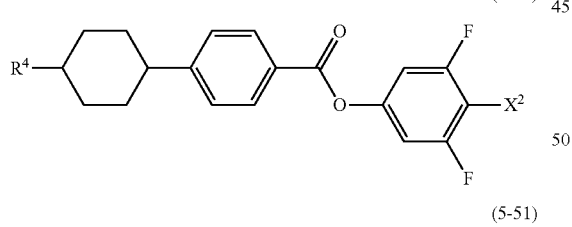
(5-51)
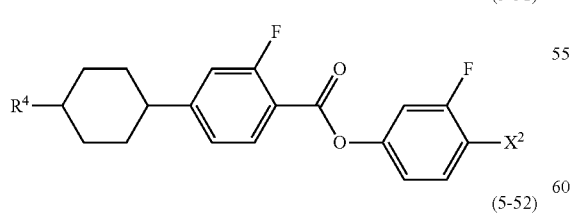
(5-52)
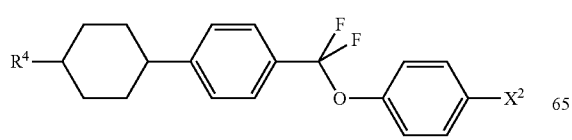
(5-53)
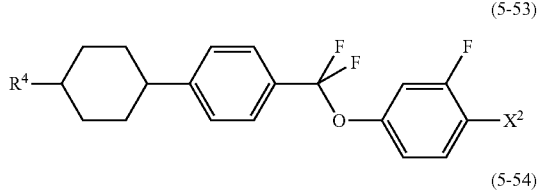
(5-54)
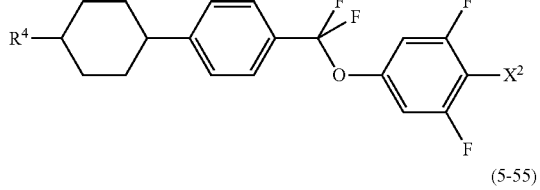
(5-55)
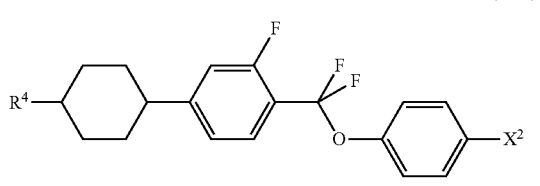
(5-56)
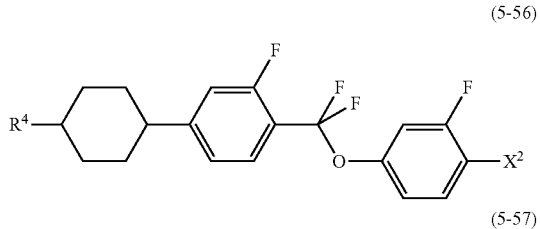
(5-57)
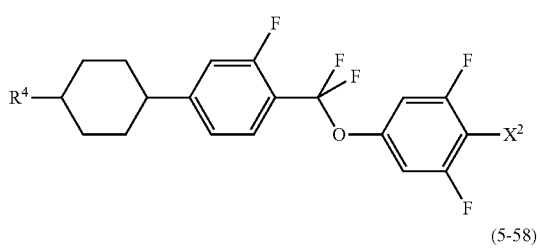
(5-58)
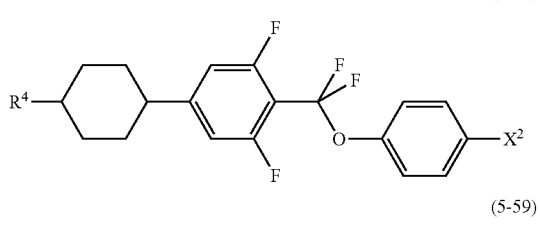
(5-59)
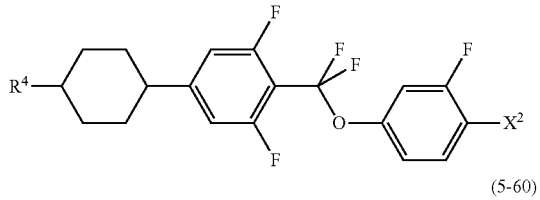
(5-60)
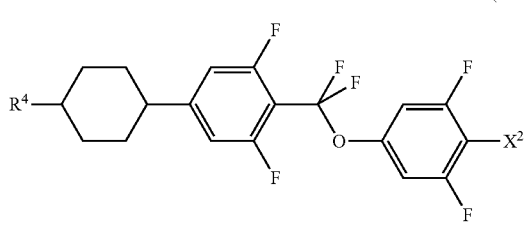

-continued (5-61)
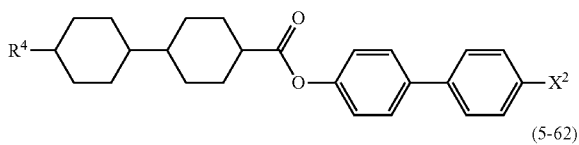

(5-62)
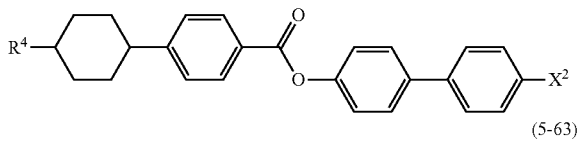

(5-63)
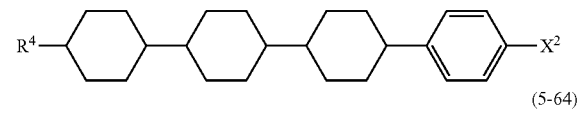

(5-64)
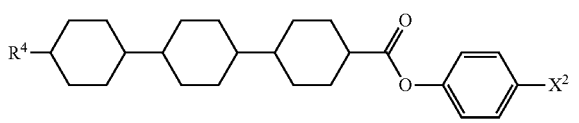

In the formulas, $R^4$ and $X^2$ are defined in a manner identical with the definition described above.

The compounds represented by formula (5), namely, component C, have a very large positive dielectric anisotropy, and therefore are mainly used in preparing a liquid crystal composition for use in a STN mode, TN mode or PSA mode. The threshold voltage of the composition can be decreased by containing component C in the composition. Moreover, the viscosity and the refractive index anisotropy can be adjusted, and the temperature range of the liquid crystal phase can be extended. Furthermore, component C can also be used for improvement of steepness.

In preparing the liquid crystal composition for use in the STN or the TN mode, the content of component C is applied in the range of approximately 0.1% by weight to approximately 99.9% by weight, preferably, in the range of approximately 10% by weight to approximately 97% by weight, further preferably, in the range of approximately 40% by weight to approximately 95% by weight. Moreover, the threshold voltage, the temperature range of the liquid crystal phase, the refractive index anisotropy, the dielectric anisotropy, the viscosity and so forth can be adjusted by mixing the component described later.

As the component to be added to component A, such a component is preferably mixed as component D including at least one kind compound selected from the group of compounds represented by formulas (6), (7), (8), (9), (10) and (11). Moreover, the threshold voltage, the temperature range of the liquid crystal phase, the refractive index anisotropy, the dielectric anisotropy, the viscosity and so forth can be adjusted by mixing component E including at least of one kind compound selected from the group of compounds represented by formulas (12), (13) and (14).

Component D including at least one kind compound selected from the group of compounds represented by formulas (6), (7), (8), (9), (10) and (11), respectively, is preferred in preparing a liquid crystal composition that has a negative dielectric anisotropy and is used in a device having the vertical alignment mode (VA mode), the polymer sustained alignment mode (PSA mode) or the like according to the invention.

Moreover, each component of the liquid crystal composition used in the invention has no significant difference in physical characteristics even if each component is an analog including an isotopic element of each element.

Suitable examples of compounds represented by formulas (6), (7), (8), (9), (10) and (11) include compounds represented by formula (6-1) to formula (6-6), formula (7-1) to formula (7-15), formula (8-1), formula (9-1) to formula (9-3), formula (10-1) to formula (10-11) and formula (11-1) to formula (11-10).

(6-1)
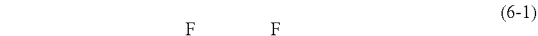

(6-2)

(6-3)

(6-4)

(6-5)
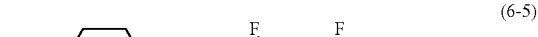

(6-6)

(7-1)

(7-2)

(7-3)

(7-4)

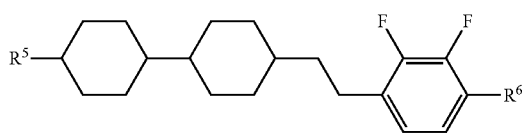

(7-5) 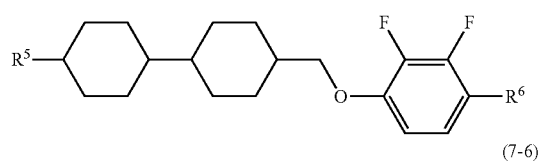
(7-6) 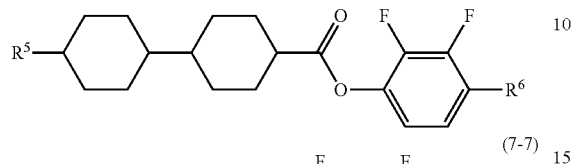
(7-7) 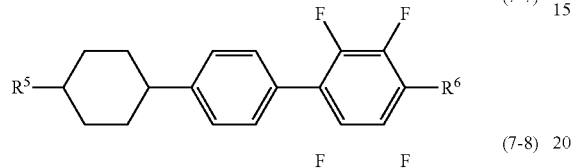
(7-8) 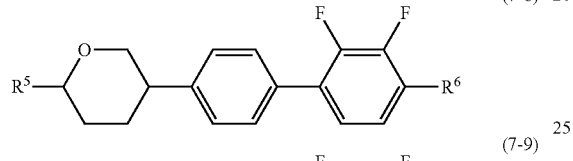
(7-9) 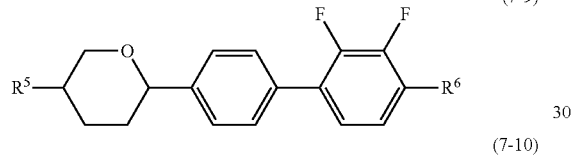
(7-10) 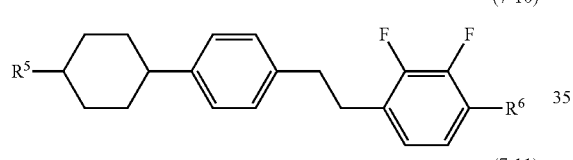
(7-11) 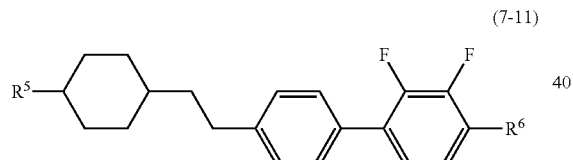
(7-12) 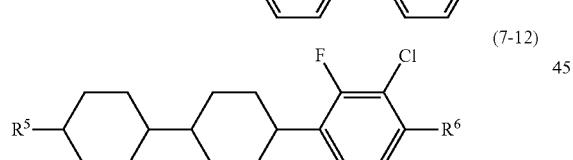
(7-13) 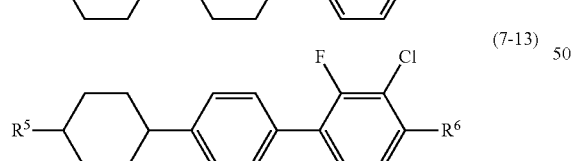
(7-14) 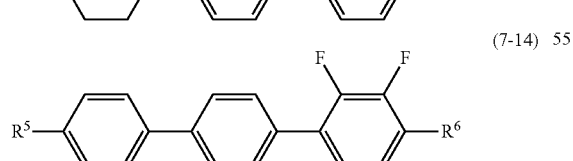
(7-15) 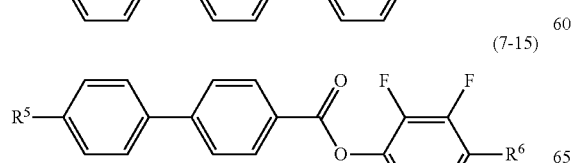
(8-1) 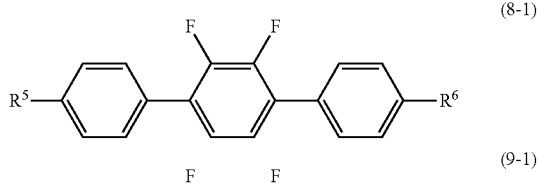
(9-1) 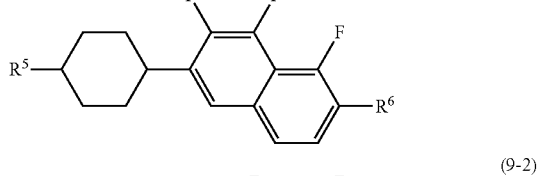
(9-2) 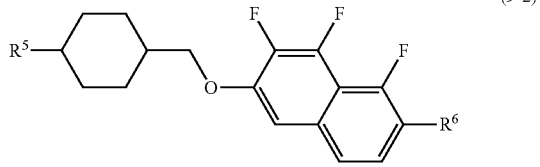
(9-3) 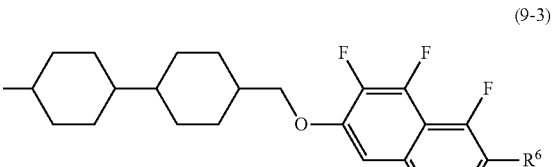
(10-1) 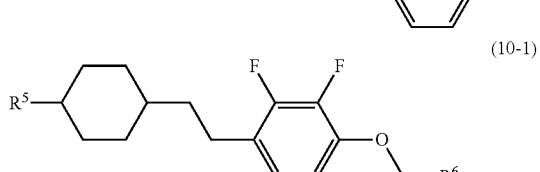
(10-2) 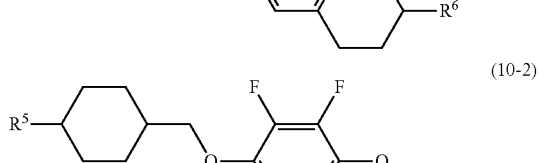
(10-3) 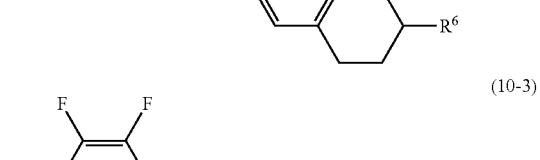
(10-4) 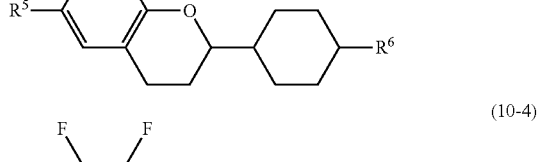
(10-5) 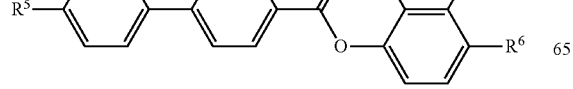

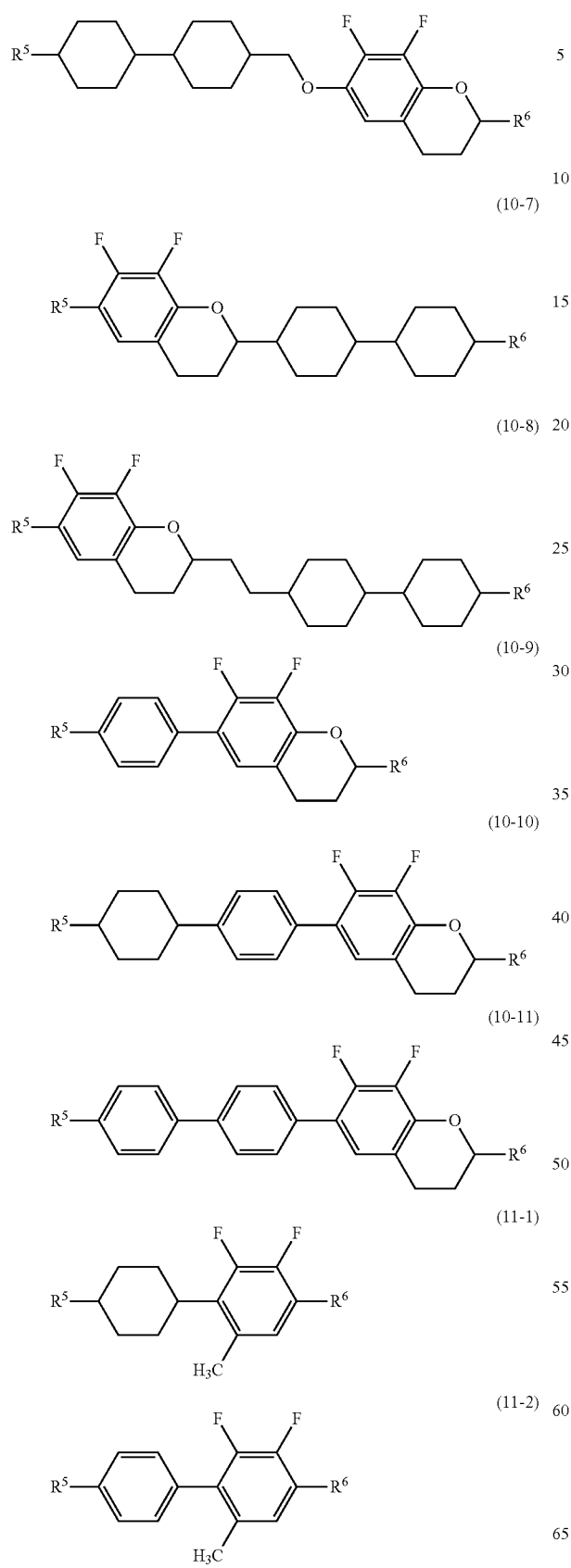
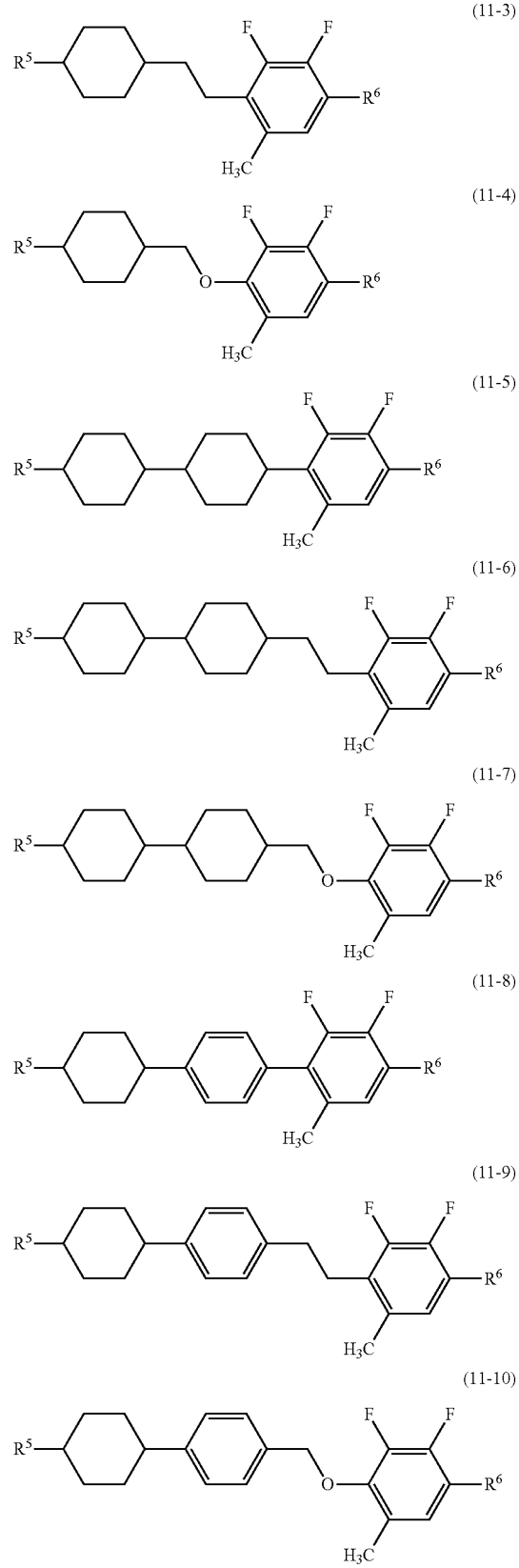
In the formulas, $R^5$ and $R^6$ are defined in a manner identical with the definition as described above.

The compounds of component D are mainly used for the liquid crystal composition having the negative dielectric anisotropy for use in the VA mode or the PSA mode. When the content of component D is increased, the threshold voltage of the composition is decreased but the viscosity is increased. Therefore, the content is preferably as low as possible as far as a required value of threshold voltage is satisfied. However, the content less than approximately 40% by weight occasionally may allow no voltage drive because an absolute value of dielectric anisotropy is approximately 5.

Among types of component D, the compounds represented by formula (6) are effective mainly in adjusting the threshold voltage, the viscosity and the refractive index anisotropy because the compounds are a two-ring compound. The compounds represented by formulas (7) and (8) are effective in increasing the clearing point, extending a nematic range, decreasing the threshold voltage or increasing the refractive index anisotropy, and so forth because the compounds are a three-ring compound. The compounds represented by formulas (9), (10) and (11) are effective in decreasing the threshold voltage and so forth.

The content of component D is preferably approximately 40% by weight or more, further preferably, in the range of approximately 50% to approximately 95% by weight, based on the total amount of the composition in preparing the composition for use in the VA mode or the PSA mode. An elastic constant and a voltage-transmission curve of the composition can be controlled by mixing component D. In the case where component D is mixed with the composition having the positive dielectric anisotropy, the content of component D is preferably approximately 30% by weight or less based on the total amount of the composition.

Suitable examples of the compounds represented by formulas (12), (13) and (14) (component E) include compounds represented by formula (12-1) to formula (12-11), formula (13-1) to formula (13-19) and formula (14-1) to formula (14-6).

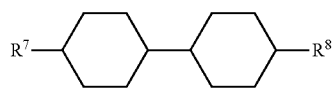
(12-1)

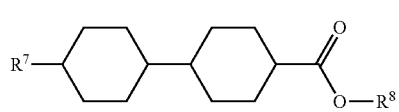
(12-2)

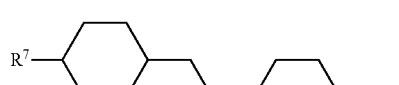
(12-3)

(12-4)

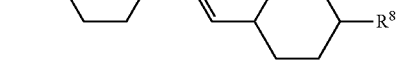
(12-5)

-continued

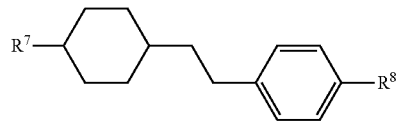
(12-6)

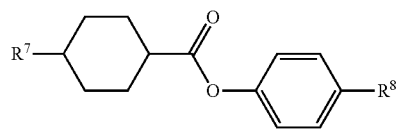
(12-7)

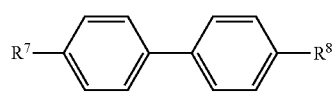
(12-8)

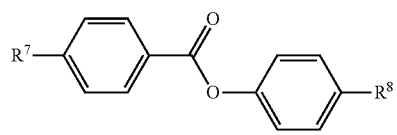
(12-9)

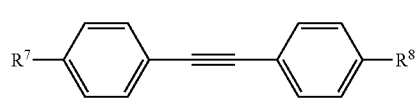
(12-10)

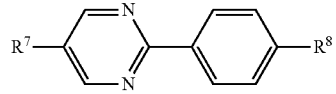
(12-11)

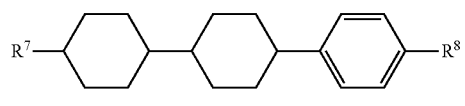
(13-1)

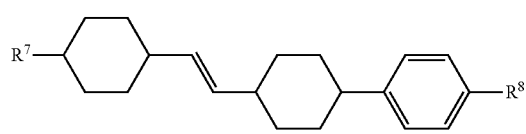
(13-2)

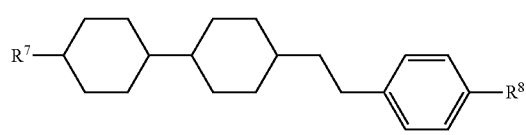
(13-3)

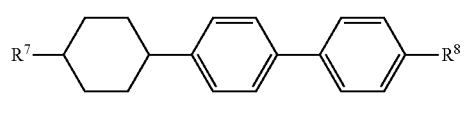
(13-4)

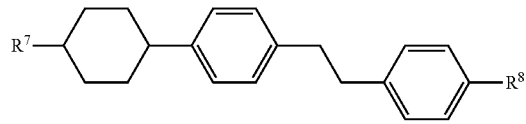
(13-5)

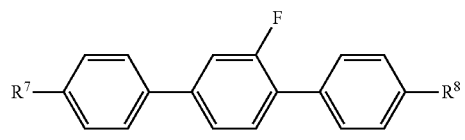
(13-6)

(13-7) 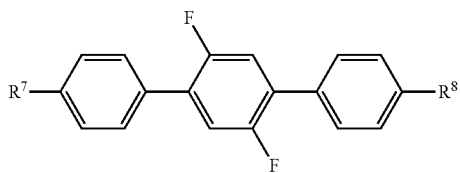

(13-8) 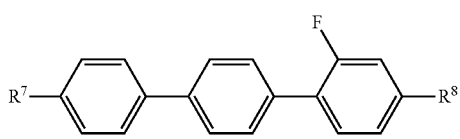

(13-9) 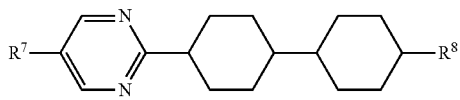

(13-10) 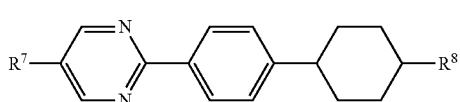

(13-11) 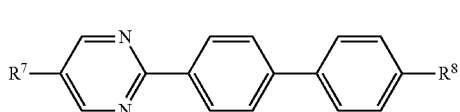

(13-12) 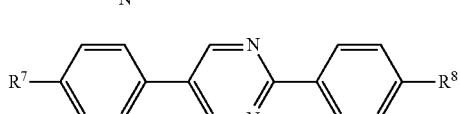

(13-13) 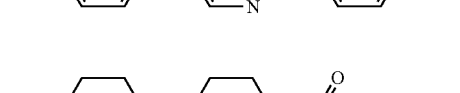

(13-14) 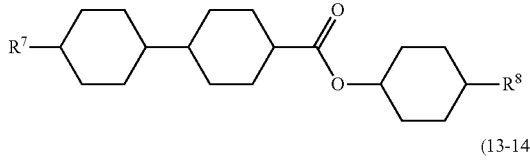

(13-15) 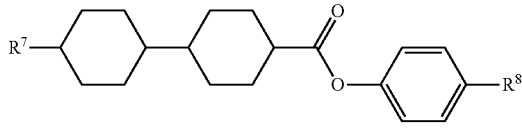

(13-16) 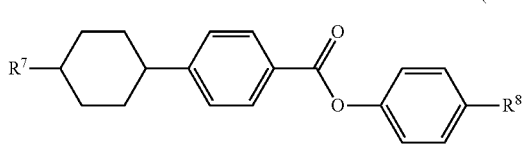

(13-17) 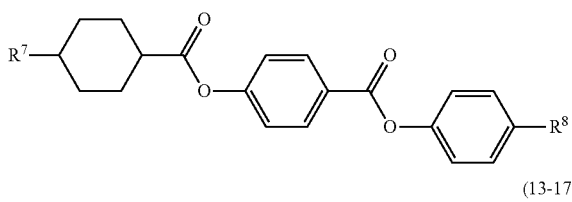

(13-18) 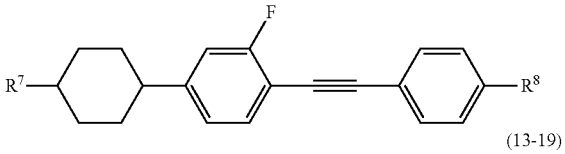

(13-19) 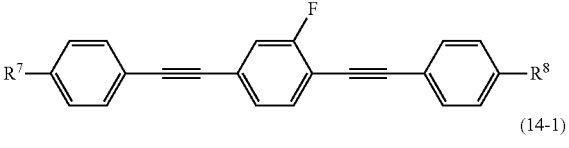

(14-1) 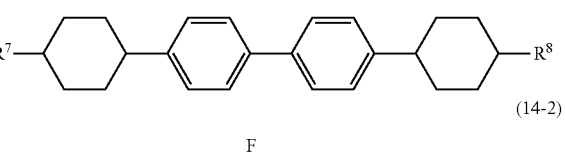

(14-2) 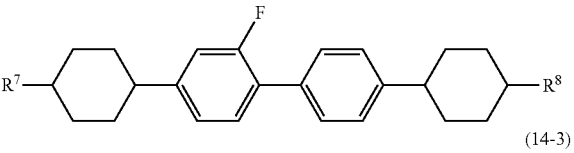

(14-3) 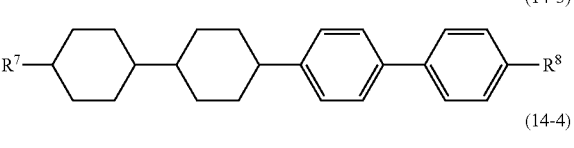

(14-4) 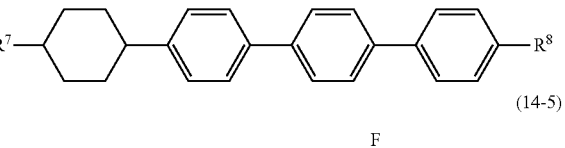

(14-5) 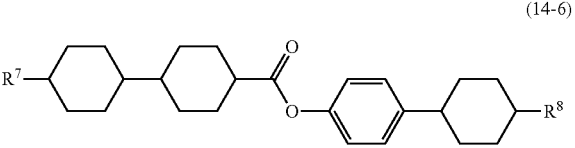

(14-6) 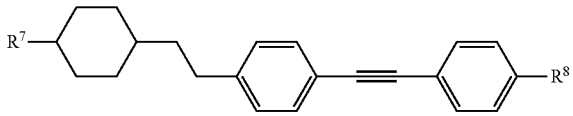

In the formulas, $R^7$ and $R^8$ are defined in a manner identical with the definition as described above.

The compounds represented by formulas (12), (13) and (14) (component E) have a small absolute value of dielectric anisotropy, and are close to neutrality. The compounds represented by formula (12) are effective mainly in adjusting the viscosity or the refractive index anisotropy, and the compounds represented by formulas (13) and (14) are effective in extending the nematic range such as increasing the clearing point, or adjusting the refractive index anisotropy.

If the content of the compounds expressed as component E is increased, the threshold voltage is increased and the viscosity is decreased. Therefore, the content is desirably as high as possible as far as a required value of threshold voltage of the liquid crystal composition is satisfied. When preparing the liquid crystal composition for use in the VA mode or the PSA mode, the content of component E is preferably approximately 30% by weight or more, further preferably, approximately 40% by weight or more, based on the total weight of the composition.

The liquid crystal composition of the invention preferably contains at least one kind compound represented by formula (1) of the invention in the range of approximately 0.1% to approximately 99% by weight for developing excellent characteristics.

The liquid crystal composition of the invention is generally prepared according to a publicly known method, for example, dissolving necessary components under a high temperature. Moreover, an additive well-known to those skilled in the art is added depending on an application. Thus, a liquid crystal composition of the invention in which an optically active compound or a polymerizable compound and a polymerization initiator are contained as described later, and a liquid crystal composition for use in a guest-host (GH) mode to which a dye is added can be prepared, for example. The additive is ordinarily well known to those skilled in the art, and is described in detail in literatures and so forth.

The liquid crystal composition of the invention may further contain at least one optically active compound in the liquid crystal composition of the invention described above.

As the optically active compound, a publicly known chiral dopant is added. The chiral dopant is effective in inducing a helical structure in liquid crystals to adjust a necessary twist angle and thus preventing a reverse twist. Specific examples of the chiral dopant include optically active compound (Op-1) to optically active compound (Op-13) as described below.

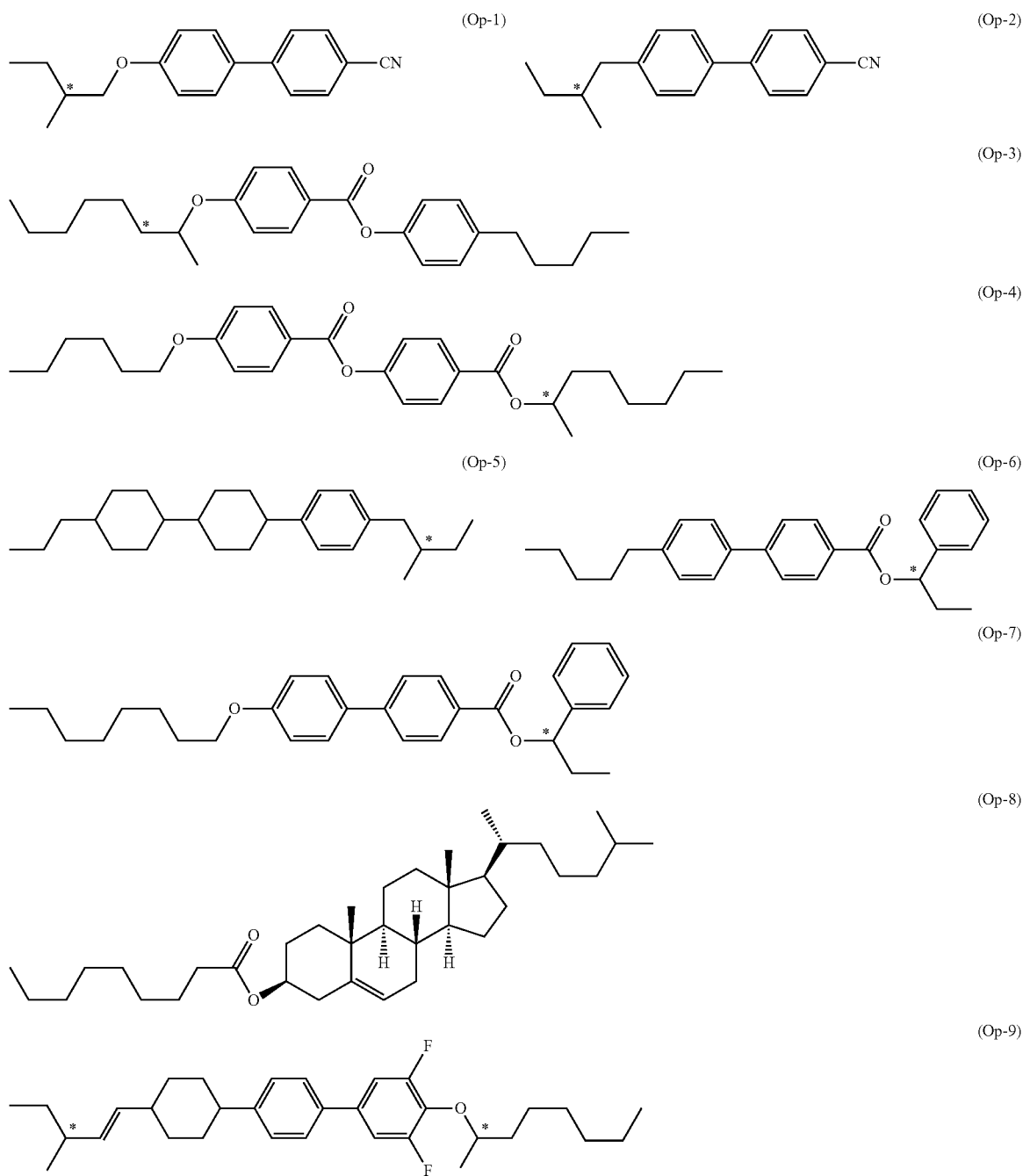

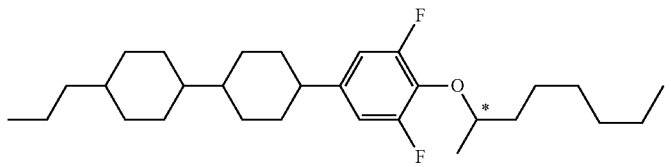

(Op-10)

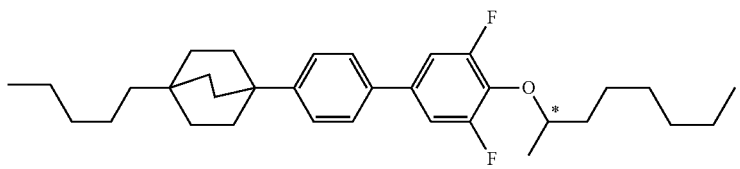

(Op-11)

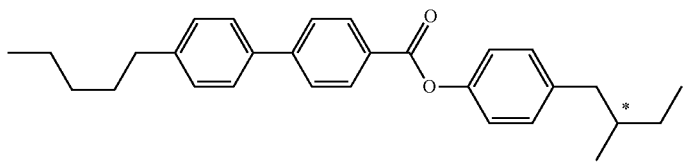

(Op-12)

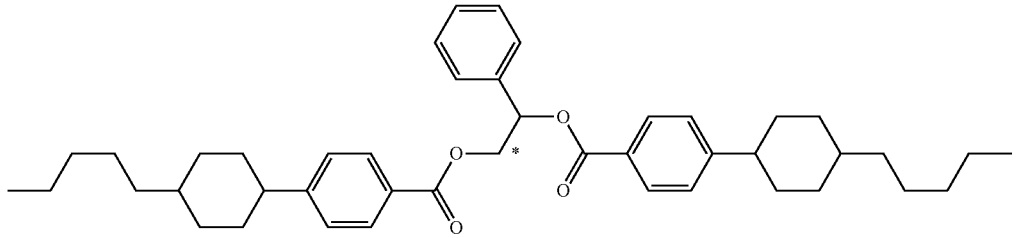

(Op-13)

The helical pitch of the liquid crystal composition of the invention is ordinarily adjusted by adding the optically active compounds. The helical pitch is preferably adjusted in the range of approximately 40 micrometers to approximately 200 micrometers for the liquid crystal composition for use in the TFT and TN modes. The helical pitch is preferably adjusted in the range of approximately 6 micrometers to approximately 20 micrometers for the liquid crystal composition for use in the STN mode. The helical pitch is preferably adjusted in the range of approximately 1.5 micrometers to approximately 4 micrometers for a liquid crystal composition for use in a bistable TN mode. Two or more optically active compounds may be added for the purpose of adjusting temperature dependence of the helical pitch.

If a dichroic dye such as a merocyanine, stylyl, azo, azomethine, azoxy, quinophthalone, anthraquinone or tetrazine dye is added, the liquid crystal composition of the invention can also be used as the liquid crystal composition for use in the GH mode.

The liquid crystal composition of the invention can also be used as a liquid crystal composition for use in a microencapsulated light scattering liquid crystal display device (NCAP, for example) prepared by microencapsulating nematic liquid crystals, and a polymer-dispersed liquid crystal display device (PDLCD) prepared by forming a three-dimensional network polymer in the liquid crystals, including a polymer network liquid crystal display device (PNLCD), and also as a liquid crystal composition for use in an electrically controlled birefringence (ECB) mode or a dynamic scattering (DS) mode.

The liquid crystal composition of the invention can also be used as the liquid crystal composition for use in the polymer sustained alignment (PSA) mode by adding the polymerizable compound. Specific examples of the polymerizable compound include a compound having a polymerizable group such as acrylate, methacrylate, vinyl, vinyloxy, propenylether, epoxy, vinylketone and oxetane. The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to those skilled in the art and are described in literatures. For example, Irgacure 651 (registered trademark; BASF), Irgacure 184 (registered trademark; BASF) or Darocure 1173 (registered trademark; BASF), each being a photopolymerization initiator, is suitable for radical polymerization.

Method for Preparing the Liquid Crystal Composition

The liquid crystal composition of the invention can be prepared as described below. For example, when a compound constituting each component is a liquid, the composition can be prepared by mixing and shaking respective compounds, or when the compound contains a solid, the composition can be prepared by mixing respective compounds, converting into a liquid in each other by heating dissolving the compounds, and then shaking the liquid. Moreover, the liquid crystal composition of the invention can also be prepared according to other publicly known methods.

Characteristics of the Liquid Crystal Composition

In the liquid crystal composition of the invention, the maximum temperature of the nematic phase can be adjusted to approximately 70° C. or higher and the minimum temperature of the nematic phase can be adjusted to approximately −20° C. or lower, and therefore the temperature range of the nematic phase is wide. Accordingly, the liquid crystal display device including the liquid crystal composition can be used in a wide temperature range.

In the liquid crystal composition of the invention, the refractive index anisotropy can be adjusted in the range of approximately 0.05 to approximately 0.18 by suitably adjusting the composition and so forth.

In the liquid crystal composition of the invention, the liquid crystal composition having the dielectric anisotropy ordinarily in the range of approximately −5.0 to approximately −2.0, preferably, in the range of approximately −4.5 to approximately −2.5 can be obtained. The liquid crystal composition having the dielectric anisotropy in the range of approximately −4.5 to approximately −2.5 can be suitably used as the liquid crystal display device that is operated according to the IPS, VA or PSA mode.

Liquid Crystal Display Device

The liquid crystal composition of the invention can be used not only in a liquid crystal display device that has an operating mode such as the PC, TN, STN, OCB or PSA mode, and is driven according to an AM mode, but also in a liquid crystal display device that has the operating mode such as the PC, TN, STN, OCB, VA or IPS mode, and is driven according to a passive matrix (PM) mode.

The liquid crystal display devices according to the AM and PM modes can be applied to any of reflective, transmissive and transflective liquid crystal displays and so forth.

Moreover, the liquid crystal composition of the invention can also be used in a dynamic scattering (DS) mode device using a liquid crystal composition to which a conducting agent is added, a nematic curvilinear aligned phase (NCAP) device prepared by microencapsulating the liquid crystal composition of the invention, and a polymer dispersed (PD) device having a three-dimensional network polymer formed in the liquid crystal composition, for example, a polymer network (PN) device.

The liquid crystal composition of the invention has the characteristics described above. Therefore, the composition can be suitably used in the liquid crystal display device driven by the operating mode such as the VA, IPS or PSA mode and according to the AM mode, in which the liquid crystal composition having the negative dielectric anisotropy is used, and particularly suitably used in the liquid crystal display device driven by the VA mode and according to the AM mode.

In addition, a direction of an electric field is perpendicular to a liquid crystal layer in the liquid crystal display device driven by the TN mode, the VA mode or the like. On the other hand, the direction of the electric field is parallel to the liquid crystal layer in the liquid crystal display device driven by the IPS mode or the like. In addition, a structure of the liquid crystal display device driven by the VA mode has been reported by K. Ohmuro, S. Kataoka, T. Sasaki and Y. Koike, SID '97 Digest of Technical Papers, 28, 845 (1997), and a structure of the liquid crystal display device driven by the IPS mode has been reported in WO 1991/10936 A (patent family: U.S. Pat. No. 5,576,867 B).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted, to limit the scope of the invention.

EXAMPLES

In the following, the invention will be explained in greater detail by way of Examples. However, the invention is not limited by the Examples. Unless otherwise noted, "%" is expressed in terms of "% by weight."

Analytical methods will be explained first because a compound obtained was identified on the basis of a nuclear magnetic resonance spectrum obtained by means of $^1$H-NMR analysis, a gas chromatogram obtained by means of gas chromatography (GC) analysis and so forth.

$^1$H-NMR Analysis: As a measuring apparatus, DRX-500 (made by Bruker BioSpin Corporation) was used. A sample prepared in Examples and so forth was dissolved in a deuterated solvent such as $CDCl_3$ in which the sample was soluble, and measurement was carried out under the conditions of room temperature, 500 MHz and 24 times of accumulation. In the explanation of the nuclear magnetic resonance spectrum obtained, s, d, t, q and m stand for a singlet, a doublet, a triplet, a quartet and a multiplet, respectively. Tetramethylsilane (TMS) was used as an internal standard of chemical shifts (δ values).

GC Analysis: As a measuring apparatus, GC-14B Gas Chromatograph made by Shimadzu Corporation was used. A capillary column CBP1-M25-025 (length 25 m, bore 0.22 mm, film thickness 0.25 μm; dimethylpolysiloxane as a stationary phase; non-polar) made by Shimadzu Corporation was used. Helium was used as a carrier gas, and a flow rate was adjusted at 1 milliliter per minute. A sample injector and a detector (FID) were set to a temperature of 300° C., respectively.

A sample was dissolved in toluene to prepare a 1% solution, and then 1 microliter of the solution was injected into the sample injector.

As a recorder, C-R6A Chromatopac made by Shimadzu Corporation or the equivalent thereof was used. The resultant gas chromatogram showed a retention time of a peak and a value of a peak area corresponding to each of component compounds.

As a solvent for diluting the sample, chloroform or hexane, for example, may also be used. Moreover, as the column, capillary column DB-1 (length 30 m, bore 0.32 mm, film thickness 0.25 μm) made by Agilent Technologies Inc., HP-1 (length 30 m, bore 0.32 mm, film thickness 0.25 μm) made by Agilent Technologies Inc., Rtx-1 (length 30 m, bore 0.32 mm, film thickness 0.25 μm) made by Restek Corporation, BP-1 (length 30 m, bore 0.32 mm, film thickness 0.25 μm) made by SGE International Pty. Ltd. and so forth may be used.

A ratio of peak areas in the gas chromatogram corresponds to a ratio of component compounds. In general, the weight percent of each component compound in an analytical sample is not completely identical with a percentage of each peak area in the analytical sample. When the column described above was used in the invention, however, the weight percent of each component compound in the analytical sample substantially corresponds to the percentage of each peak area in the analytical sample because a correction coefficient is essentially 1 (one). The reason is that no significant difference exists among the correction coefficients of the component compounds.

Sample for Measurement

A sample for determining physical properties of a compound includes two types of cases: a case where the compound itself is used as the sample, and a case where a mixture of the compound and mother liquid crystals is used as the sample.

In the case where the sample prepared by mixing the compound with the mother liquid crystals was used, measurement was carried out according to the method described below. First, a sample was prepared by mixing 15% of the compound obtained and 85% of the mother liquid crystals. Then, extrapolated values were calculated from measured values of the resulting sample according to an extrapolation method based on an equation described below, and the extrapolated values were described as values of physical properties of the compound.

(Extrapolated value)={100×(measured value of a sample)−(% of mother liquid crystals)×(measured value of d mother liquid crystals)}/(% of the compound).

When a smectic phase or crystals precipitated at 25° C. even at the above ratio of the compound to the mother liquid crystals, a ratio of the compound to the mother liquid crystals was changed in the order of (10%:90%), (5%:95%) and (1%:99%). The physical properties of the sample were measured using a composition at a ratio in which the smectic phase or the crystals did not precipitate at 25° C. The extrapolated values were determined according to the above equation, and described as the values of physical properties of the compound.

Various kinds exists as mother liquid crystals used for measurement. For example, mother liquid crystals A can be used. Composition (%) of mother liquid crystals A is as described below.

Mother Liquid Crystals A:

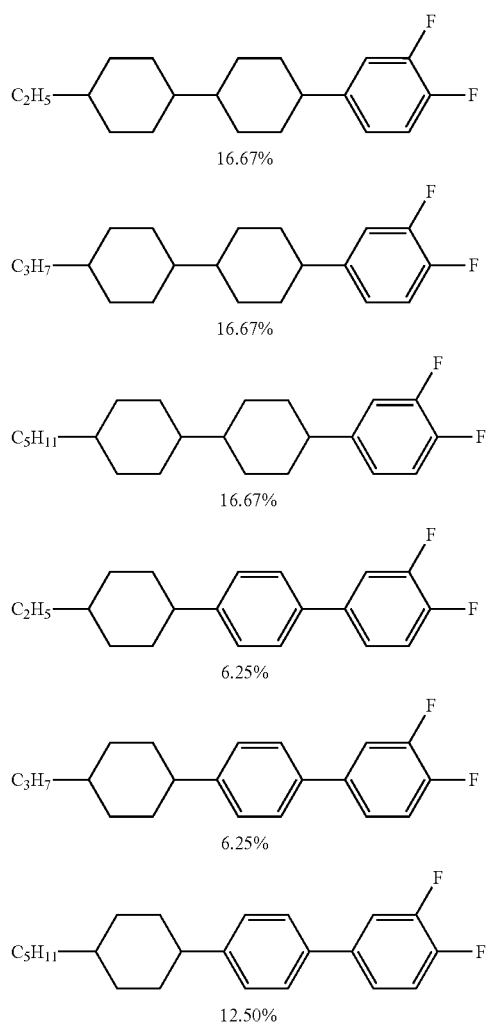

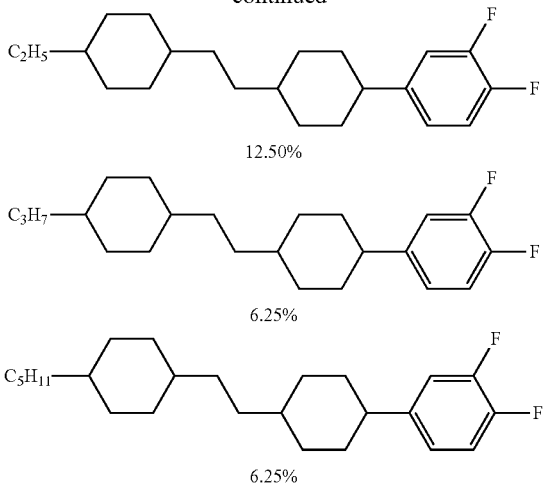

The physical properties of mother liquid crystals A were as described below.

Maximum temperature ($T_{NI}$)=100.1° C.; dielectric anisotropy ($\Delta\epsilon$)=5.10; refractive index anisotropy ($\Delta n$)=0.093; viscosity ($\eta$)=25.6 mPa·s.

Method for Measurement

Physical properties of a compound were measured according to methods described below. Most of the methods are applied as described in EIAJ ED-2521A of the Standard of Electronic Industries Association of Japan, or as modified thereon. Moreover, no TFT was attached to a TN device used for measurement.

Among the values of physical properties, in the case where the compound itself was used as the sample, the measured values were described as data. In the case where the mixture of the compound with the mother liquid crystals was used as the sample, values calculated from the measured values according to the extrapolation method were described as data. For measurement of a phase structure and a phase transition temperature, the compound was used as the sample as is. For other measurements, the mixture of the compound and mother liquid crystals A was used as the sample.

Phase Structure and Phase Transition Temperature (° C.):

Measurement was carried out according to methods (1) and (2) described below.

(1) A sample was placed on a hot plate of a melting point apparatus (FP-52 Hot Stage made by Mettler Toledo International Inc.) equipped with a polarizing microscope, and a phase state and a change thereof were observed with the polarizing microscope while the compound was heated at a rate of 3° C. per minute, and a type of liquid crystal phase was specified.

(2) A sample was heated and then cooled at a rate of 3° C. per minute by using a differential scanning calorimeter, a Diamond DSC System made by PerkinElmer, Inc. A starting point (on set) of an endothermic peak or an exothermic peak caused by a change of phase of the sample was determined according to extrapolation, and thus a phase transition temperature was determined.

Hereinafter, the crystals were expressed as C, and when the crystals were further distinguishable, each of the crystals was expressed as $C_1$ or $C_2$. A smectic phase or a nematic phase was expressed as S or N, respectively. A liquid (isotropic) was expressed as I. When smectic A phase, smectic B phase or smectic C phase was distinguishable among the smectic phases, the phases were expressed as $S_A$, $S_B$ or $S_C$, respectively. As an expression of the phase transition temperature, for example, "C 50.0 N 100.0 I" means that a phase transition temperature from the crystals to the nematic phase (CN) is 50.0° C., and a phase transition temperature from the nematic phase to the liquid (NI) is 100.0° C. A same rule also applies to any other expression.

Maximum Temperature of a Nematic Phase ($T_{NI}$ or NI; ° C.):

A sample was placed on a hot plate of a melting point apparatus (FP-52 Hot Stage made by Mettler Toledo International Inc.) equipped with a polarizing microscope, and was observed with the polarizing microscope while the sample was heated at a rate of 1° C. per minute. Temperature when a part of the sample began to change from the nematic phase to the isotropic liquid was described as a maximum temperature. Hereinafter, a higher limit of a temperature range of the nematic phase may simply be abbreviated as "maximum temperature."

Compatibility at a Low Temperature:

Samples in which the compound and the mother liquid crystals were mixed for the compound to be 15%, 10%, 5%, 3% and 1% were prepared and put in glass vials. After the glass vials were kept in freezers at temperatures of −10° C. or −20° C. for a predetermined period of time, whether or not the crystals or the smectic phase precipitated was observed.

Viscosity (Bulk Viscosity; η; Measured at 20° C.; mPa·s):

A sample (mixture of the mother liquid crystals and the compound) was measured using a cone-plate (E type) rotational viscometer.

Refractive Index Anisotropy (Δn; Measured at 25° C.):

Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of refractive index anisotropy (Δn) was calculated from an equation: Δn=n∥−n⊥.

Dielectric Anisotropy (Δ∈; measured at 25° C.):

A sample was put in a TN device in which a distance (cell gap) between two glass substrates was 9 micrometers and a twist angle was 80 degrees. A voltage of 20 V was applied to the cell, and a dielectric constant (∈∥) in the major axis direction of liquid crystal molecules was measured. A voltage of 0.5 V was applied to the cell, and a dielectric constant (∈⊥) in the minor axis direction of the liquid crystal molecules was measured. A value of dielectric anisotropy was calculated from an equation: Δ∈=∈∥−∈⊥.

Example 1

Synthesis of Compound (1-2)

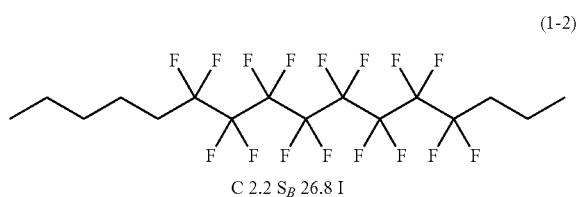

C 2.2 $S_B$ 26.8 I

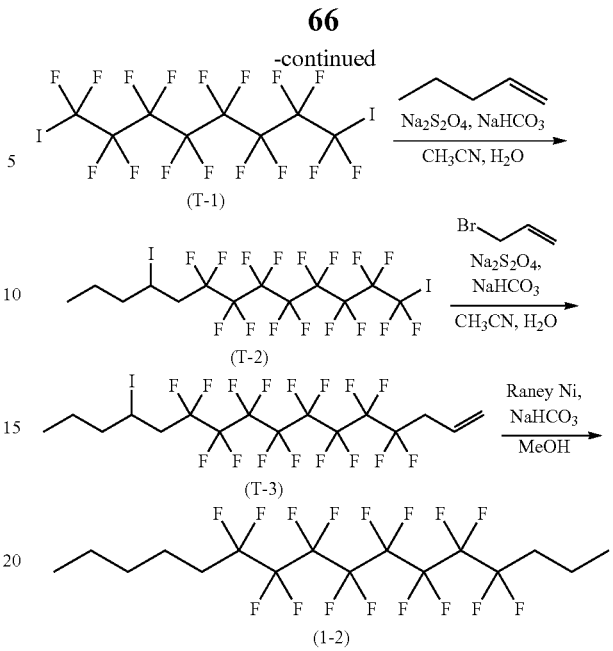

First Step

To a reaction vessel under a nitrogen atmosphere, compound (T-1) (made by Apollo Scientific Ltd.) (25.0 g) and acetonitrile (450 ml) were added. An aqueous solution prepared by dissolving sodium dithionite (7.83 g) and sodium hydrogencarbonate (3.21 g) in water (65 ml) was slowly added dropwise thereto, and stirring was carried out for another 10 minutes. Subsequently, a reaction solution was cooled to 0° C., a mixed solution of 1-pentene (4.19 ml) and acetonitrile (40 ml) was slowly added dropwise thereto, and stirring was carried out for 30 minutes. The resultant reaction mixture was poured into ice water, and an aqueous layer was extracted with heptane. The resultant organic layer was washed with water, and the resultant solution was dried over anhydrous magnesium sulfate. The resultant solution was concentrated under reduced pressure, and a residue was purified by means of column chromatography (silica gel; heptane), and thus compound (T-2) (8.88 g; 32%) was obtained.

Second Step

To a reaction vessel under a nitrogen atmosphere, compound (T-2) (8.88 g), allyl bromide (1.14 ml) and acetonitrile (240 ml) were added, and cooling was carried out to 0° C. An aqueous solution prepared by dissolving sodium dithionite (6.28 g) and sodium hydrogencarbonate (2.58 g) in water (60 ml) was slowly added dropwise thereto, and stirring was carried out for another 2 hours. The resultant reaction mixture was poured into ice water, and an aqueous layer was extracted with heptane. The resultant organic layer was washed with water, and the resultant solution was dried over anhydrous magnesium sulfate. The resultant solution was concentrated under reduced pressure, and a residue was purified by means of column chromatography (silica gel; heptane), and thus compound (T-3) (4.46 g; 57%) was obtained.

Third Step

To a reaction vessel, compound (T-3) (4.46 g), sodium hydrogencarbonate (0.542 g), Raney nickel (0.223 g) and methanol (20 ml) were added, and stirring was carried out for 12 hours under a hydrogen atmosphere. After the catalyst was filtered out, the resultant reaction mixture was washed with water, and the resultant solution was dried over anhydrous magnesium sulfate. The resultant solution was concentrated under reduced pressure, and a residue was purified by means of column chromatography (silica gel; heptane). The residue was further purified by recrystallization from Solmix A-11 (registered trademark; Japan Alcohol Trading Company, Ltd.), and thus compound (1-2) (2.19 g; 61%) was obtained.

Chemical shift δ (ppm; CDCl$_3$); 2.12-1.95 (m, 4H), 1.70-1.55 (m, 4H), 1.42-1.28 (m, 4H), 1.03 (t, J=7.40 Hz, 3H), 0.92 (t, J=6.80 Hz, 3H).

A phase transition temperature of compound (1-2) was as described below.

Phase transition temperature: C 2.2 S$_B$ 26.8 I.

Example 2

Physical Properties of Compound (1-2)

Composition B including 90% of mother liquid crystals A and 10% of compound (1-2) obtained in Example 1 was prepared. Physical properties of composition B obtained were measured and values of physical properties of compound (1-2) were calculated by extrapolating the measured values. The results were as described below.

Maximum temperature (T$_{NI}$)=−8.9° C.; dielectric anisotropy (Δ∈)=0.10; refractive index anisotropy (Δn)=0.053; viscosity (η)=−2.1 mPa·s.

The results show that compound (1-2) has a liquid crystal phase, even without a ring structure, and has a high maximum temperature and a small viscosity.

Example 3

Synthesis of Compound (1-4)

First Step

Compound (T-4) (9.82 g; 34%) was obtained in a manner similar to synthesis of compound (T-2) in Example 1 except that 1-heptene was used in place of 1-pentene.

Second Step

Compound (T-5) (4.75 g; 55%) was obtained in a manner similar to synthesis of compound (T-3) in Example 1 except for using compound (T-4) (9.82 g) as a raw material.

Third Step

Compound (1-4) (2.52 g; 65%) was obtained in a manner similar to synthesis of compound (1-2) in Example 1 except for using compound (T-5) (4.75 g) as a raw material.

Chemical shift δ (ppm; CDCl$_3$); 2.11-1.95 (m, 4H), 1.70-1.51 (m, 4H), 1.42-1.21 (m, 8H), 1.03 (t, J=7.25 Hz, 3H), 0.89 (t, J=6.65 Hz, 3H).

A phase transition temperature of compound (1-4) was as described below.

Phase transition temperature: C$_1$ −0.2 C$_2$ 10.0 S$_B$ 32.5 I.

Example 4

Physical Properties of Compound (1-4)

Composition C including 85% of mother liquid crystals A and 15% of compound (1-4) obtained in Example 3 was prepared. Physical properties of composition C obtained were measured and values of physical properties of compound (1-4) were calculated by extrapolating the measured values. The results were as described below.

Maximum temperature (T$_{NI}$)=−6.6° C.; dielectric anisotropy (Δ∈)=−0.23; refractive index anisotropy (Δn)=0.046; viscosity (η)=1.9 mPa·s.

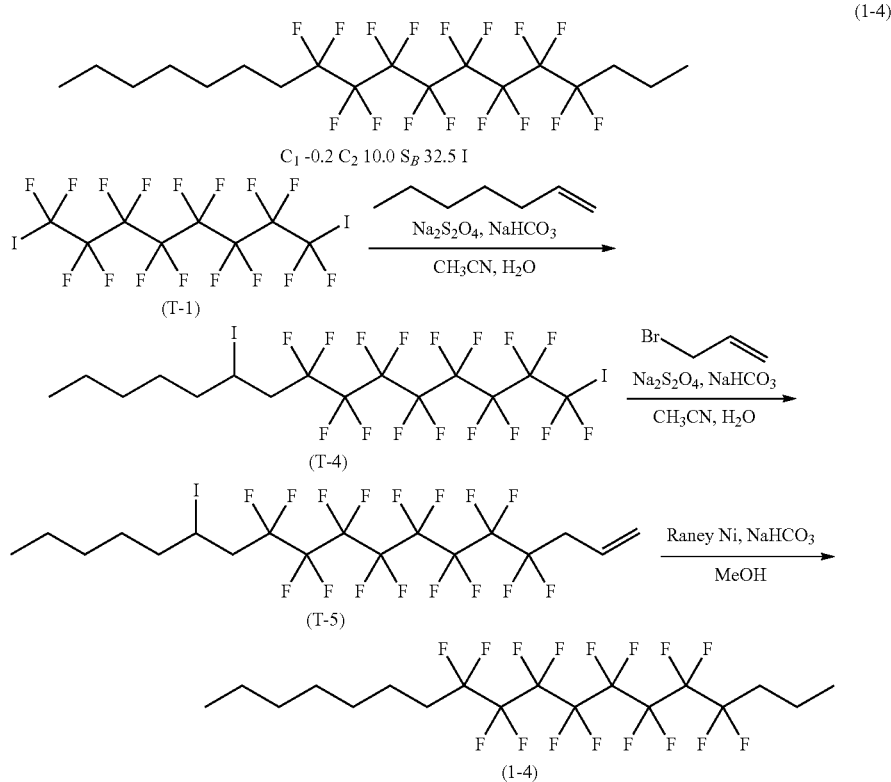

The results show that compound (1-4) has a liquid crystal phase, even without a ring structure, and has a high maximum temperature and a small viscosity.

Example 5

Synthesis of Compound (1-34)

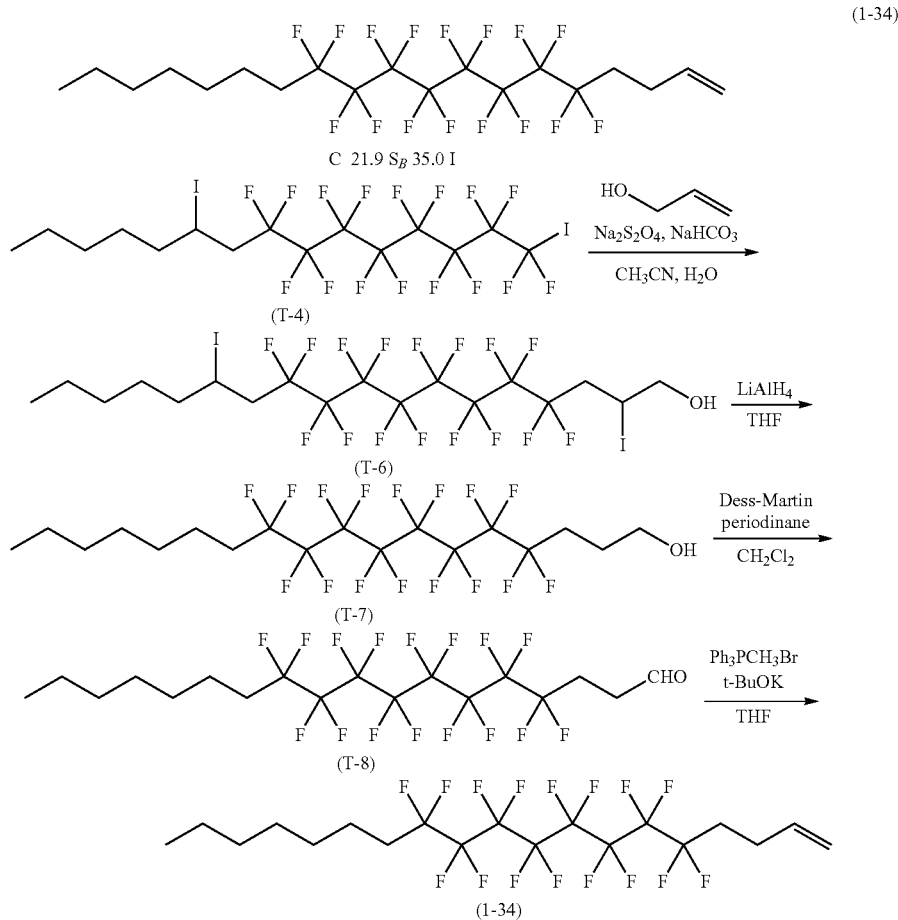

First Step

To a reaction vessel under a nitrogen atmosphere, compound (T-4) (8.85 g), allyl alcohol (1.21 ml) and acetonitrile (200 ml) were added, and cooling was carried out to 0° C. An aqueous solution prepared by dissolving sodium dithionite (3.62 g) and sodium hydrogencarbonate (1.48 g) in water (50 ml) was slowly added dropwise thereto, and stirring was carried out for another 2 hours while returning to room temperature. The resultant reaction mixture was poured into ice water, and an aqueous layer was extracted with heptane. The resultant organic layer was washed with water, and the resultant solution was dried over anhydrous magnesium sulfate. The resultant solution was concentrated under reduced pressure, and a residue was purified by means of column chromatography (silica gel; toluene/ethyl acetate (=10/1 (volume ratio)), and thus compound (T-6) (6.37 g; 67%) was obtained.

Second Step

To a reaction vessel under a nitrogen atmosphere, lithium aluminum hydride (1.05 g) and tetrahydrofuran (THF) (120 ml) were added, and cooling was carried out to −10° C. A solution prepared by dissolving compound (T-6) (6.37 g) in THF (30 ml) was slowly added dropwise thereto, and stirring was carried out for another 12 hours while returning to room temperature. The resultant reaction mixture was poured into a saturated aqueous solution of ammonium chloride and insoluble matter was filtered out. An aqueous layer was extracted with ethyl acetate. The resultant organic layer was washed with water, and the resultant solution was dried over anhydrous magnesium sulfate. The resultant solution was concentrated under reduced pressure, and a residue was purified by means of column chromatography (silica gel; toluene/ethyl acetate (=10/1 (volume ratio)), and thus compound (T-7) (3.48 g; 79%) was obtained.

Third Step

To a reaction vessel under a nitrogen atmosphere, compound (T-7) (3.48 g) and dichloromethane (70 ml) were added, and cooling was carried out to 0° C. Dess-Martin periodinane (2.91 g) was slowly added thereto, and stirring was carried out for another 1 hour while returning to room temperature. Insoluble matter was filtered out, and then the resultant solution was concentrated under reduced pressure. A residue was purified by means of column chromatography (silica gel; toluene), and thus compound (T-8) (3.27 g; 94%) was obtained.

Fourth Step

To a reaction vessel under a nitrogen atmosphere, methyltriphenylphosphonium bromide (2.52 g) and THF (40 ml) were added, and cooling was carried out to −30° C. A solution prepared by dissolving potassium-t-butoxide (0.759 g) in THF (10 ml) was slowly added thereto, and stirring was carried out for another 30 minutes. Subsequently, a solution prepared by dissolving compound (T-8) (3.27 g) in THF (15 ml) was slowly added thereto, and stirring was carried out for another 1 hour while returning to room temperature. The resultant reaction mixture was poured into ice water, and an aqueous layer was extracted with toluene. Then the resultant organic layer was washed successively with a 1 N hydrochloric acid solution, a saturated aqueous solution of sodium hydrogencarbonate and water, and the resultant solution was dried over anhydrous magnesium sulfate. The resultant solution was concentrated under reduced pressure, and a residue was purified by means of column chromatography (silica gel; heptane). The residue was further purified by recrystallization from Solmix A-11, and thus compound (1-34) (1.17 g; 36%) was obtained.

Chemical shift δ (ppm; CDCl$_3$); 5.83 (ddt, J=16.8 Hz, J=10.4 Hz, J=6.50 Hz, 1H), 5.12 (dd, J=17.0 Hz, J=1.25 Hz, 1H), 5.07 (d, J=10.2 Hz, 1H), 2.42-2.33 (m, 2H), 2.24-1.98 (m, 4H), 1.64-1.55 (m, 2H), 1.42-1.23 (m, 8H), 0.89 (t, J=6.75 Hz, 3H).

A phase transition temperature of compound (1-34) obtained was as described below.

Phase transition temperature: C 21.9 S$_B$ 35.0 I.

Example 6

Physical Properties of Compound (1-34)

Composition D including 85% of mother liquid crystals A and 15% of compound (1-34) obtained in Example 5 was prepared. Physical properties of composition D obtained were measured and values of physical properties of compound (1-34) were calculated by extrapolating the measured values. The results were as described below.

Maximum temperature (T$_{NI}$)=−7.9° C.; dielectric anisotropy (Δ∈)=0.43; refractive index anisotropy (Δn)=0.046; viscosity (η)=6.0 mPa·s.

The results show that compound (1-34) has a liquid crystal phase, even without a ring structure, and has a high maximum temperature and a small viscosity.

Example 7

Synthesis of Compound (1-44)

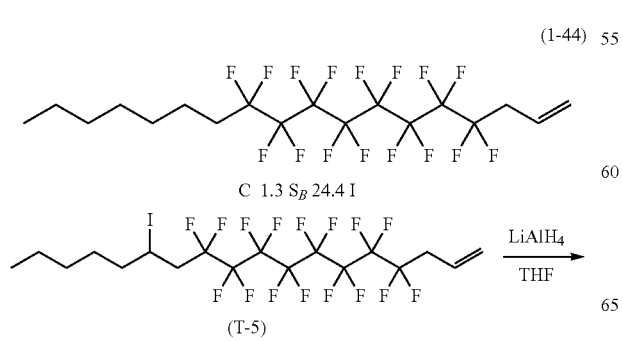

-continued

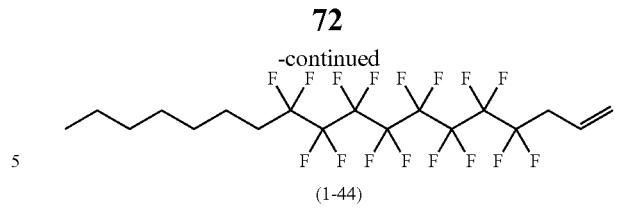

First Step

To a reaction vessel under a nitrogen atmosphere, lithium aluminum hydride (0.240 g) and THF (40 ml) were added, and cooling was carried out to −10° C. A solution prepared by dissolving compound (T-5) (3.50 g) in THF (10 ml) was slowly added thereto, and stirring was carried out for another 12 hours while returning to room temperature. The resultant reaction mixture was poured into a saturated aqueous solution of ammonium chloride and insoluble matter was filtered out. An aqueous layer was extracted with ethyl acetate. The resultant organic layer was washed with water, and the resultant solution was dried over anhydrous magnesium sulfate. The resultant solution was concentrated under reduced pressure, and a residue was purified by means of column chromatography (silica gel; heptane), and thus compound (1-44) (1.32 g; 46%) was obtained.

Chemical shift δ (ppm; CDCl$_3$); 5.81 (ddt, J=17.1 Hz, J=10.2 Hz, J=7.00 Hz, 1H), 5.38-5.30 (m, 2H), 2.86 (td, J=18.3 Hz, J=6.95 Hz, 2H), 2.05 (tt, J=18.7 Hz, J=8.15 Hz, 2H), 1.64-1.55 (m, 2H), 1.42-1.23 (m, 8H), 0.89 (t, J=7.05 Hz, 3H).

A phase transition temperature of compound (1-44) was as described below.

Phase transition temperature: C 1.3 S$_B$ 24.4 I.

Example 8

Physical Properties of Compound (1-44)

Composition E including 85% of mother liquid crystals A and 15% of compound (1-44) obtained in Example 7 was prepared. Physical properties of composition E obtained were measured and values of physical properties of compound (1-44) were calculated by extrapolating the measured values. The results were as described below.

Maximum temperature (T$_{NI}$)=−13.2° C.; dielectric anisotropy (Δ∈)=−0.23; refractive index anisotropy (Δn)=0.046; viscosity (η)=−0.7 mPa·s.

The results show that compound (1-44) has a liquid crystal phase, even without a ring structure, and has a high maximum temperature and a small viscosity.

Example 9

Synthesis of Compound (1-62)

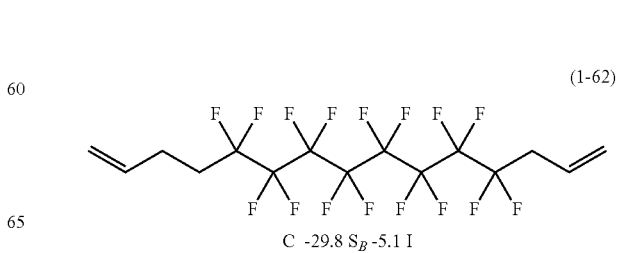

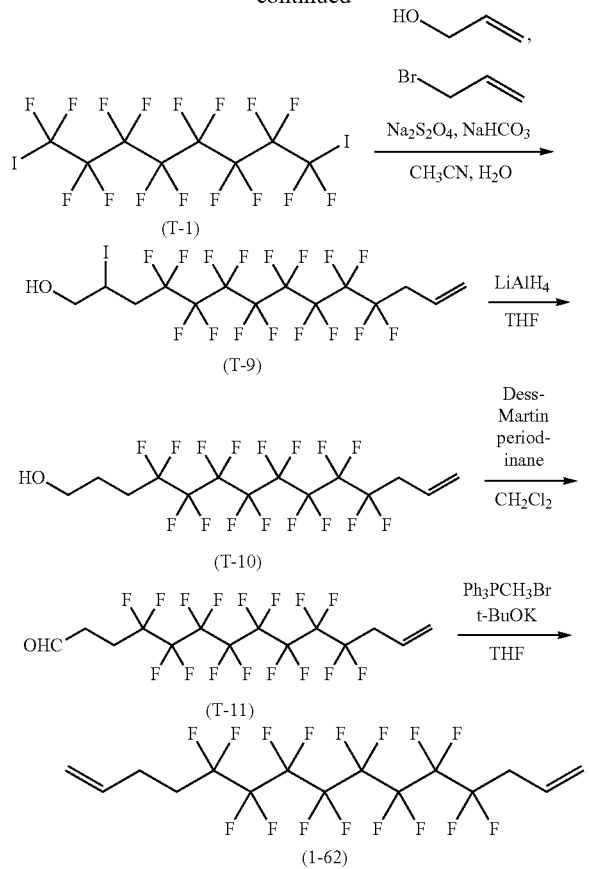

First Step

To a reaction vessel under a nitrogen atmosphere, compound (T-1) (25.0 g), allyl alcohol (2.61 ml) and acetonitrile (750 ml) were added. An aqueous solution prepared by dissolving sodium dithionite (4.03 g) and sodium hydrogencarbonate (1.61 g) in water (50 ml) was slowly added thereto, and stirring was carried out for 3 hours. Subsequently, allyl bromide (3.23 ml) was added, an aqueous solution prepared by dissolving sodium dithionite (8.06 g) and sodium hydrogencarbonate (3.21 g) in water (100 ml) was slowly added dropwise thereto, and stirring was carried out for another 2 hours. The resultant reaction mixture was poured into ice water, and an aqueous layer was extracted with ethyl acetate. The resultant organic layer was washed with water, and the resultant solution was dried over anhydrous magnesium sulfate. The resultant solution was concentrated under reduced pressure, and a residue was purified by means of column chromatography (silica gel; toluene/ethyl acetate (=10/1 (volume ratio)), and thus compound (T-9) (4.82 g; 20%) was obtained.

Second Step

To a reaction vessel under a nitrogen atmosphere, lithium aluminum hydride (0.730 g) and THF (80 ml) were added, and cooling was carried out to −10° C. A THF (20 ml) solution of compound (T-9) (4.82 g) was slowly added dropwise thereto, and stirring was carried out for another 12 hours while returning to room temperature. The resultant reaction mixture was poured into a saturated aqueous solution of ammonium chloride and insoluble matter was filtered out. An aqueous layer was extracted with ethyl acetate. The resultant organic layer was washed with water, and the resultant solution was dried over anhydrous magnesium sulfate. The resultant solution was concentrated under reduced pressure, and a residue was purified by means of column chromatography (silica gel; toluene/ethyl acetate (=3/1 (volume ratio)), and thus compound (T-11) (3.44 g; 89%) was obtained.

Third Step

Compound (T-11) (3.14 g; 92%) was obtained in a manner similar to synthesis of compound (T-8) in Example 5 except for using compound (T-10) (3.44 g) as a raw material.

Fourth Step

Compound (1-62) (0.700 g; 22%) was obtained in a manner similar to synthesis of compound (1-34) in Example 5 except for using compound (T-11) (3.14 g) as a raw material.

Chemical shift δ (ppm; $CDCl_3$); 5.89-5.75 (m, 2H), 5.38-5.30 (m, 2H), 5.16-5.04 (m, 2H), 2.86 (td, J=18.3 Hz, 6.95 Hz, 2H), 2.41-2.32 (m, 2H), 2.25-2.10 (m, 2H).

A phase transition temperature of compound (1-62) was as described below.

Phase transition temperature: C −29.8 $S_B$ −5.1 I.

Example 10

Physical Properties of Compound (1-62)

Composition F including 85% of mother liquid crystals A and 15% of compound (1-62) obtained in Example 9 was prepared. Physical properties of composition F obtained were measured and values of physical properties of compound (1-62) were calculated by extrapolating the measured values. The results were as described below.

Maximum temperature ($T_{NI}$)=−20.6° C.; dielectric anisotropy ($\Delta\epsilon$)=0.43; refractive index anisotropy (Δn)=0.046; viscosity (η)=−11.7 mPa·s.

The results show that compound (1-62) has a liquid crystal phase, even without a ring structure, and has a particularly small viscosity.

Example 11

Synthesis of Compound (1-71)

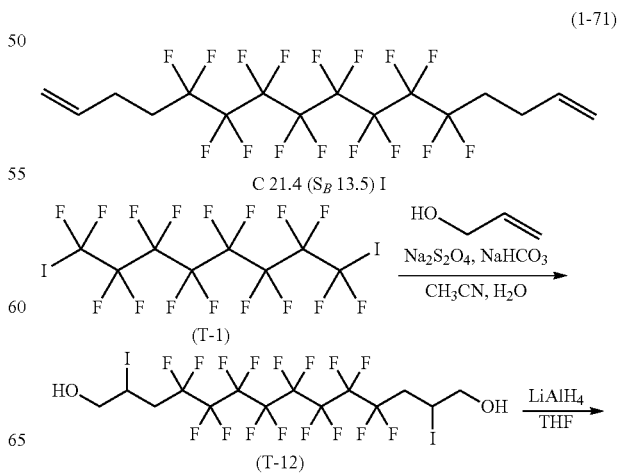

-continued

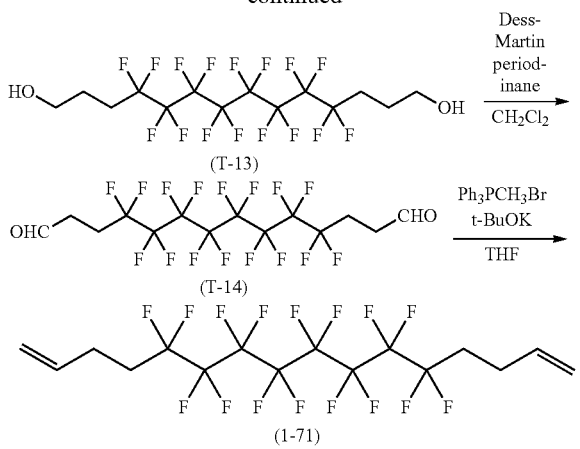

First Step

To a reaction vessel under a nitrogen atmosphere, compound (T-1) (25.0 g), allyl alcohol (5.75 ml) and acetonitrile (750 ml) were added. An aqueous solution prepared by dissolving sodium dithionite (8.88 g) and sodium hydrogencarbonate (3.21 g) in water (100 ml) was slowly added dropwise thereto, and stirring was carried out for 2 hours. The resultant reaction mixture was poured into ice water, and an aqueous layer was extracted with ethyl acetate. The resultant organic layer was washed with water, and the resultant solution was dried over anhydrous magnesium sulfate. The resultant solution was concentrated under reduced pressure, and a residue was purified by means of column chromatography (silica gel; toluene/ethyl acetate (=3/1 (volume ratio)), and thus compound (T-12) (24.0 g; 82%) was obtained.

Second Step

To a reaction vessel under a nitrogen atmosphere, lithium aluminum hydride (5.32 g) and THF (240 ml) were added, and cooling was carried out to −10° C. A solution prepared by dissolving compound (T-12) (24.0 g) in THF (120 ml) was slowly added dropwise thereto, and stirring was carried out for another 12 hours while returning to room temperature. The resultant reaction mixture was poured into a saturated aqueous solution of ammonium chloride and insoluble matter was filtered out. An aqueous layer was extracted with ethyl acetate. The resultant organic layer was washed with water, and the resultant solution was dried over anhydrous magnesium sulfate. The resultant solution was concentrated under reduced pressure, and a residue was purified by recrystallization from toluene, and thus compound (T-13) (13.2 g; 81%) was obtained.

Third Step

To a reaction vessel under a nitrogen atmosphere, compound (T-13) (4.00 g) and dichloromethane (80 ml) were added, and cooling was carried out to 0° C. Dess-Martin periodinane (6.87 g) was slowly added thereto, and stirring was carried out for another 1 hour while returning to room temperature. Insoluble matter was filtered out, the resultant solution was concentrated under reduced pressure, and a residue was purified by means of column chromatography (silica gel; toluene/ethyl acetate (=20/1 (volume ratio)), and thus compound (T-14) (2.95 g; 74%) was obtained.

Fourth Step

To a reaction vessel under a nitrogen atmosphere, methyltriphenylphosphonium bromide (4.92 g) and THF (55 ml) were added, and cooling was carried out to −30° C. Potassium-t-butoxide (1.42 g) was slowly added thereto, and stirring was carried out for another 30 minutes. Subsequently, a solution prepared by dissolving compound (T-14) (2.95 g) in THF (20 ml) was slowly added thereto, and stirring was carried out for another 1 hour while returning to room temperature. The resultant reaction mixture was poured into ice water, and an aqueous layer was extracted with toluene. The resultant organic layer was washed successively with a 1 N hydrochloric acid solution, a saturated aqueous solution of sodium hydrogencarbonate and water, and the resultant solution was dried over anhydrous magnesium sulfate. The resultant solution was concentrated under reduced pressure, and a residue was purified by means of column chromatography (silica gel; heptane). The residue was further purified by recrystallization from Solmix A-11, and thus compound (1-71) (0.760 g; 26%) was obtained.

Chemical shift δ (ppm; CDCl$_3$); 5.83 (ddt, J=17.0 Hz, J=10.4 Hz, J=6.50 Hz, 2H), 5.17-5.05 (m, 4H), 2.41-2.33 (m, 4H), 2.24-2.10 (m, 4H).

A phase transition temperature of compound (1-71) was as described below.

Phase transition temperature: C 21.4 (S$_B$ 13.5) I.

Example 12

Physical Properties of Compound (1-71)

Composition G including 85% of mother liquid crystals A and 15% of compound (1-71) obtained in Example 11 was prepared. Physical properties of composition G obtained were measured and values of physical properties of compound (1-71) were calculated by extrapolating the measured values. The results were as described below.

Maximum temperature (T$_{NI}$)=−13.2° C.; dielectric anisotropy (Δ∈)=0.43; refractive index anisotropy (Δn)=0.046; viscosity (η)=−13.2 mPa·s.

The results show that compound (1-71) has a liquid crystal phase, even without a ring structure, and has a high maximum temperature and a particularly small viscosity.

Example 13

Synthesis of Compound (1-67)

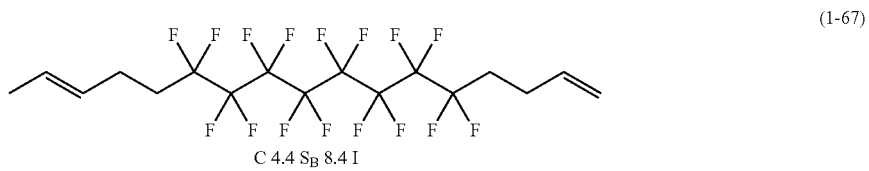

C 4.4 S$_B$ 8.4 I

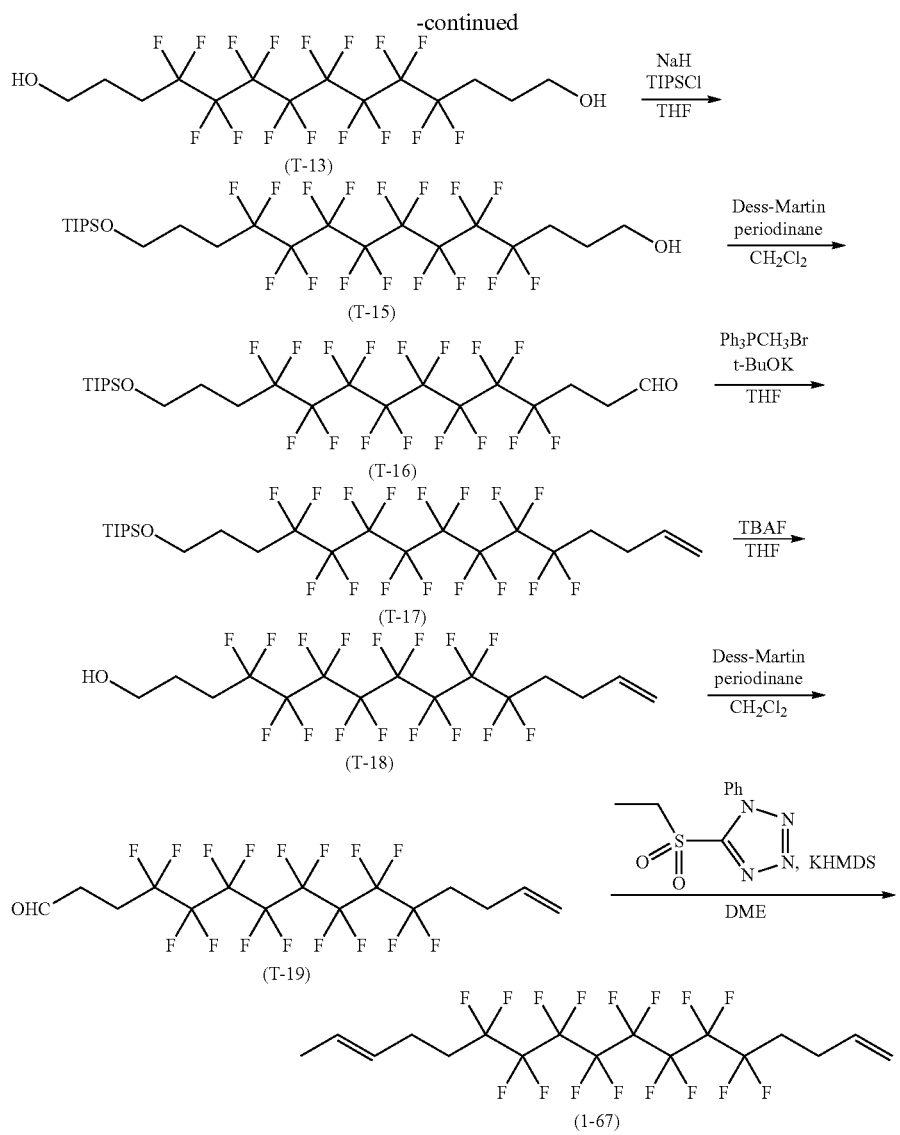

First Step

To a reaction vessel under a nitrogen atmosphere, compound (T-13) (21.2 g), THF (420 ml) and sodium hydride (1.96 g) were added, and stirring was carried out at 50° C. for 3 hours. Subsequently, the resultant reaction liquid was cooled to 0° C., and triisopropylsilyl chloride (8.67 ml) was slowly added dropwise thereto, and stirring was carried out for another 12 hours. The resultant reaction mixture was poured into a saturated aqueous solution of ammonium chloride, and an aqueous layer was extracted with ethyl acetate. The resultant organic layer was washed with water, and the resultant solution was dried over anhydrous magnesium sulfate. The resultant solution was concentrated under reduced pressure, and a residue was purified by means of column chromatography (silica gel; toluene/ethyl acetate (=5/1 (volume ratio)), and thus compound (T-15) (13.9 g; 50%) was obtained.

Second Step

Compound (T-16) (13.1 g; 95%) was obtained in a manner similar to synthesis of compound (T-8) in Example 5 except for using compound (T-15) (13.9 g) as a raw material.

Third Step

Compound (T-17) (9.14 g; 70%) was obtained in a manner similar to synthesis of compound (1-34) in Example 5 except for using compound (T-16) (13.1 g) as a raw material.

Fourth Step

To a reaction vessel under a nitrogen atmosphere, compound (T-17) (9.14 g) and THF (100 ml) were added, and cooling was carried out to 0° C. Tetrabutylammonium fluoride (1 M; THF solution; 15.0 ml) was slowly added dropwise thereto, and stirring was carried out for 12 hours while returning to room temperature. The resultant reaction mixture was poured into water, and an aqueous layer was extracted with ethyl acetate. The resultant organic layer was washed with water, and the resultant solution was dried over anhydrous magnesium sulfate. The resultant solution was concentrated under reduced pressure, and a residue was purified by means of column chromatography (silica gel; toluene/ethyl acetate (=5/1 (volume ratio)), and thus compound (T-18) (6.41 g; 91%) was obtained.

Fifth Step

Compound (T-19) (2.89 g; 97%) was obtained in a manner similar to synthesis of compound (T-8) in Example 5 except for using compound (T-18) (3.00 g) as a raw material.

Sixth Step

To a reaction vessel under a nitrogen atmosphere, compound (T-19) (2.89 g), 5-ethylsulfonyl-1-phenyl-1H-tetrazole (1.75 g) and ethylene glycol dimethyl ether (DME) (100 ml) were added, and cooling was carried out to −70° C. Potassium hexamethyldisilazane (KHMDS) (1 M; THF solution; 7.33 ml) was slowly added dropwise thereto, and stirring was carried out for 3 hours while returning to room temperature. The resultant reaction mixture was poured into water, and an aqueous layer was extracted with ethyl acetate. The resultant organic layer was washed with water, and the resultant solution was dried over anhydrous magnesium sulfate.

prepared. Physical properties of composition H obtained were measured and values of physical properties of compound (1-67) were calculated by extrapolating the measured values. The results were as described below.

Maximum temperature ($T_{NI}$)=−16.4° C.; dielectric anisotropy (Δ∈)=0.40; refractive index anisotropy (Δn)=0.048; viscosity (η)=−10.6 mPa·s.

The results show that compound (1-67) has a liquid crystal phase, even without a ring structure, and has a small viscosity.

Example 15

Synthesis of Compound (1-77)

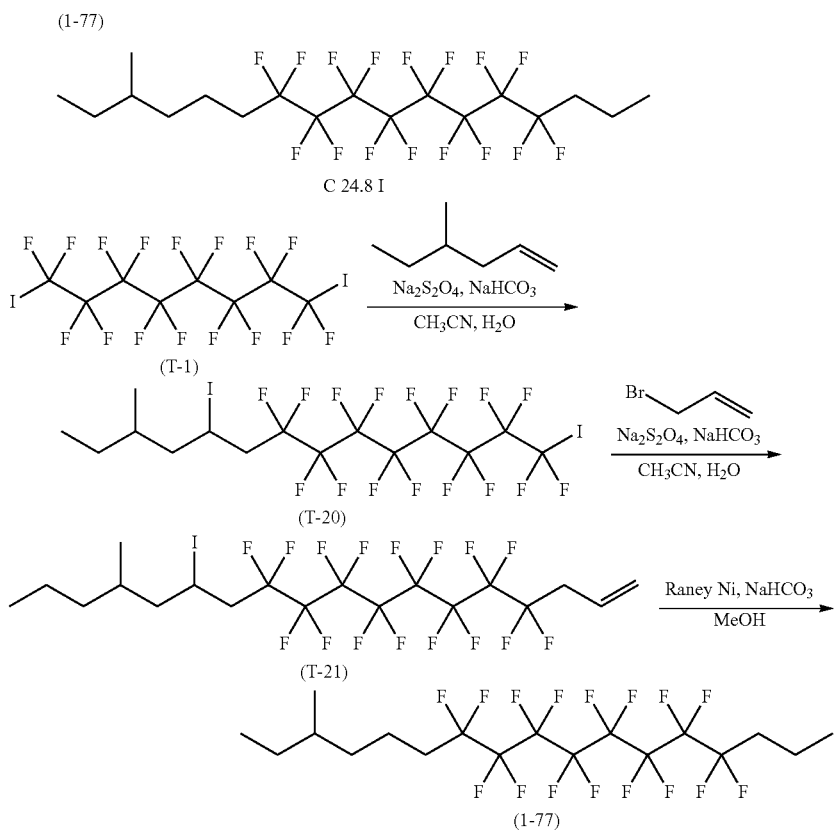

The resultant solution was concentrated under reduced pressure, and a residue was purified by means of column chromatography (silica gel; heptane). The residue was further purified by recrystallization from Solmix A-11, and thus compound (1-67) (0.360 g; 12%) was obtained.

Chemical shift δ (ppm; CDCl$_3$); 5.83 (ddt, J=17.0 Hz, J=10.4 Hz, J=6.45 Hz, 1H), 5.59-5.49 (m, 1H), 5.46-5.37 (m, 1H), 5.17-5.05 (m, 2H), 2.41-2.25 (m, 4H), 2.24-2.05 (m, 4H), 1.67 (dd, J=6.35 Hz, J=1.15 Hz, 3H).

A phase transition temperature of compound (1-67) was as described below.

Phase transition temperature: C 4.4 S$_B$ 8.4 I.

Example 14

Physical Properties of Compound (1-67)

Composition H including 85% of mother liquid crystals A and 15% of compound (1-67) obtained in Example 13 was

First Step

Compound (T-20) (10.6 g; 37%) was obtained in a manner similar to synthesis of compound (T-2) in Example 1 except that 4-methylhexene was used in place of 1-pentene.

Second Step

Compound (T-21) (4.43 g; 47%) was obtained in a manner similar to synthesis of compound (T-3) in Example 1 except for using compound (T-20) (10.6 g) as a raw material.

Third Step

Compound (1-77) (1.13 g; 31%) was obtained in a manner similar to synthesis of compound (1-2) in Example 1 except for using compound (T-21) (4.43 g) as a raw material.

Chemical shift δ (ppm; CDCl$_3$); 2.12-1.95 (m, 4H), 1.70-1.50 (m, 4H), 1.42-1.30 (m, 3H), 1.23-1.12 (m, 2H), 1.03 (t, J=7.40 Hz, 3H), 0.87 (t, J=6.50 Hz, 6H).

A phase transition temperature of compound (1-77) was as described below.

Phase transition temperature: C 24.8 I.

Example 16

Physical Properties of Compound (1-77)

Composition I including 95% of mother liquid crystals A and 5% of compound (1-77) obtained in Example 15 was prepared. Physical properties of composition I obtained were measured and values of physical properties of compound (1-77) were calculated by extrapolating the measured values. The results were as described below.

Maximum temperature $(T_{NI})$=−23.9° C.; dielectric anisotropy $(\Delta\varepsilon)$=−0.80; refractive index anisotropy $(\Delta n)$=0.033; viscosity $(\eta)$=24.3 mPa·s.

Example 17

Based on Examples 1, 3, 5, 7, 9, 11, 13 and 15, and the synthesis methods described above, compound (1-1) to compound (1-100) described below can be prepared. In addition, $R^1$ and $R^2$ may be described by inverting $R^1$ and $R^2$ for description.

No. 1-1

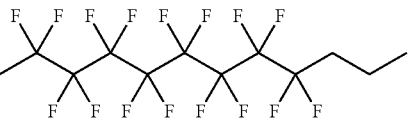

1-2

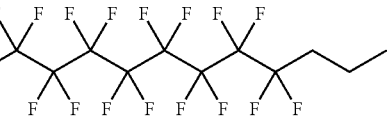

C 2.2 S$_B$ 26.8 I
$T_{NI}$: -8.9, Δε: 0.10, Δn: 0.053, η: -2.1

1-3

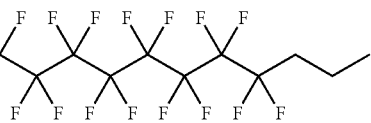

1-4

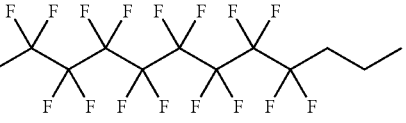

C$_1$ -0.2 C$_2$ 10.0 S$_B$ 32.5 I
$T_{NI}$: -6.6, Δε: -0.23, Δn: 0.046, η: 1.9

1-5

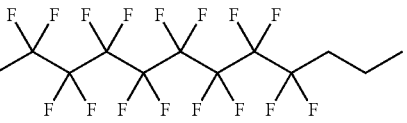

1-6

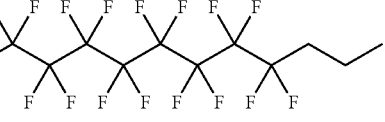

1-7

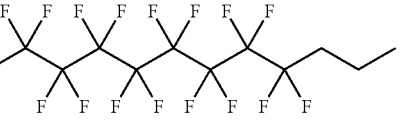

1-8

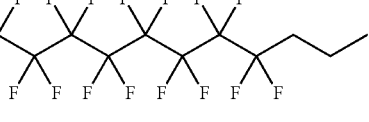

1-9

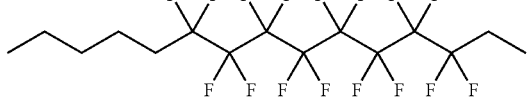

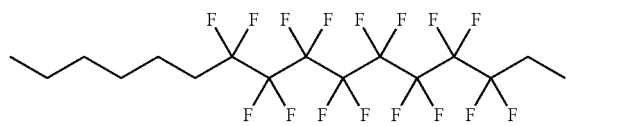
1-10
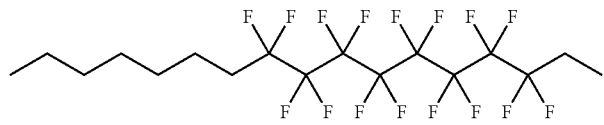
No: 1-11
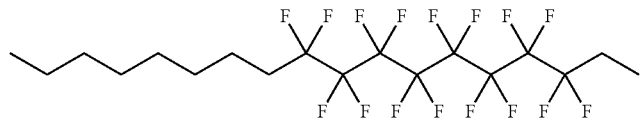
1-12
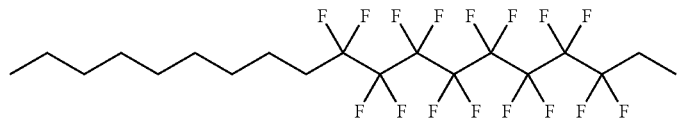
1-13
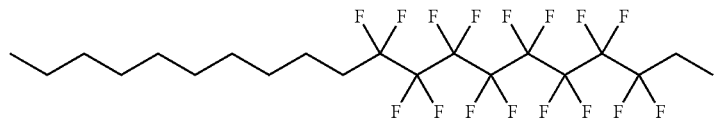
1-14
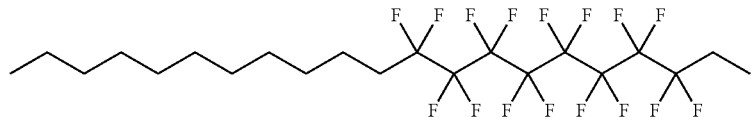
1-15
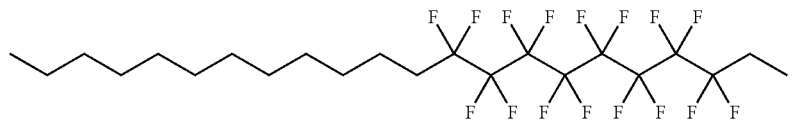
1-16
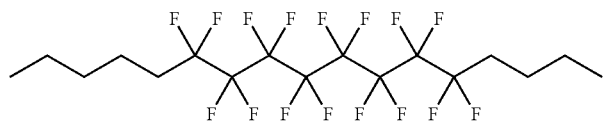
1-17
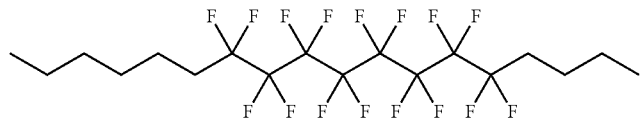
1-18
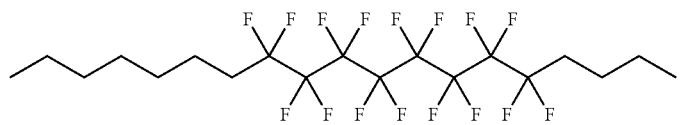
1-19
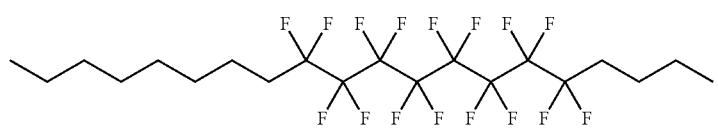
1-20
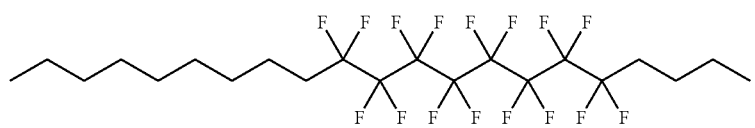
No. 1-21

-continued
1-22
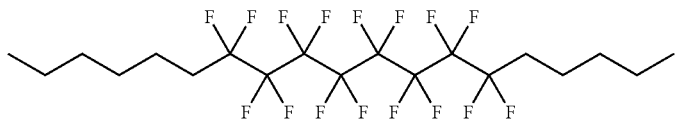
1-23
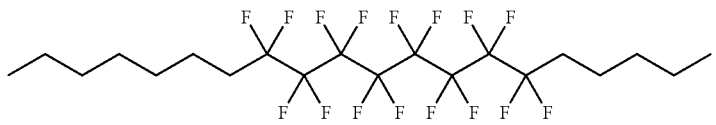
1-24
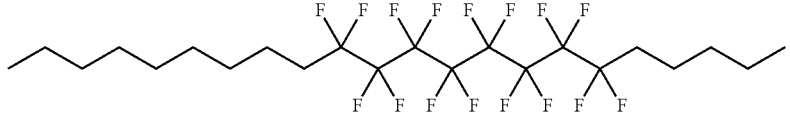
1-25
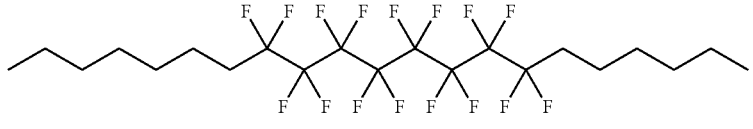
1-26
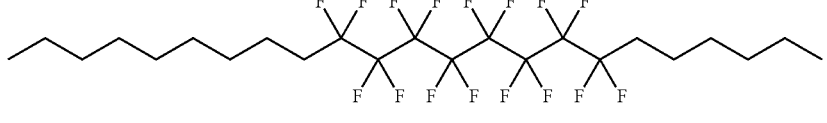
1-27
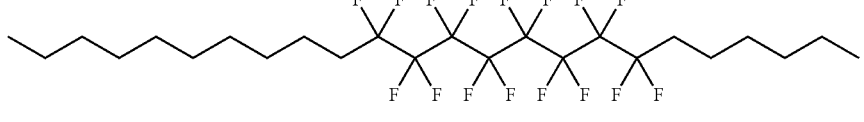
1-28
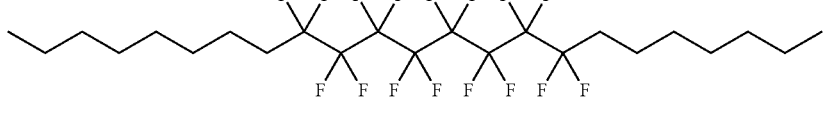
1-29
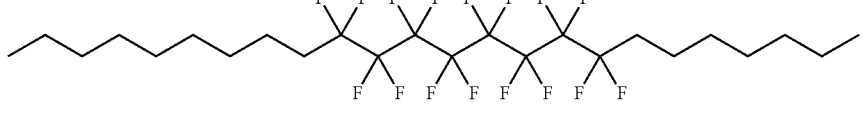
1-30
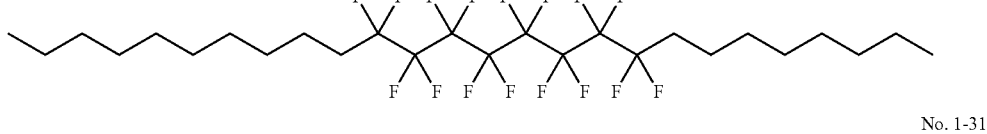
No. 1-31
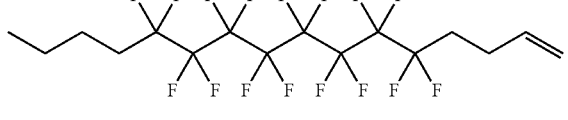
1-32
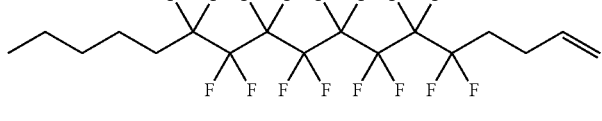
1-33
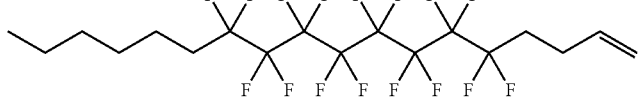

-continued
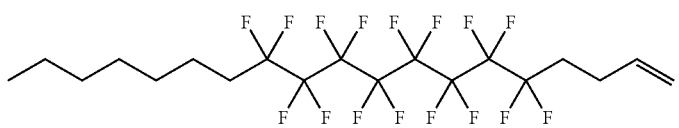
C 21.9 S$_B$ 35.0 I
T$_{NI}$: -7.9, Δε: 0.43, Δn: 0.046, η: 6.0
1-34
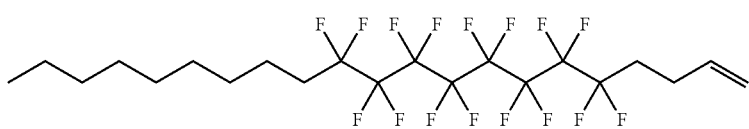
1-35
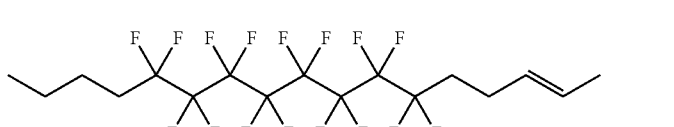
1-36
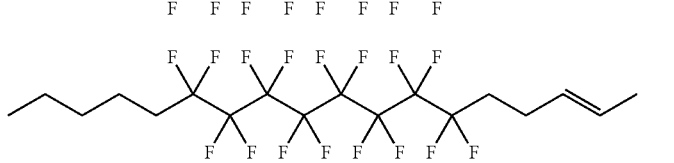
1-37
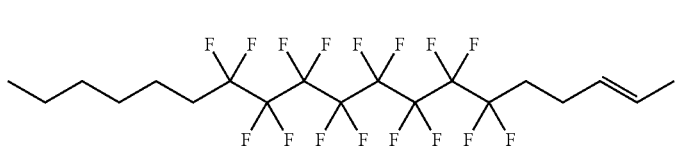
1-38
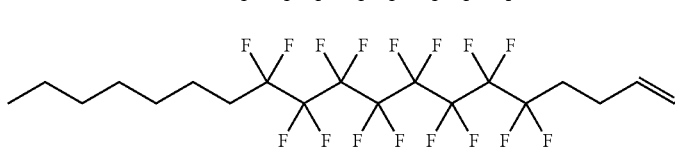
1-39
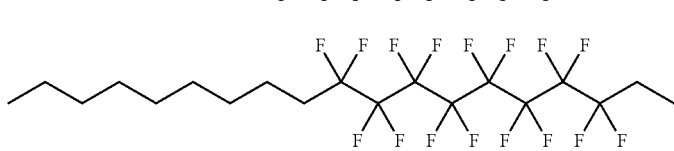
1-40
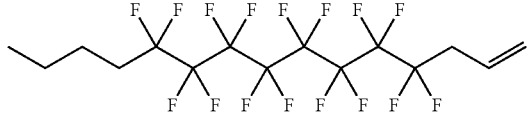
No. 1-41
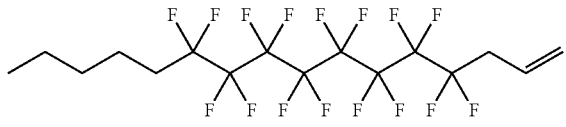
1-42
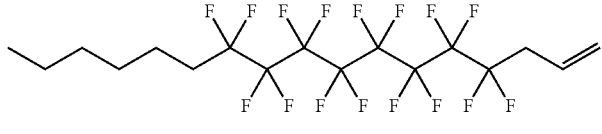
1-43
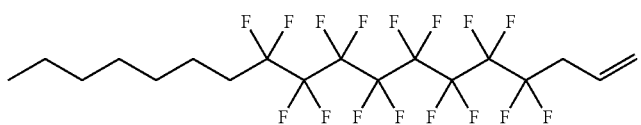
1-44
C 1.3 S$_B$ 24.4 I
T$_{NI}$: -13.2, Δε: -0.23, Δn: 0.046, η: -0.7

-continued
1-45
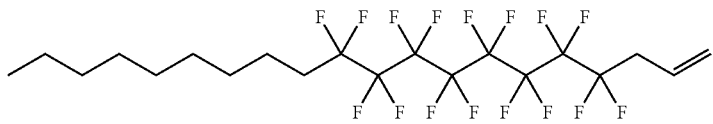
1-46
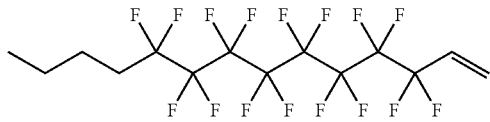
1-47
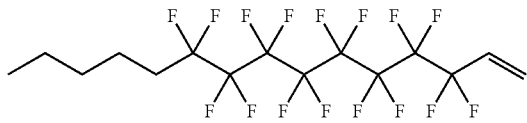
1-48
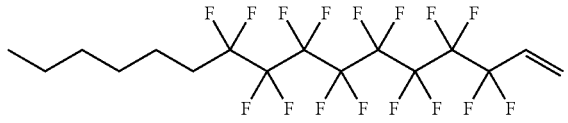
1-49
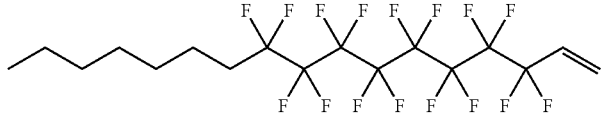
1-50
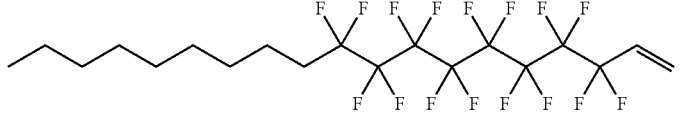
No. 1-51
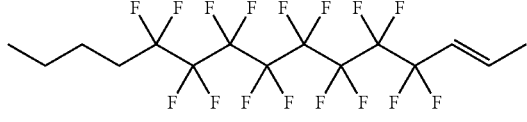
1-52
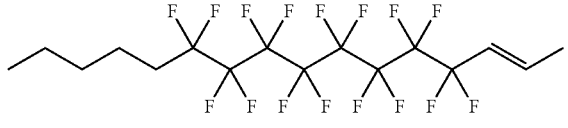
1-53
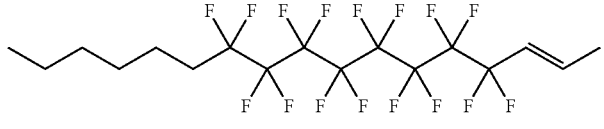
1-54
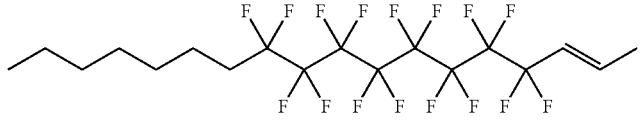
1-55
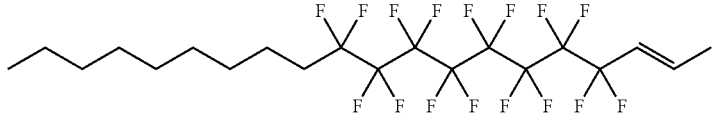
1-56
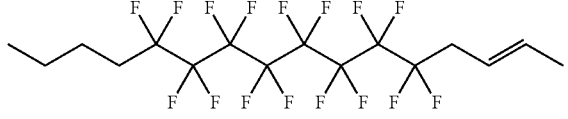

-continued
1-57
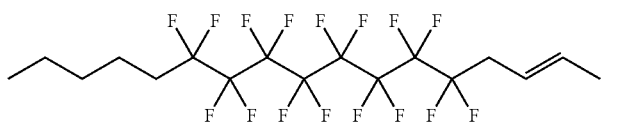
1-58
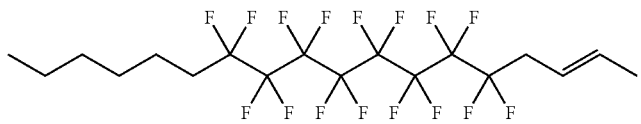
1-59
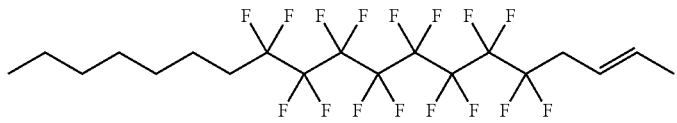
1-60
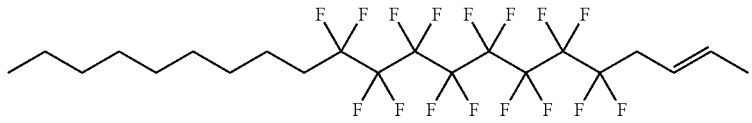
No. 1-61
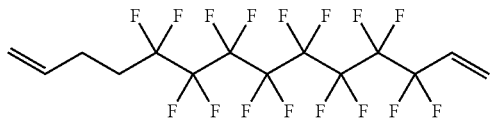
1-62
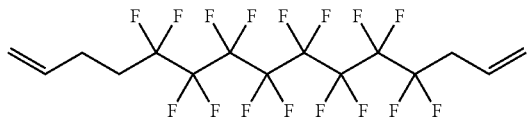
C -29.8 S$_B$ -5.1 I
T$_{NI}$: -20.6, Δε: 0.43, Δn: 0.046, η: -11.7
1-63
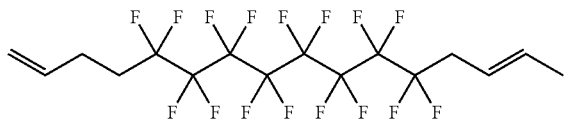
1-64
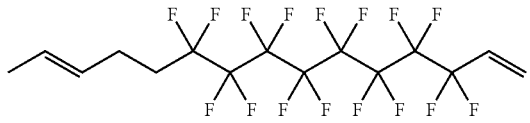
1-65
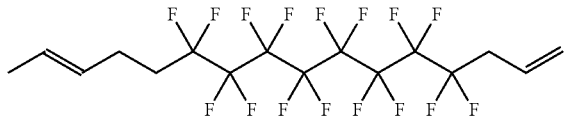
1-66
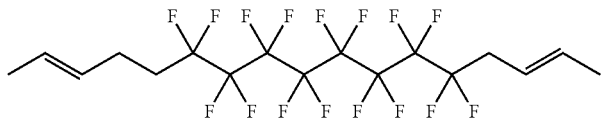
1-67
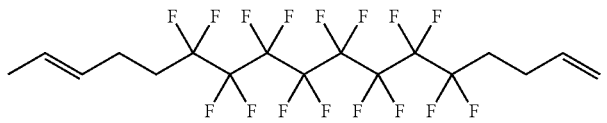
C 4.4 S$_B$ 8.4 I
T$_{NI}$: -16.4, Δε: -0.40, Δn: 0.048, η: -10.6

-continued
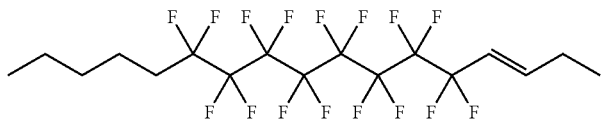
1-68
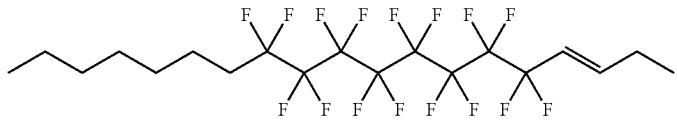
1-69
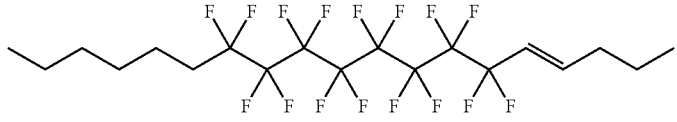
1-70
No. 1-71
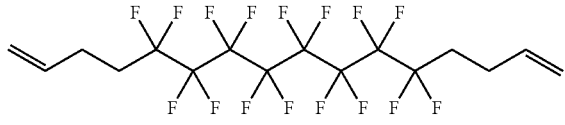
C 21.4 (S$_B$ 13.5) I
T$_{NI}$: -13.2, Δε: 0.43, Δn: 0.046, η: -13.2
1-72
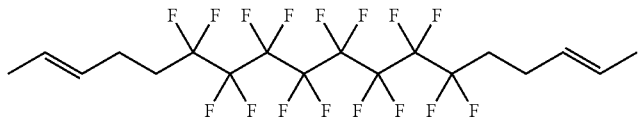
1-73
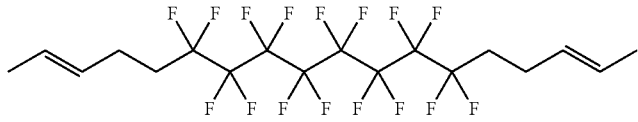
1-74
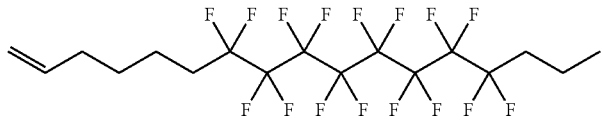
1-75
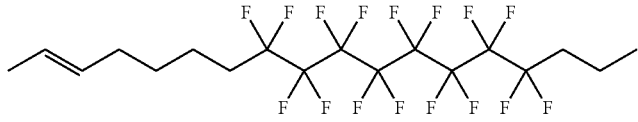
1-76
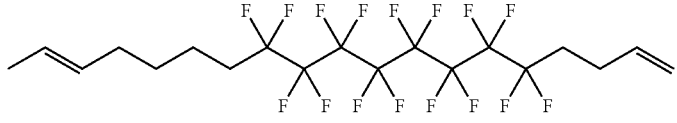
1-77
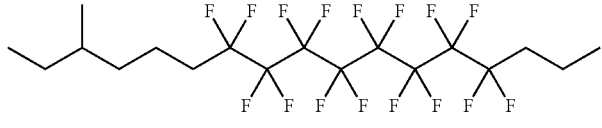
C 24.8 I
T$_{NI}$: -23.9, Δε: -0.80, Δn: 0.033, η: 24.3
1-78
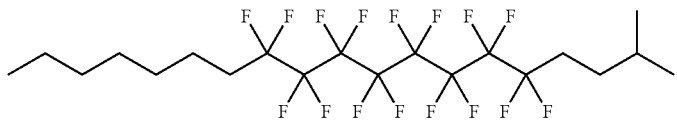

-continued
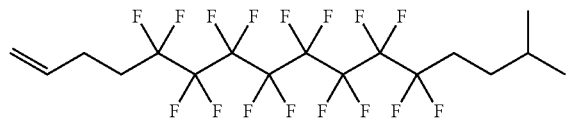
1-79
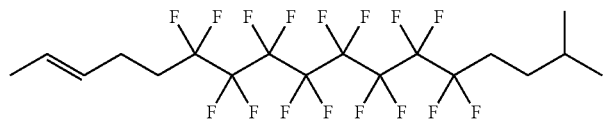
1-80
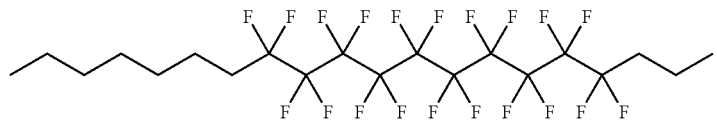
No. 1-81
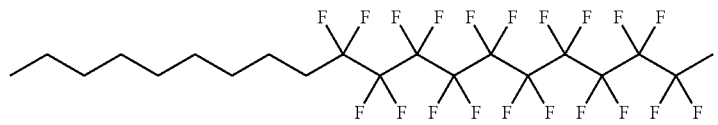
1-82
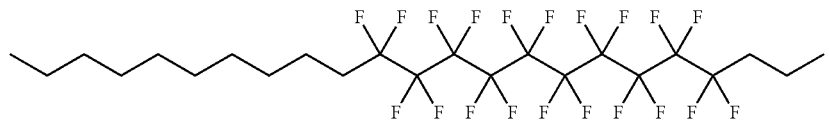
1-83
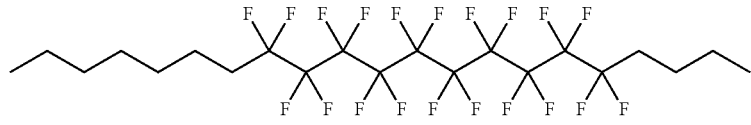
1-84
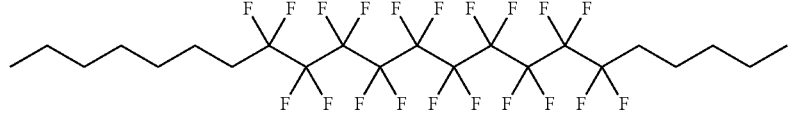
1-85
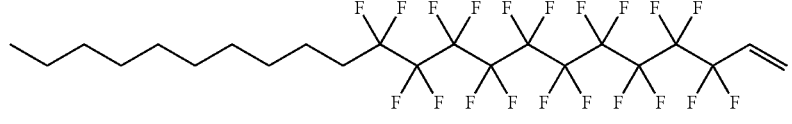
1-86
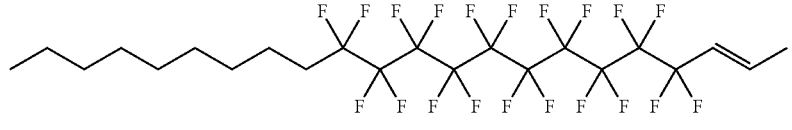
1-87
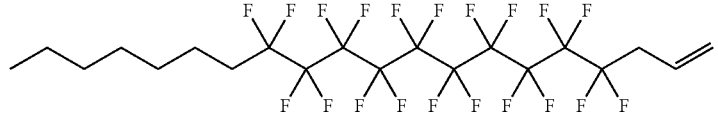
1-88
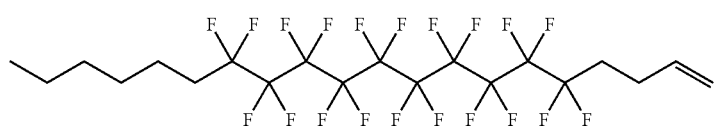
1-89
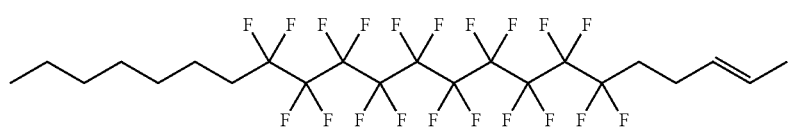
1-90

-continued
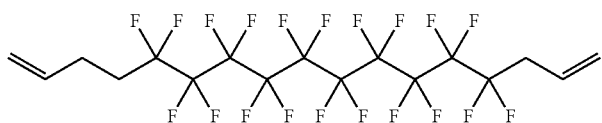
No. 1-91
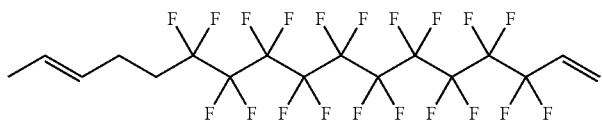
1-92
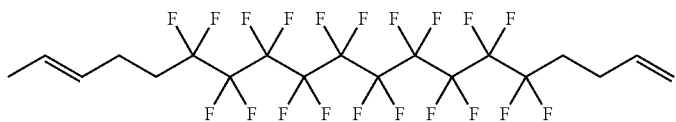
1-93
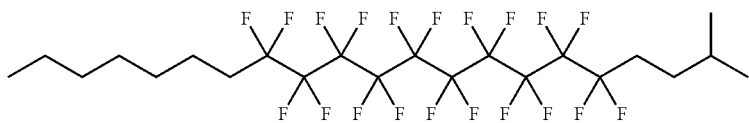
1-94
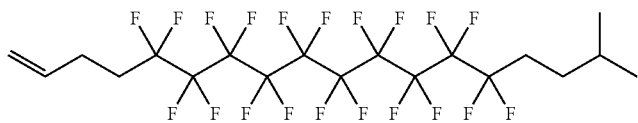
1-95
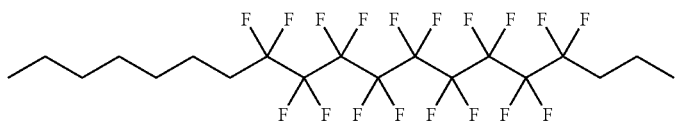
1-96
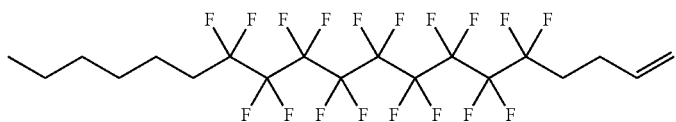
1-97
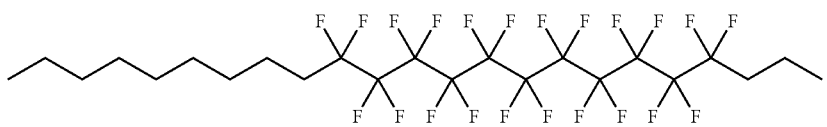
1-98
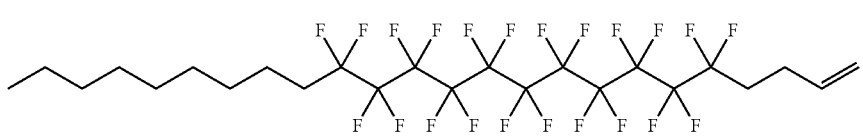
1-99
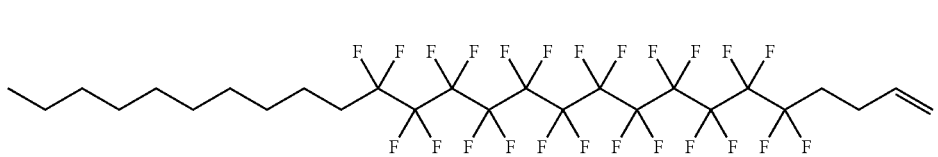
1-100

Comparative Example 1

As Comparative Example, physical properties of compound (S-1) described in Mol. Cryst. Liq. Cryst., 2006, 460, 63 were measured. In addition, as compound (S-1), a commercial product (made by Matrix Scientific Inc.) was used as is.

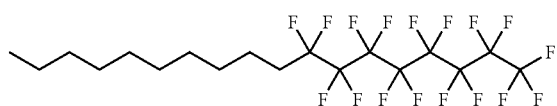

(S-1)

A phase transition temperature of comparative compound (S-1) was as described below.

Phase transition temperature: C 16.9 $S_B$ 36.7 I.

Composition J including 95% of mother liquid crystals A and 5% of comparative compound (S-1) was prepared. Physical properties of composition J obtained were measured and values of physical properties of comparative compound (S-1) were calculated by extrapolating the measured values. The results were as described below.

Maximum temperature $(T_{NI})$=−39.9° C.; dielectric anisotropy $(\Delta\epsilon)$=1.10; refractive index anisotropy $(\Delta n)$=0.013; viscosity $(\eta)$=39.9 mPa·s.

Comparative compound (S-1) was compared with compounds (1-2), (1-4), (1-34), (1-44), (1-62), (1-67), (1-71) and (1-77) shown in Examples. First, when compatibility of each compound was compared, only 5% of comparative compound (S-1) could be added to mother liquid crystals A. Meanwhile, 10% of compound (1-2) could be added to mother liquid crystals A, and 15% of compounds (1-4), (1-34), (1-44), (1-62), (1-67) and (1-71) could be added to mother liquid crystals A. The results show that the compounds of the invention are superior in having a better compatibility with other compounds and being usable also at a lower temperature.

Next, when comparative compound (S-1) was compared with compounds (1-2), (1-4), (1-34), (1-44), (1-62), (1-67), (1-71) and (1-77) in terms of maximum temperature $(T_{NI})$, the compound of the invention was found to have a higher $T_{NI}$. The results show that the compounds of the invention are superior in being usable in a wide temperature range.

Furthermore, when comparative compound (S-1) was compared with compounds (1-2), (1-4), (1-34), (1-44), (1-62), (1-67), (1-71) and (1-77) in terms of the viscosity, the viscosity of the compounds of the invention was smaller. The results show that the compounds of the invention are superior viscosity reducers that can decrease the viscosity of the composition.

Both of comparative compound (S-1) and compound (1-4) have an identical alkyl chain length and an identical perfluoroalkyl chain length. When the perfluoroalkyl chain has an alkyl chain only at one terminal, however, compatibility with other compounds is low, and also $T_{NI}$ was low and the viscosity was large. Therefore, a compound having such a perfluoroalkyl chain is difficult to be used as the viscosity reducer of the liquid crystal composition. Introduction of alkyl chains into both terminals of the perfluoroalkyl chain was found to be significantly contributed to improvement in characteristics of the compounds.

Comparative Example 2

Next, as Comparative Example, compound (S-3) described in DE 4034123 A1 was prepared.

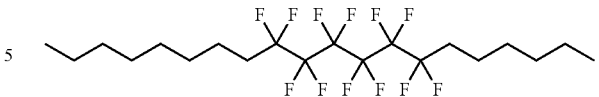

(S-3)

Chemical shift δ (ppm; $CDCl_3$); 2.20-1.98 (m, 4H), 1.64-1.54 (m, 4H), 1.42-1.22 (m, 16H), 0.94-0.86 (m, 6H).

A phase transition temperature of comparative compound (S-3) was as described below.

Phase transition temperature: C 34.0 I.

Composition K including 85% of mother liquid crystals A and 15% of comparative compound (S-3) was prepared. Physical properties of composition K obtained were measured and extrapolated values of physical properties of comparative compound (S-3) were calculated by extrapolating the measured values. The results were as described below.

Maximum temperature $(T_{NI})$=−43.9° C.; dielectric anisotropy $(\Delta\epsilon)$=−0.90; refractive index anisotropy $(\Delta n)$=0.033; viscosity $(\eta)$=−1.4 mPa·s.

When comparative compound (S-3) was compared with compounds (1-2), (1-4), (1-34), (1-44), (1-62), (1-67), (1-71) and (1-77) in terms of the phase transition temperature, compound (S-3) had no liquid crystal phase. Meanwhile, compounds (1-2), (1-4), (1-34), (1-44), (1-62), (1-67) and (1-71) had a liquid crystal phase. The results show that the compounds of the invention are superior as constituents of the liquid crystal composition.

Next, when comparative compound (S-3) was compared with compounds (1-2), (1-4), (1-34), (1-44), (1-62), (1-67), (1-71) and (1-77) in terms of maximum temperature $(T_{NI})$, the compound of the invention has a higher $T_{NI}$. The results show that the compounds of the invention are superior in being usable in a wide temperature range.

Comparative Example 3

Next, as Comparative Example, compound (S-4) described in DE 10018086 A1 was prepared.

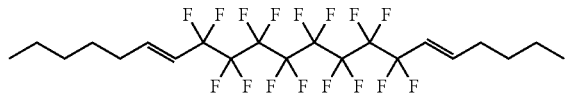

(S-4)

Chemical shift δ (ppm; $CDCl_3$); 6.40 (dt, J=15.7 Hz, J=6.90 Hz, 2H), 5.59 (dt, J=14.8 Hz, J=12.5 Hz, 2H), 2.25-2.15 (m, 4H), 1.50-1.40 (m, 4H), 1.40-1.25 (m, 6H), 0.95-0.87 (m, 6H).

A phase transition temperature of comparative compound (S-4) was as described below.

Phase transition temperature: C<−50 I.

Composition L including 85% of mother liquid crystals A and 15% of comparative compound (S-4) was prepared. Physical properties of composition L obtained were measured and extrapolated values of physical properties of comparative compound (S-4) were calculated by extrapolating the measured values. The results were as described below.

Maximum temperature $(T_{NI})$=−98.6° C.; dielectric anisotropy $(\Delta\epsilon)$=−1.47; refractive index anisotropy $(\Delta n)$=0.013; viscosity $(\eta)$=14.6 mPa·s.

When comparative compound (S-4) was compared with compounds (1-2), (1-4), (1-34), (1-44), (1-62), (1-67), (1-71)

and (1-77) in terms of the phase transition temperature, compound (S-4) had no liquid crystal phase. Meanwhile, compounds (1-2), (1-4), (1-34), (1-44), (1-62), (1-67) and (1-71) had a liquid crystal phase. The results show that the compounds of the invention are superior as constituents of the liquid crystal composition.

Next, when comparative compound (S-4) was compared with compounds (1-2), (1-4), (1-34), (1-44), (1-62), (1-67), (1-71) and (1-77) in terms of maximum temperature ($T_{NI}$), the compound of the invention had a higher $T_{NI}$. The results show that the compounds of the invention are superior in being usable in a wide temperature range.

Furthermore, when compound (S-4) was compared with compounds (1-2), (1-4), (1-34), (1-44), (1-62), (1-67), (1-71) and (1-77) in terms of the viscosity, compounds (1-2), (1-4), (1-34), (1-44), (1-62), (1-67) and (1-71) of the invention had a smaller viscosity. The results show that the compounds of the invention are superior viscosity reducers that can decrease the viscosity of compositions.

Comparative Example 4

Next, as Comparative Example, compound (S-5) described in DE 10018086 A1 was prepared.

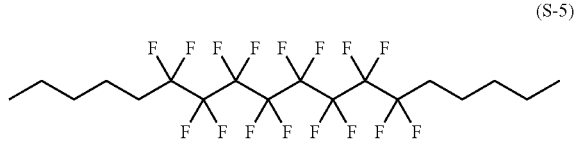 [SMILES: CCCCCC(F)(F)C(F)(F)C(F)(F)C(F)(F)C(F)(F)C(F)(F)C(F)(F)C(F)(F)CCCCC]

(S-5)

Chemical shift δ (ppm; CDCl$_3$); 2.05 (tt, J=18.8 Hz, J=7.85 Hz, 4H), 1.65-1.56 (m, 4H), 1.43-1.31 (m, 8H), 0.92 (t, J=6.95 Hz, 6H).

A phase transition temperature of comparative compound (S-5) was as described below.

Phase transition temperature: C$_1$ 24.1 C$_2$ 46.0 I.

When comparative compound (S-5) was compared with compounds (1-2), (1-4), (1-34), (1-44), (1-62), (1-67), (1-71) and (1-77) in terms of the phase transition temperature, compound (S-5) had no liquid crystal phase. Meanwhile, compounds (1-2), (1-4), (1-34), (1-44), (1-62), (1-67) and (1-71) had a liquid crystal phase. The results show that the compounds of the invention are superior as constituents of the liquid crystal composition.

Both of comparative compound (S-5) and compound (1-4) have an identical molecular weight. However, when alkyl groups at both terminals were symmetric, a melting point is increased and the liquid crystal phase disappeared with improvement of crystallinity. More specifically, in general formula (1) of the invention, R$^1$ and R$^2$ being not allowed to be straight-chain alkyl having an identical number of carbons was found to significantly contribute to development of the liquid crystal phase of the compound.

Example 18

Examples of Liquid Crystal Compositions

Hereinafter, Examples of liquid crystal compositions obtained in the invention will be explained in detail as Composition Examples. In addition, liquid crystal compounds used in Composition Examples are described using symbols according to definitions in Table below. In the Table, a configuration 1,4-cyclohexylene is trans. Unless otherwise noted, a ratio (percentage) of each of compounds is expressed in terms of weight percent (% by weight) based on the total weight of each of the compositions. The values of characteristics of each of the compositions obtained are shown in the last part of each of Composition Examples.

The number described next to the name of each of the liquid crystal compounds used in each of Composition Examples corresponds to the number of formula representing each of the liquid crystal compounds contained in each of the liquid crystal compositions of the invention described above. When only symbol "-" is described without description of the number of formula, the compound represents any other compound.

A method for description of compounds using symbols is shown below.

TABLE 3

Method for Description of Compounds using Symbols
R—(A$_1$)—Z$_1$-------Z$_n$—(A$_n$)—R'

| 1) Left-terminal Group R— | Symbol |
| --- | --- |
| C$_n$H$_{2n+1}$— | n— |
| C$_n$H$_{2n+1}$O— | nO— |
| C$_m$H$_{2m+1}$OC$_n$H$_{2n}$— | mOn— |
| CH$_2$=CH— | V— |
| CnH$_{2n+1}$CH=CH— | nV— |
| CH$_2$=CH—C$_n$H$_{2n}$— | Vn— |
| C$_m$H$_{2m}$—CH=CH—C$_n$H$_{2n}$— | mVn— |
| CF$_2$=CH— | VFF— |
| CF$_2$=CH—C$_n$H$_{2n}$— | VFFn— |

| 2) Right-terminal Group —R' | Symbol |
| --- | --- |
| —C$_n$H$_{2n+1}$ | —n |
| —C$_r$A$_{n+1}$ | —On |
| —COOCH$_3$ | —EMe |
| —CH=CH$_2$ | —V |
| —CH=CH—C$_n$H$_{2n+1}$ | —Vn |
| —C$_n$H$_{2n}$—CH=CH$_2$ | —nV |
| —C$_m$H$_{2m}$—CH=CH—C$_n$H$_{2n+1}$ | —mVn |
| —CH=CF$_2$ | —VFF |
| —F | —F |
| —Cl | —CL |
| —CF$_3$ | —OCF3 |
| —OCHF$_2$ | —OCHF2 |
| —CF$_3$ | —CF3 |
| —CN | —C |

| 3) Bonding Group —Z$_n$— | Symbol |
| --- | --- |
| —C$_n$H$_{2n}$— | n |
| —C$_n$F$_{2n}$— | Fn |
| —COO— | E |
| —CH=CH— | V |
| —CH$_2$O— | 1O |
| —OCH$_2$— | O1 |
| —CF$_2$O— | X |
| —C≡C— | T |

| , 4) Ring Structure —A$_n$— | Symbol |
| --- | --- |
| 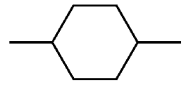 | H |
| 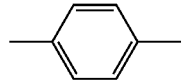 | B |

TABLE 3-continued

Method for Description of Compounds using Symbols
R—(A$_1$)—Z$_1$-------Z$_n$—(A$_n$)—R'

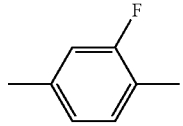 B(F)

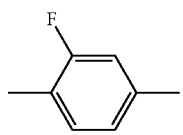 B(2F)

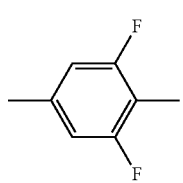 B(F,F)

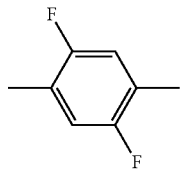 B(2F,5F)

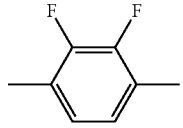 B(2F,3F)

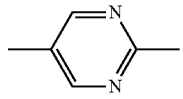 Py

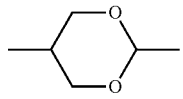 G

5) Examples of Description

Example 1 5-F8-3

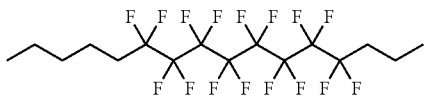 [SMILES: CCCCCC(F)(F)C(F)(F)C(F)(F)C(F)(F)C(F)(F)C(F)(F)C(F)(F)C(F)(F)CCC]

Example 2 7-F8-2V

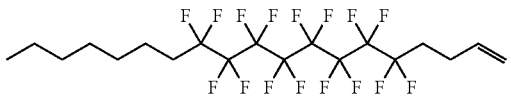 [SMILES: C=CCCC(F)(F)C(F)(F)C(F)(F)C(F)(F)C(F)(F)C(F)(F)C(F)(F)C(F)(F)CCCCCCC]

Example 3 3-HH-4

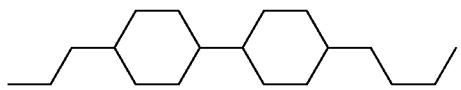 [SMILES: CCCCC1CCC(C2CCC(CCC)CC2)CC1]

Example 4 3-HBB(F,F)-F

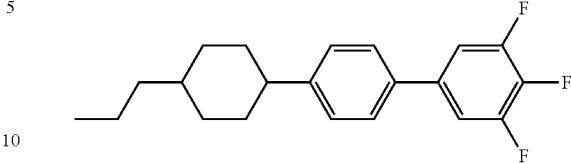

Characteristics were measured according to methods described below. Most of the methods are applied as described in EIAJ ED-2521A of the Standard of Electronic Industries Association of Japan, or as modified thereon.

(1) Maximum Temperature of a Nematic Phase (NI; ° C.)

A sample was placed on a hot plate in a melting point apparatus equipped with a polarizing microscope and was heated at a rate of 1° C. per minute. Temperature when a part of the sample began to change from a nematic phase to an isotropic liquid was measured. A higher limit of a temperature range of the nematic phase may be abbreviated as "maximum temperature."

(2) Refractive Index Anisotropy (Δn; Measured at 25° C.)

Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of the rubbing. A refractive index (n⊥) was measured when the direction of polarized light was perpendicular to the direction of the rubbing. A value of refractive index anisotropy (Δn) was calculated from an equation: (Δn)=(n∥)−(n⊥).

(3) Viscosity (Bulk Viscosity; η; Measured at 20° C.; mPa·s)

A cone-plate (E type) viscometer was used for measurement.

(4) Dielectric Anisotropy (Δ∈; Measured at 25° C.)

An ethanol (20 mL) solution of octadecyltriethoxysilane (0.16 mL) was applied to a well-washed glass substrate. After rotating the glass substrate with a spinner, the glass substrate was heated at 150° C. for 1 hour. A VA device in which a distance (cell gap) was 20 micrometers was assembled from two glass substrates.

A polyimide alignment film was prepared on the glass substrate in a similar manner. After rubbing treatment was applied to the alignment film formed on the glass substrate, a TN device in which a distance between the two glass substrates was 9 micrometers and a twist angle was 80 degrees was assembled.

A sample was put in the VA device obtained, a voltage of 0.5 V (1 kHz, sine waves) was applied, and a dielectric constant (∈∥) in the major axis direction of liquid crystal molecules was measured.

Moreover, a sample was put in the TN device obtained, a voltage of 0.5 V (1 kHz, sine waves) was applied, and a dielectric constant (∈⊥) in the minor axis direction of the liquid crystal molecules was measured.

A value of dielectric anisotropy was calculated from an equation: Δ∈=∈∥−∈⊥.

A composition in which the value is negative has a negative dielectric anisotropy.

(5) Threshold Voltage (Vth; Measured at 25° C.; V)

(5-1) Composition having a positive dielectric anisotropy:

A sample was put in a normally white mode liquid crystal display device in which a distance (gap) between two glass substrates is (0.5/Δn) micrometers, and a twist angle was 80 degrees. Herein, Δn is a value of refractive index anisotropy measured by the method described above. Rectangular waves having a frequency of 32 Hz were applied to the device. A voltage of the rectangular waves was increased and a value of voltage at 90% transmittance of light passing through the device was measured.

(5-2) Composition having a negative dielectric anisotropy: A sample was put in a normally black mode liquid crystal display device in which a distance (gap) between two glass substrates was 9 micrometers, and was subjected to homeotropic alignment. Rectangular waves having a frequency of 32 Hz were applied to the device. A voltage of the rectangular waves was increased and a value of voltage at 10% transmittance of light passing through the device was measured.

Composition Example 1

| | | |
|---|---|---|
| 5-F8-3 | (1-2) | 5% |
| 7-F8-3 | (1-4) | 5% |
| 5-HB-CL | (2-2) | 16% |
| 3-HH-4 | (12-1) | 12% |
| 3-HH-5 | (12-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 10% |
| 5-HHB(F)-F | (3-2) | 8% |
| 7-HHB(F)-F | (3-2) | 8% |
| 5-HBB(F)-F | (3-23) | 4% |
| 1O1-HBBH-5 | (14-1) | 3% |
| 3-HHBB(F,F)-F | (4-6) | 2% |
| 4-HHBB(F,F)-F | (4-6) | 3% |
| 5-HHBB(F,F)-F | (4-6) | 3% |
| 3-HH2BB(F,F)-F | (4-15) | 3% |
| 4-HH2BB(F,F)-F | (4-15) | 3% |

NI = 104.2° C.;
Δn = 0.088;
Δε = 3.2;
Vth = 2.60 V;
η = 17.3 mPa·s.

Composition Example 2

| | | |
|---|---|---|
| 7-F8-1V | (1-44) | 5% |
| 7-F8-2V | (1-34) | 4% |
| 3-HHB(F,F)-F | (3-3) | 9% |
| 3-H2HB(F,F)-F | (3-15) | 8% |
| 4-H2HB(F,F)-F | (3-15) | 8% |
| 5-H2HB(F,F)-F | (3-15) | 8% |
| 3-HBB(F,F)-F | (3-24) | 21% |
| 5-HBB(F,F)-F | (3-24) | 20% |
| 3-H2BB(F,F)-F | (3-27) | 8% |
| 5-HHBB(F,F)-F | (4-6) | 3% |
| 5-HHEBB-F | (4-17) | 2% |
| 1O1-HBBH-5 | (14-1) | 4% |

NI = 80.6° C.;
Δn = 0.106;
Δε = 8.3;
Vth = 1.48 V;
η = 30.0 mPa·s.

A helical pitch was 58.7 micrometers when 0.25 part by weight of (Op-5) was added to 100 parts by weight of the composition described above.

Composition Example 3

| | | |
|---|---|---|
| 7-F8-1V | (1-44) | 3% |
| V2-F8-1V | (1-62) | 3% |
| 5-HB-F | (2-2) | 12% |
| 6-HB-F | (2-2) | 9% |
| 7-HB-F | (2-2) | 7% |
| 2-HHB-OCF3 | (3-1) | 7% |
| 3-HHB-OCF3 | (3-1) | 7% |
| 4-HHB-OCF3 | (3-1) | 7% |
| 5-HHB-OCF3 | (3-1) | 5% |
| 3-HH2B-OCF3 | (3-4) | 4% |
| 5-HH2B-OCF3 | (3-4) | 4% |
| 3-HHB(F,F)-OCHF2 | (3-3) | 4% |
| 3-HHB(F,F)-OCF3 | (3-3) | 5% |
| 3-HH2B(F)-F | (3-5) | 3% |
| 3-HBB(F)-F | (3-23) | 7% |
| 5-HBB(F)-F | (3-23) | 7% |
| 5-HBBH-3 | (14-1) | 3% |
| 3-HB(F)BH-3 | (14-2) | 3% |

NI = 79.1° C.;
Δn = 0.087;
Δε = 4.0;
Vth = 2.42 V;
η = 12.6 mPa·s.

Composition Example 4

| | | |
|---|---|---|
| 7-F8-2V | (1-34) | 4% |
| V2-F8-2V | (1-71) | 4% |
| 5-HB-CL | (2-2) | 8% |
| 3-HH-4 | (12-1) | 8% |
| 3-HHB-1 | (13-1) | 2% |
| 3-HHB(F,F)-F | (3-3) | 8% |
| 3-HBB(F,F)-F | (3-24) | 20% |
| 5-HBB(F,F)-F | (3-24) | 15% |
| 3-HHEB(F,F)-F | (3-12) | 8% |
| 4-HHEB(F,F)-F | (3-12) | 3% |
| 5-HHEB(F,F)-F | (3-12) | 3% |
| 2-HBEB(F,F)-F | (3-39) | 3% |
| 3-HBEB(F,F)-F | (3-39) | 5% |
| 5-HBEB(F,F)-F | (3-39) | 3% |
| 3-HHBB(F,F)-F | (4-6) | 6% |

NI = 72.6° C.;
Δn = 0.100;
Δε = 8.3;
Vth = 1.40 V;
η = 20.7 mPa·s.

Composition Example 5

| | | |
|---|---|---|
| 7-F8-1V | 1-44) | 4% |
| 1V2-F8-2V | (1-67) | 4% |
| 3-HB-CL | (2-2) | 3% |
| 5-HB-CL | (2-2) | 4% |
| 3-HHB-OCF3 | (3-1) | 5% |
| 3-H2HB-OCF3 | (3-13) | 5% |
| 5-H4HB-OCF3 | (3-19) | 15% |
| V-HHB(F)-F | (3-2) | 5% |
| 3-HHB(F)-F | (3-2) | 5% |
| 5-HHB(F)-F | (3-2) | 5% |
| 3-H4HB(F,F)-CF3 | (3-21) | 8% |
| 5-H4HB(F,F)-CF3 | (3-21) | 10% |
| 5-H2HB(F,F)-F | (3-15) | 5% |

-continued

| | | |
|---|---|---|
| 5-H4HB(F,F)-F | (3-21) | 7% |
| 2-H2BB(F)-F | (3-26) | 5% |
| 3-H2BB(F)-F | (3-26) | 5% |
| 3-HBEB(F,F)-F | (3-39) | 5% |

NI = 64.6° C.;
Δn = 0.092;
Δε = 7.7;
Vth = 1.71 V;
η = 23.7 mPa · s.

Composition Example 6

| | | |
|---|---|---|
| 7-F8-1V | (1-44) | 5% |
| 7-F8-V1 | (1-54) | 5% |
| 5-HB-CL | (2-2) | 7% |
| 7-HB(F,F)-F | (2-4) | 3% |
| 3-HH-4 | (12-1) | 10% |
| 3-HH-5 | (12-1) | 5% |
| 3-HB-O2 | (12-5) | 15% |
| 3-HHB-1 | (13-1) | 8% |
| 3-HHB-O1 | (13-1) | 5% |
| 2-HHB(F)-F | (3-2) | 7% |
| 3-HHB(F)-F | (3-2) | 7% |
| 5-HHB(F)-F | (3-2) | 7% |
| 3-HHB(F,F)-F | (3-3) | 6% |
| 3-H2HB(F,F)-F | (3-15) | 5% |
| 4-H2HB(F,F)-F | (3-15) | 5% |

Composition Example 7

| | | |
|---|---|---|
| 7-F8-3 | (1-4) | 5% |
| 7-F10-3 | (1-81) | 5% |
| 5-HB-CL | (2-2) | 3% |
| 7-HB(F)-F | (2-3) | 7% |
| 3-HH-4 | (12-1) | 9% |
| 3-HH-EMe | (12-2) | 23% |
| 3-HHEB-F | (3-10) | 8% |
| 5-HHEB-F | (3-10) | 8% |
| 3-HHEB(F,F)-F | (3-12) | 10% |
| 4-HHEB(F,F)-F | (3-12) | 5% |
| 5-HGB(F,F)-F | (3-103) | 6% |
| 2-H2GB(F,F)-F | (3-106) | 4% |
| 5-GHB(F,F)-F | (3-109) | 7% |

Composition Example 8

| | | |
|---|---|---|
| 5-F8-3 | (1-2) | 5% |
| 7-F8-3 | (1-4) | 5% |
| 3-HB-O2 | (12-5) | 10% |
| 5-HB-CL | (2-2) | 13% |
| 3-HBB(F,F)-F | (3-24) | 7% |
| 3-PyB(F)-F | (2-15) | 10% |
| 5-PyB(F)-F | (2-15) | 10% |
| 3-PyBB-F | (3-80) | 10% |
| 4-PyBB-F | (3-80) | 10% |
| 5-PyBB-F | (3-80) | 10% |
| 5-HBB(F)B-3 | (14-5) | 10% |

NI = 75.3° C.;
Δn = 0.171;
Δε = 7.6;
Vth = 1.54 V;
η = 33.9 mPa · s.

Composition Example 9

| | | |
|---|---|---|
| 5-F8-3 | (1-2) | 4% |
| 7-F8-3 | (1-4) | 3% |
| 2-BEB(F)-C | (5-14) | 5% |
| 3-BEB(F)-C | (5-14) | 4% |
| 4-BEB(F)-C | (5-14) | 12% |
| 1V2-BEB(F,F)-C | (5-15) | 12% |
| 3-HB-O2 | (12-5) | 11% |
| 2-HH-3 | (12-1) | 11% |
| 3-HH-4 | (12-1) | 10% |
| 3-HHB-1 | (13-1) | 8% |
| 3-HHB-O1 | (13-1) | 4% |
| 3-H2BTB-2 | (13-17) | 4% |
| 3-H2BTB-3 | (13-17) | 4% |
| 3-H2BTB-4 | (13-17) | 4% |
| 3-HB(F)TB-2 | (13-18) | 4% |

NI = 77.3° C.;
Δn = 0.131;
Δε = 14.8;
Vth = 1.12 V;
η = 21.0 mPa · s.

Composition Example 10

| | | |
|---|---|---|
| V2-F8-2V | (1-71) | 5% |
| 1V2-F8-2V | (1-67) | 5% |
| 2-HB-C | (5-1) | 6% |
| 3-HB-C | (5-2) | 14% |
| 2-BEB-C | (5-13) | 10% |
| 3-HB-CL | (2-2) | 15% |
| 3-HHB-CL | (3-1) | 7% |
| 5-HHB-CL | (3-1) | 5% |
| 3-HHB-F | (3-1) | 4% |
| 3-HHEB-F | (3-10) | 3% |
| 2-HHB(F)-F | (3-2) | 7% |
| 3-HHB(F)-F | (3-2) | 7% |
| 5-HHB(F)-F | (3-2) | 7% |
| 3-HHB(F,F)-F | (3-3) | 5% |

NI = 76.7° C.;
Δn = 0.113;
Δε = 8.1;
Vth = 1.58 V;
η = 18.2 mPa · s.

Composition Example 11

| | | |
|---|---|---|
| V2-F8-1V | (1-62) | 5% |
| 7-F8-3 | (1-4) | 5% |
| 7-F8-V1 | (1-54) | 5% |
| 7-F10-3 | (1-81) | 5% |
| 2-BB-C | (5-5) | 10% |
| 5-BB-C | (5-5) | 10% |
| 3-BEB-C | (5-13) | 12% |
| 4-BEB-C | (5-13) | 12% |
| 5-BEB-C | (5-13) | 12% |
| 5-BBB-C | (5-34) | 7% |
| 3-HHB-C | (5-28) | 7% |
| 5-HHB-C | (5-28) | 10% |

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

The invention provides a new liquid crystal compound having a high clearing point, a good compatibility with other compounds, a small viscosity and a high stability to heat, light and so forth. Moreover, the invention provides a new liquid crystal composition having desirable characteristics by applying the liquid crystal compound as a component and suitably selecting a terminal group or the like constituting the compound. A liquid crystal display device using the liquid crystal composition can be widely applied to a display of a watch, a calculator, a personal computer or the like.

What is claimed is:

1. A compound represented by formula (1):

(1)

wherein, in formula (1), $R^1$ is alkyl having 4 to 10 carbons, —$(CH_2)_2$—CH=$CH_2$ or —$(CH_2)_2$—CH=$CHCH_3$, $R^2$ is alkyl having 2 to 10 carbons, —CH=$CH_2$, —CH=$CHCH_3$, —$CH_2$CH=$CH_2$, —$CH_2$CH=$CHCH_3$, —$(CH_2)_2$—CH=$CH_2$ or —$(CH_2)_2$—CH=$CHCH_3$, n is 8, 9 or 10, and $R^1$ is not identical with $R^2$.

2. The compound according to claim 1, wherein, in formula (1), n is 8.

3. The compound according to claim 2, wherein, in formula (1), $R^1$ is alkyl having 4 to 10 carbons and $R^2$ is alkyl having 2 to 7 carbons.

4. The compound according to claim 2, wherein, in formula (1), $R^1$ is alkyl having 4 to 10 carbons, and $R^2$ is —CH=$CH_2$, —CH=$CHCH_3$, —$CH_2$CH=$CH_2$, —$CH_2$CH=$CHCH_3$, —$(CH_2)_2$—CH=$CH_2$ or —$(CH_2)_2$—CH=$CHCH_3$.

5. The compound according to claim 2, wherein, in formula (1), $R^1$ is —$(CH_2)_2$—CH=$CH_2$ or —$(CH_2)_2$—CH=$CHCH_3$, and $R^2$ is —CH=$CH_2$, —CH=$CHCH_3$, —$CH_2$CH=$CH_2$, —$CH_2$CH=$CHCH_3$, —$(CH_2)_2$—CH=$CH_2$ or —$(CH_2)_2$—CH=$CHCH_3$.

6. A liquid crystal composition, containing at least one compound according to claim 1.

7. The liquid crystal composition according to claim 6, further containing at least one compound selected from the group of compounds represented by formula (2) to formula (4):

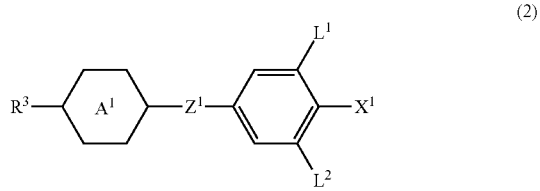
(2)

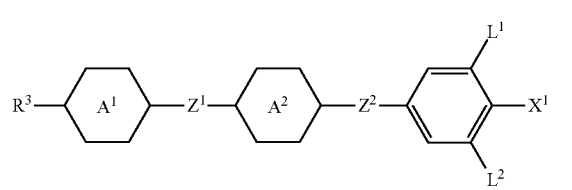
(3)

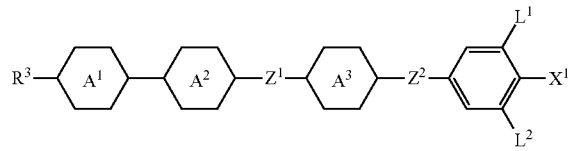
(4)

wherein, in formula (2) to formula (4), $R^3$ is independently alkyl having 1 to 10 carbons or alkenyl having 2 to 10 carbons, and in the alkyl and the alkenyl, at least one of hydrogen may be replaced by fluorine and at least one of —$CH_2$— may be replaced by —O—; $X^1$ is fluorine, chlorine, —$OCF_3$, —$OCHF_2$, —$CF_3$, —$CHF_2$, —$CH_2F$, —CF=$CF_2$, —$OCF_2CHF_2$ or —$OCF_2CHFCF_3$; ring $A^1$, ring $A^2$ and ring $A^3$ are independently 1,4-cyclohexylene, 1,3-dioxane-2,5-diyl, pyrimidine-2,5-diyl, tetrahydropyran-2,5-diyl, 1,4-phenylene, 2-fluoro-1,4-phenylene, 3-fluoro-1,4-phenylene or 3,5-difluoro-1,4-phenylene; $Z^1$ and $Z^2$ are independently —$(CH_2)_2$—, —$(CH_2)_4$—, —COO—, —$CF_2O$—, —$OCF_2$—, —CH=CH—, —C≡C—, —$CH_2O$— or a single bond; and $L^1$ and $L^2$ are independently hydrogen or fluorine.

8. The liquid crystal composition according to claim 6, further containing at least one compound selected from the group of compounds represented by formula (5):

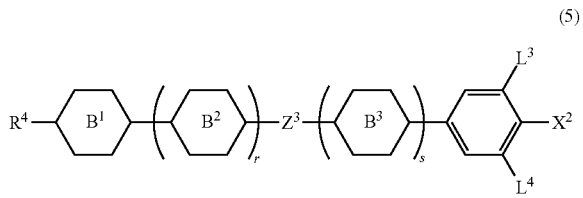
(5)

wherein, in formula (5), $R^4$ is alkyl having 1 to 10 carbons or alkenyl having 2 to 10 carbons, and in the alkyl and the alkenyl, at least one of hydrogen may be replaced by fluorine and at least one of —$CH_2$— may be replaced by —O—; $X^2$ is —C≡N or —C≡C—C≡N; ring $B^1$, ring $B^2$ and ring $B^3$ are independently 1,4-cyclohexylene, 1,4-phenylene in which at least one of hydrogen may be replaced by fluorine, 1,3-dioxane-2,5-diyl, tetrahydropyran-2,5-diyl or pyrimidine-2,5-diyl; $Z^3$ is —$(CH_2)_2$—, —COO—, —$CF_2O$—, —$OCF_2$—, —C≡C—, —$CH_2O$— or a single bond; $L^3$ and $L^4$ are independently hydrogen or fluorine; r is 0, 1 or 2, s is 0 or 1, and a sum of r and s is 0, 1, 2 or 3.

9. The liquid crystal composition according to claim 6, further containing at least one compound selected from the group of compounds represented by formula (6) to formula (11):

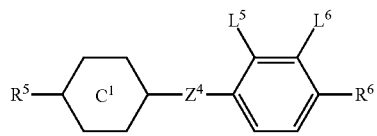

(6)

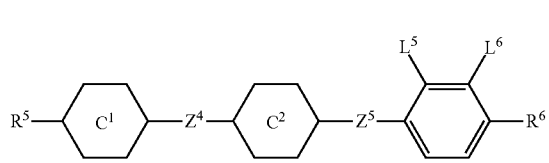

(7)

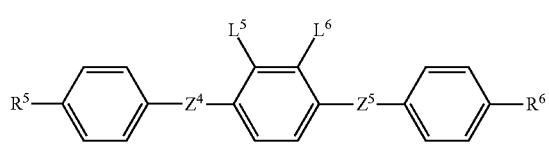

(8)

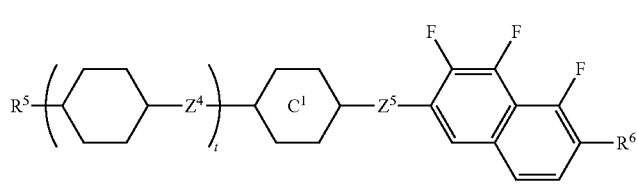

(9)

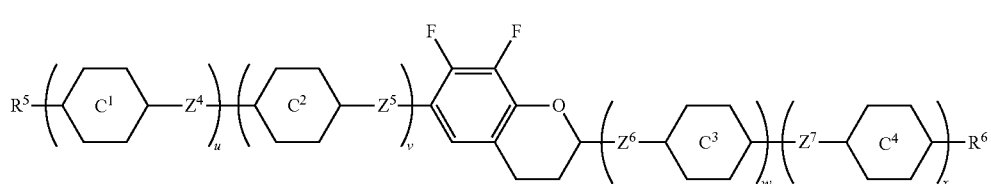

(10)

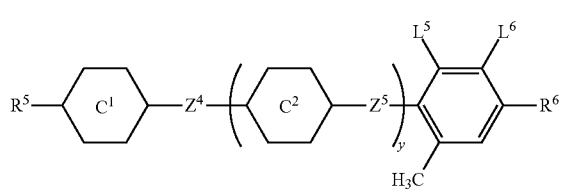

(11)

wherein, in formula (6) to formula (11), $R^5$ and $R^6$ are independently alkyl having 1 to 10 carbons or alkenyl having 2 to 10 carbons, and in the alkyl and the alkenyl, at least one of hydrogen may be replaced by fluorine and at least one of —$CH_2$— may be replaced by —O—; ring $C^1$, ring $C^2$, ring $C^3$ and ring $C^4$ are independently 1,4-cyclohexylene, 1,4-cyclohexenylene, 1,4-phenylene in which at least one of hydrogen may be replaced by fluorine, tetrahydropyran-2,5-diyl, tetrahydropyran-3,6-diyl or decahydro-2,6-naphthalene; $Z^4$, $Z^5$, $Z^6$ and $Z^7$ are independently —$(CH_2)_2$—, —COO—, —$CH_2O$—, —$OCF_2$—, —$OCF_2(CH_2)_2$— or a single bond; $L^5$ and $L^6$ are independently fluorine or chlorine; and t, u, v, w, x and y are independently 0 or 1, and a sum of u, v, w and x is 1 or 2.

10. The liquid crystal composition according to claim 6, further containing at least one compound selected from the group of compounds represented by formula (12) to formula (14):

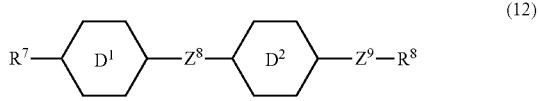

(12)

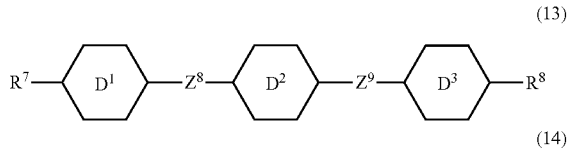

(13)

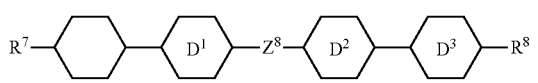

(14)

wherein, in formula (12) to formula (14), $R^7$ and $R^8$ are independently alkyl having 1 to 10 carbons or alkenyl having 2 to 10 carbons, and in the alkyl and the alkenyl, at least one of —$CH_2$— may be replaced by —O—; ring $D^1$, ring $D^2$ and ring $D^3$ are independently 1,4-cyclohexylene, pyrimidine-2, 5-diyl, 1,4-phenylene, 2-fluoro-1,4-phenylene, 3-fluoro-1,4-phenylene or 2,5-difluoro-1,4-phenylene; and $Z^8$ and $Z^9$ are independently —C≡C—, —COO—, —(CH$_2$)$_2$—, —CH═CH— or single bond.

11. The liquid crystal composition according to claim 7, further containing at least one compound selected from the group of compounds represented by formula (5):

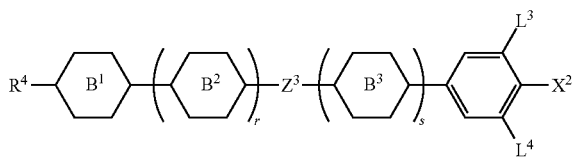
(5)

wherein, in formula (5), $R^4$ is alkyl having 1 to 10 carbons or alkenyl having 2 to 10 carbons, and in the alkyl and the alkenyl, at least one of hydrogen may be replaced by fluorine and at least one of —CH$_2$— may be replaced by —O—; $X^2$ is —C≡N or —C≡C—C≡N; ring $B^1$, ring $B^2$ and ring $B^3$ are independently 1,4-cyclohexylene, 1,4-phenylene in which at least one of hydrogen may be replaced by fluorine, 1,3-dioxane-2,5-diyl, tetrahydropyran-2,5-diyl or pyrimidine-2,5-diyl; $Z^3$ is —(CH$_2$)$_2$—, —COO—, —CF$_2$O—, —OCF$_2$—, —C≡C—, —CH$_2$O— or a single bond; $L^3$ and $L^4$ are independently hydrogen or fluorine; r is 0, 1 or 2, s is 0 or 1, and a sum of r and s is 0, 1, 2 or 3.

12. The liquid crystal composition according to claim 7, further containing at least one compound selected from the group of compounds represented by formula (12) to formula (14):

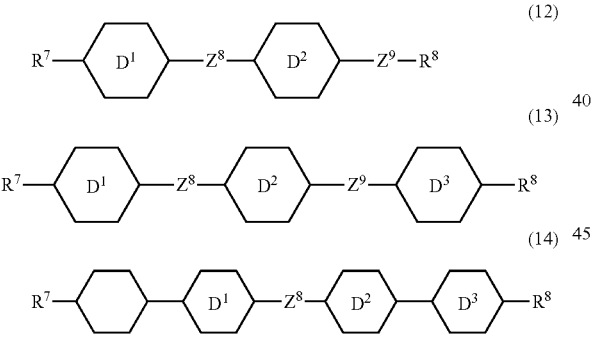
(12)
(13)
(14)

wherein, in formula (12) to formula (14), $R^7$ and $R^8$ are independently alkyl having 1 to 10 carbons or alkenyl having 2 to 10 carbons, and in the alkyl and the alkenyl, at least one of —CH$_2$— may be replaced by —O—; ring $D^1$, ring $D^2$ and ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^8$ and $Z^9$ are independently —C≡C—, —COO—, —(CH$_2$)$_2$—, —CH═CH— or single bond.

13. The liquid crystal composition according to claim 8, further containing at least one compound selected from the group of compounds represented by formula (12) to formula (14):

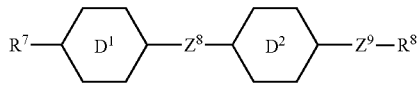
(12)

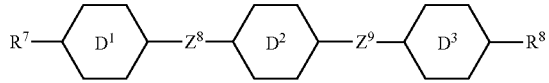
(13)

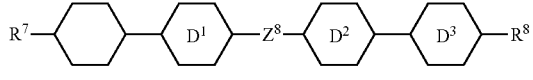
(14)

wherein, in formula (12) to formula (14), $R^7$ and $R^8$ are independently alkyl having 1 to 10 carbons or alkenyl having 2 to 10 carbons, and in the alkyl and the alkenyl, at least one of —CH$_2$— may be replaced by —O—; ring $D^1$, ring $D^2$ and ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^8$ and $Z^9$ are independently —C≡C—, —COO—, —(CH$_2$)$_2$—, —CH═CH— or single bond.

14. The liquid crystal composition according to claim 9, further containing at least one compound selected from the group of compounds represented by formula (12) to formula (14):

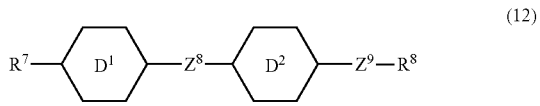
(12)

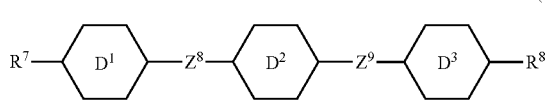
(13)

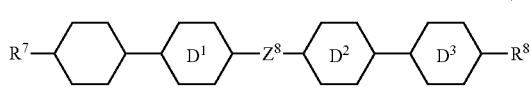
(14)

wherein, in formula (12) to formula (14), $R^7$ and $R^8$ are independently alkyl having 1 to 10 carbons or alkenyl having 2 to 10 carbons, and in the alkyl and the alkenyl, at least one of —CH$_2$— may be replaced by —O—; ring $D^1$, ring $D^2$ and ring $D^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^8$ and $Z^9$ are independently —C≡C—, —COO—, —(CH$_2$)$_2$—, —CH═CH— or single bond.

15. The liquid crystal composition according to claim 6, further containing at least one optically active compound.

16. The liquid crystal composition according to claim 6, further containing at least one antioxidant and/or at least one ultraviolet light absorber.

17. A liquid crystal display device including the liquid crystal composition according to claim 6.

* * * * *